(12) United States Patent
Barnes et al.

(10) Patent No.: US 11,378,679 B2
(45) Date of Patent: Jul. 5, 2022

(54) SENSOR ARRAY IMAGING DEVICE

(71) Applicant: Georgia Tech Research Corporation, Atlanta, GA (US)

(72) Inventors: Christopher Floyd Barnes, Atlanta, GA (US); Skanda Prasad Ponnathpur Nagendra, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 202 days.

(21) Appl. No.: 16/636,494

(22) PCT Filed: Aug. 7, 2018

(86) PCT No.: PCT/US2018/045625
§ 371 (c)(1),
(2) Date: Feb. 4, 2020

(87) PCT Pub. No.: WO2019/032594
PCT Pub. Date: Feb. 14, 2019

(65) Prior Publication Data
US 2020/0249342 A1 Aug. 6, 2020

Related U.S. Application Data

(60) Provisional application No. 62/543,128, filed on Aug. 9, 2017.

(51) Int. Cl.
*G01S 13/89* (2006.01)
*G01S 7/295* (2006.01)
(Continued)

(52) U.S. Cl.
CPC .............. *G01S 13/89* (2013.01); *G01S 7/295* (2013.01); *G01S 7/52028* (2013.01); *G01S 7/2883* (2021.05)

(58) Field of Classification Search
None
See application file for complete search history.

(56) References Cited

U.S. PATENT DOCUMENTS 5,623,928 A 4/1997 Wright et al.
5,736,958 A 4/1998 Turpin et al.
(Continued)

OTHER PUBLICATIONS

International Search Report and Written Opinion from PCT application No. PCT/US2018/045625, dated Oct. 17, 2018 (10 pages).
(Continued)

*Primary Examiner* — Whitney Moore
(74) *Attorney, Agent, or Firm* — Troutman Pepper Hamilton Sanders LLP; Ryan A. Schneider

(57) ABSTRACT

A system produces sensed images. The system includes a sensor array, an image display device, and a processor that generates an image illustrating contents of an expanded field of view. The processor receives sensor element data from the sensor array, performs zero padding and discrete Fourier transform to result in a sensor wavenumber data buffer. The processor determines reference point locations, and generates a reference Fresnel field. The processor obtains an inverse Huygens-Fresnel transfer data buffer based on the reference Fresnel field. The processor multiplies each data element of the sensor wavenumber buffer with each corresponding data element of the inverse Huygens-Fresnel transfer data buffer. The processor generates a rectilinear spectrum data buffer based on the multiplication. The processor performs Stolt mapping and uniformly resampling to achieve image data.

23 Claims, 54 Drawing Sheets

(51) Int. Cl.
    *G01S 7/52*       (2006.01)
    *G01S 7/288*      (2006.01)

(56) References Cited

U.S. PATENT DOCUMENTS

2005/0212691 A1   9/2005   Tirkel et al.
2008/0265130 A1   10/2008  Colomb et al.
2011/0157667 A1   6/2011   Lacoste et al.

OTHER PUBLICATIONS

Alizadeh, et al., "A Novel Non-Linear Apprixmation to the Huygens-Fresnel Diffraction Patterns for Reconstructing Digital Holographic SAR Images," Jul. 14, 2006 URL: https://ieeexplore.ieee.org/document/1706147.
Supplemental EP Search Report dated Mar. 26, 2021.
Li, et al., "A Fast Radial Scanned Near-Field 3-D SAR Imaging System and the Reconstruction Method," IEEE Transactions on Geoscience and Remote Sensing Mar. 1, 2015 vol. 53, No. 3 pp. 1355-1363.

SENSOR ARRAY IMAGING DEVICE

CROSS-REFERENCE

This application claims the benefit of U.S. Provisional Patent Application Ser. No. 62/543,128, filed on Aug. 9, 2017, which is hereby incorporated by reference to its entirety.

FIELD OF THE INVENTION

The present invention relates to systems that include sensor arrays to acquire data and means to process data to create one-dimensional, two-dimensional or three-dimensional images of scene content within a sensed field of view. In particular, the present invention relates to the forming of sensed images of scenes and objects in fields of view that may be near or far from sensor arrays, with the sensor array either held stationary or moving.

BACKGROUND

Sensor arrays have proven utility in both the transmission and reception of signals. On transmission, arrays can be used to conventionally form a "beam" in the far-field of the sensor array to concentrate transmitted signal energy in a region of interest, thereby creating a "field of view." On receive, sensor arrays have been traditionally used to form one or more steered beams for estimation of the angle-of-arrival of signals reflected from scatterers within the far-field. A "scatterer" is a point within the field of view capable of reflecting transmitted signal energy back to the sensor array. Sensor arrays have been used to search for the existence of remote objects by sweeping a steered transmitted beam through a region of interest and searching for echoes from scatterers within the field of view. Traditionally, sensor arrays require means for beamforming and means for beam steering, conventionally provided by on-array analog signal processing circuitry. Operationally, sensor arrays traditionally require a sequence of steered beams, each requiring one or more pulses to be transmitted, to span the field of view being searched. Beam based searching of the sensor array's remote environment can be overly expensive in the time resources required to scan the search volume and overly expensive in the amount of power resources that must be consumed during multiple, swept beam transmissions. Moreover, due to limitations of conventional processing methods, traditional beamforming for array sensing is only physically possible in the "far-field" of the array, where the notion of a "far-field" traditionally represents a distance that is sufficiently far from the array that electromagnetic or acoustic wave fronts transmitted by the array are nearly planar within the vicinity of the down-range field of view. This far-field limitation of conventional, so called, "Fraunhofer plane-wave beamforming" is inherent in the performance of the processes used to form the beam. Conventional plane-wave processing creates transmit and receive Fraunhofer plane wave beams that exist only at far-field distances.

There is a need for means and methods of processing of sensor array data that provide scatterer localization in the traditional near-field of a sensor array and which also provide enhanced scatterer localization in the traditional far-field. An imaging based approach of processing of sensor array data, instead of a beam forming and beam steering approach, would satisfy such a need. An imaging based approach would provide an image of the contents of a sensor array's field of view, where pixel intensity and pixel position values within the field of view image would indicate both the position (range and angle) and strength of reflective scatterers within that field of view.

There is a need to replace beam based search procedures with image based search procedures. Data processing methods capable of producing images from a sensor array would provide more information about the exact nature (position/strength) of individual scatterers within the field of view being imaged. Traditional beam base search methods are only capable of identifying the ranges and rather coarse position angles of the scatterers within fields of view of limited size.

Further, there is a need for a means to more quickly search an extended field of view volume (i.e., a field of view larger than a single Fraunhofer plane wave beamwidth) with transmission of a single transmitted pulse from a stationary sensor array. This need requires a replacement of the swept beam or steered angle-of-arrival estimation approach of volume searching with array sensing. A single pulse approach to extended volume searching can be achieved if an image of the contents of an enlarged field of view can be formed by processing the data of the array with the echoes received from a single transmitted pulse. The speed of search can be increased if the field of view supported by a single pulse imaging method is larger than the traditional beamwidth of swept beam based search methods.

There is a need for a single pulse, "real," sensor array imaging method that can be combined with "synthetic" array imaging processes. Imaging methods exist for a form of array sensing called, "synthetic arrays." Synthetic arrays are commonly used in radar systems called, "synthetic aperture radars" (SARs). With synthetic array radars, many pulses are typically transmitted and collected to form a synthesized array as a single sensor element (antenna) is moved along a predetermined (flight) path. This single sensor element movement creates the "synthetic" array, but at a price of transmission/reception of many pulses. There is a need to increase the effectiveness of synthetic array imaging methods by reducing the number of pulses that are transmitted, and by reducing the amount of sensor movement required for synthetic aperture formation. There is a need for a means for form sensor array based imagery from a real, stationary, sensor array.

Moreover, real arrays in the form of digital arrays are becoming more common. A digital array removes analog hardware that has been used for on-array analog processing to form and steer beams. A digital array places multiple analog-to-digital converters closer to each array sensor element. Digital data is then transferred off-array for processing in computer software. With a digital array, sensor element data is directly acquired (without analog Fraunhofer beamforming analog processing circuitry) in digital format from each sensor element. Hence, a digital sensor array presents an opportunity for increased sophistication in off-array digital processing.

There is a need for a new means to form imagery with the transmission and reception of a single pulse from a stationary digital sensor array. There is also a need to form imagery with a digital sensor array with digital data gathered from both near or far from the sensor array. There is also a need to combine single pulse, stationary, digital sensor array methods with multiple pulse, moving sensor array, synthetic array operational concepts. Single pulse data collections gathered for image formations, which can be called "single pulse dwells," can be extended to "multiple pulse dwells" as a digital sensor array is moved in SAR-like applications. There is a need to use image methods achievable with single pulses to improve the performance (e.g., the rate of image production) of SAR-like image methods that have traditionally required sensor movement.

SUMMARY

The disclosed technology relates to systems for forming imagery of enlarged fields of view with the transmission and reception of a single pulse from a digital sensor array. The disclosed technology relates to single pulse, stationary, and sensor array operations. In addition, the disclosed technology relates to multiple pulse, nonstationary, and sensor array operations.

One aspect of the disclosed technology relates to a system for producing sensed images. The system includes a sensor array which includes a plurality of sensor elements capable of transmitting waveform signals and receiving echoes. The system also includes an image display device and a processor. The processor receives sensor element echo data from the transmitted waveform of the sensor array, and performs a temporal discrete Fourier transform (DFT) on the recorded sensor element data. When a size of a field of view to be displayed is larger than a size of the sensor array, the processor performs zero padding to modify the sensor element data received from the sensor array to a size of the expanded field of view for storage in a sensor data buffer. When the size of a field of view to be displayed is not larger than a size of the sensor array, the processor stores the sensor element data to the sensor data buffer without zero padding. The system performs a spatial DFT on the sensor data buffer to result in a sensor wavenumber data buffer. The processor determines a first spatial reference point location of the sensor array. The processor determines a second spatial reference point location of the field of view. The processor generates a reference Fresnel field based on the transmitted waveform, based on the size of the expanded field of view, and based on the first and second spatial reference point locations to obtain reference Fresnel field data. The processor performs a spatial DFT on the reference Fresnel field data to form forward Huygens-Fresnel transfer data. The processor performs complex number conjugation of the forward Huygens-Fresnel transfer data to form inverse Huygens-Fresnel transfer data for storage in an inverse Huygens-Fresnel transfer data buffer. The processor multiplies each data element of the sensor wavenumber buffer with each corresponding data element of the inverse Huygens-Fresnel transfer data buffer and with corresponding element data of a filter matched to the transmitted waveform in the conventional pulse compression sense. The processor stores the multiplied data elements into a rectilinear spectrum data buffer. The processor performs Stolt mapping on the rectilinear spectrum data buffer to form nonuniformly sampled angular spectrum data for storage in an angular spectrum data buffer. The processor performs uniform resampling of nonuniformly sampled angular spectrum data. The processor performs spatial inverse DFT on uniformly resampled angular spectrum data to generate an image of the potentially expanded field of view illustrating contents of the field of view. The processor displays the image on the image display device.

In one embodiment, the sensor elements have a predefined spatial arrangement.

In one embodiment, the image of the field of view is one, two or three dimensional.

In one embodiment, the image of the field of view has a predefined data sample spacing.

In one embodiment, the predefined data sample spacing of the image of the field of view is proportional to, including possibly equal to, a predefined spacing between the sensor elements of the sensor array.

In one embodiment, a total number of pixels that span a cross-range extent in the azimuth dimension, the elevation dimension, or in both cross-range dimensions of a one-, two- or three-dimensional field of view is equal to a total number of the sensor elements in the sensor array. In one embodiment, the total number of pixels that span a cross-range extent of the field of view is less than, equal to, or is greater than a total number of the sensor elements in the sensor array.

In one embodiment, a total number of pixels that span a cross-range extent in the azimuth dimension, the elevation dimension, or in both cross-range dimensions of a one-, two- or three-dimensional, enlarged or expanded field of view is greater than a total number of the sensor elements in the sensor array.

In one embodiment, a total number of elements of the inverse Huygens-Fresnel transfer data buffer equals a total number of data samples (image pixels) that span a cross-range extent of the field of view.

In one embodiment, the processor generates one or more fields of views with distinct associated spatial reference points, distinct reference Fresnel fields, and distinct reference Fresnel field data buffers.

In one embodiment, the sensor array is a two-dimensional sensor array.

In one embodiment, the sensor array includes at least one of a multidimensional array and a conformal surface array.

In one embodiment, the processor integrates data from multiple sensor positions, obtained by moving one or more sensors arrays, or obtained by a system of distinct multiple sensor arrays, each either stationary or moving.

Another aspect of the disclosed technology relates to a system for producing a reference Fresnel field signal. The system includes a sensor array which includes a plurality of sensor elements. The sensor elements have a predefined spacing. The sensor elements may have a predefined waveform transmitted from the sensor array. The system includes a processor. The processor determines a spatial reference point for the sensor array. The processor determines a spatial reference point for a field of view to be imaged. The processor generates reference Fresnel field sample data based on the transmitted waveform to account for a space between the spatial reference points of the sensor array and the field of view. The processor generates a data buffer containing reference Fresnel field sample data. The reference Fresnel field sample data has reference Fresnel field data sample spacing which is proportional to, including possibly equal to, the predefined spacing of the sensor elements. A total number of Fresnel field data samples of the reference Fresnel field sample data is identical to a total number of cross-range data samples of a field of view.

In one embodiment, the spatial reference point of the sensor array identifies a nominal center point position of the sensor array.

In one embodiment, the spatial reference point for the field of view identifies a nominal center point position of the field of view.

An additional aspect of the disclosed technology relates to a system for producing an inverse Huygens-Fresnel transfer signal. The system includes a sensor array which includes a plurality of sensor elements. The sensor elements have a predefined spacing. The sensor elements may have a predefined waveform transmitted from the sensor array. The system includes a processor. The processor determines a spatial discrete Fourier transform of reference Fresnel field data to produce forward Huygens-Fresnel transfer data for a forward Huygens-Fresnel transfer buffer. The reference Fresnel field data has reference Fresnel field data sample spacing which is proportional to, including possibly equal to, the predefined spacing of the sensor elements. A total number of Fresnel field data samples of the reference Fresnel field sample data is identical to a total number of cross-range data samples of a field of view. The processor determines a complex conjugation of the forward Huygens-Fresnel transfer data to produce data for an inverse Huygens-Fresnel transfer buffer.

The invention accordingly comprises the several steps and the relation of one or more of such steps with respect to each of the others, and the apparatus embodying features of construction, combinations of elements and arrangement of parts that are adapted to affect such steps, all is exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1A:
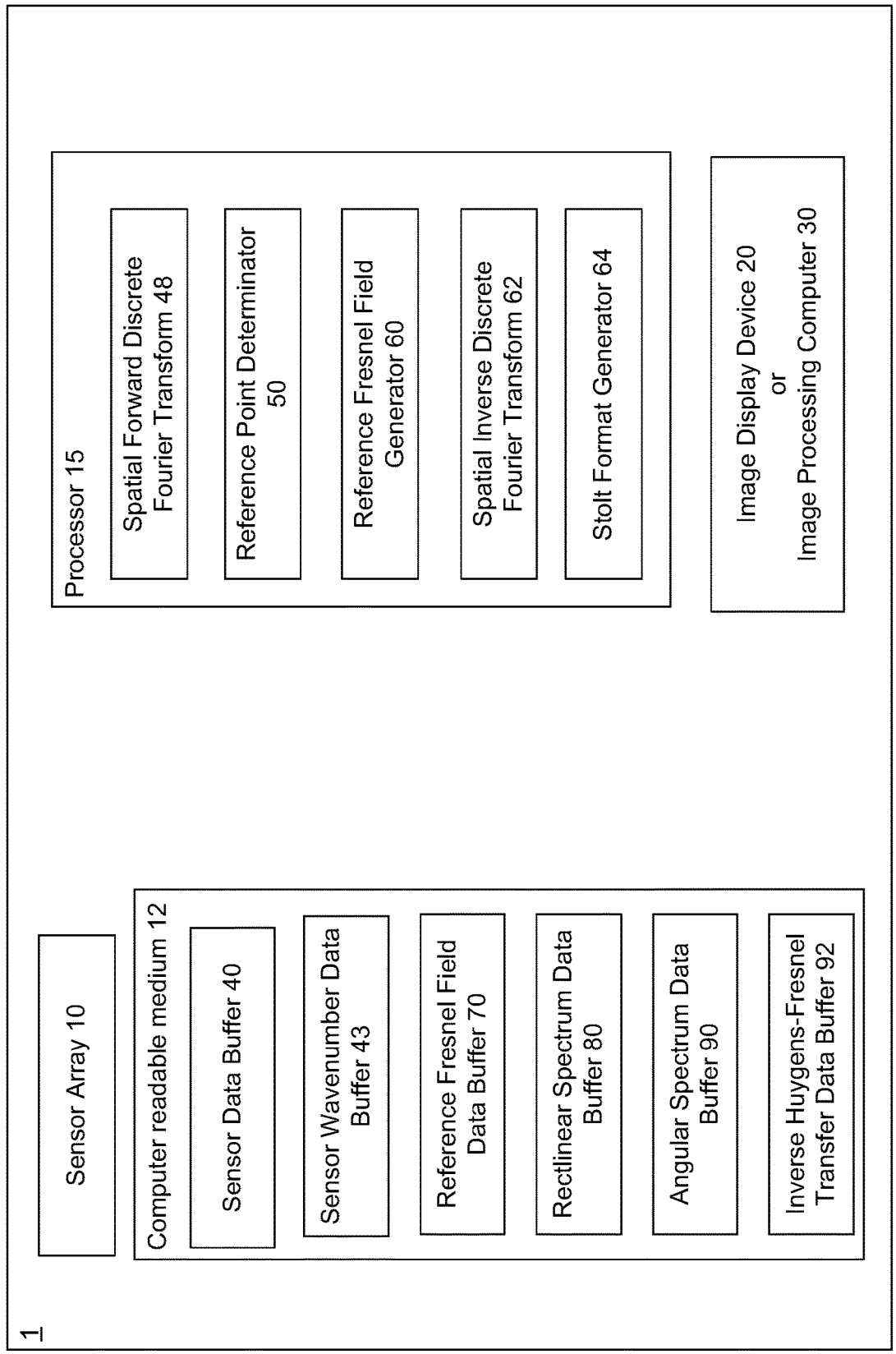
FIG. 1A illustrates a block diagram of a system according to one aspect of the disclosed technology.
Figure 1B:
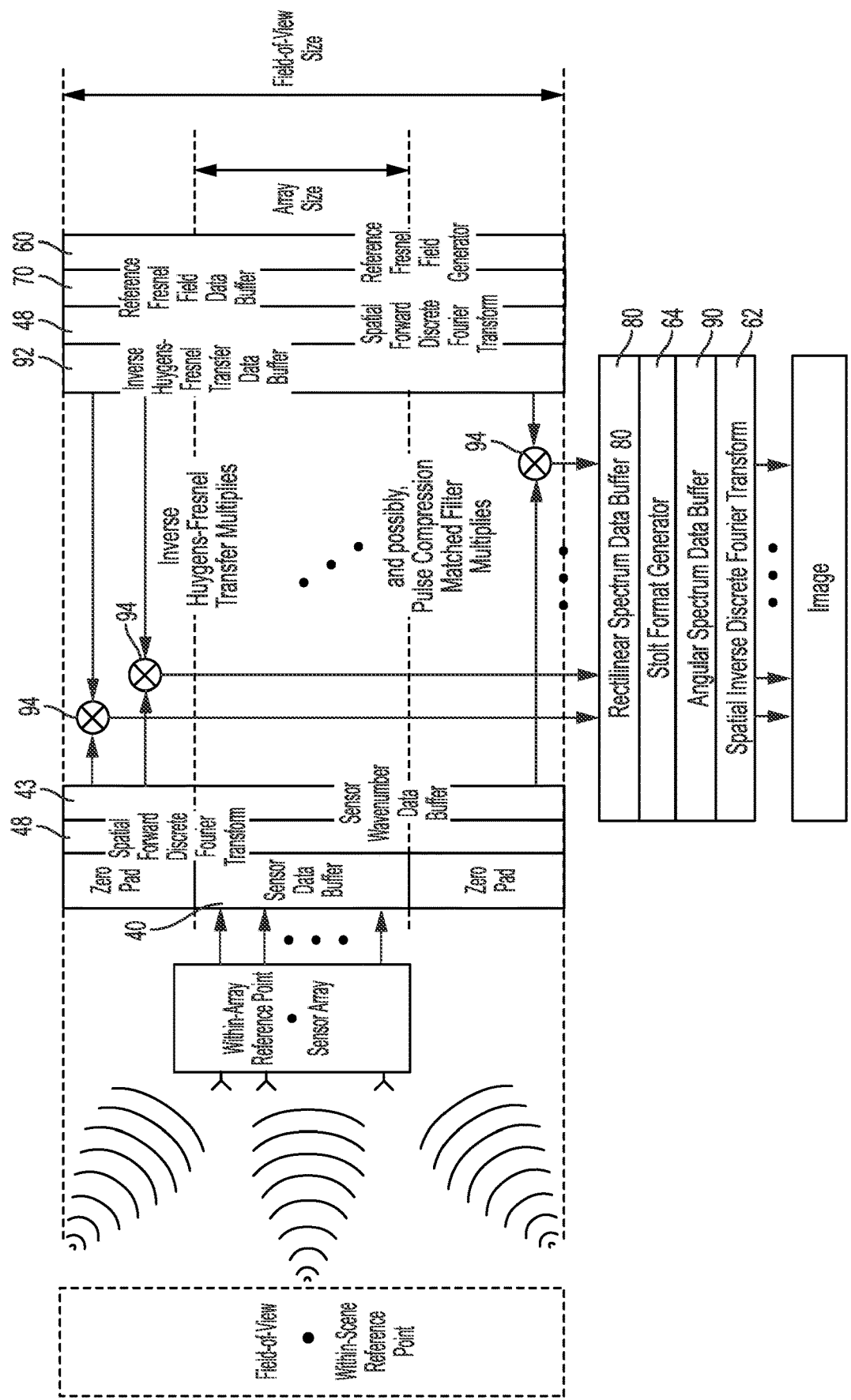
FIG. 1B illustrates a block diagram illustrating operation of the system of FIG. 1A.

The present application relates to, but not limited to, a system that utilizes arrays of discrete sensors to collect data to support processing for the creation of images of the contents of the sensor array's field of view. FIGS. 1A-1B show an exemplary signal processing system 1 with a sensor array 10 to perform imaging with transmission of a single pulse signal, where the single pulse signal is transmitted simultaneously by all transmitter/receiver sensor elements of the sensor array 10. A "single pulse" may be a waveform such as a continuous wave signal, a pulse waveform, a frequency modulated waveform, a composite pulse waveform formed with multiple subpulses, a phase modulated waveform, or one of many other waveform selection possibilities.

The sensor array 10 may include an array of sensor elements. Each sensor element may be an antenna element. Each antenna element may receive echo signals and provide descriptive digital data. The sensor array of sensor elements may be associated with a sensor array position reference point. The array position reference point may be a spatial point that describes a nominal position of the entire sensor array 10. Conventional pulse compression methods such as matched filtering may be utilized by the system.

The sensor array 10 may include a digital sensor array that forms images representative of the scatterers of objects within a sensor array field of view by using the single pulse signal. A scatterer is part of an object or part of a scene that reflects the waveform transmitted by the sensor array 10. An image is comprised of an array of data samples/pixels/voxels and is capable of describing scatterer echo strength (via sample/pixel/voxel amplitude values), scatterer phase (via complex sample/pixel/voxel phase values) and scatterer position (via sample/pixel/voxel position values within the field of view image).

Figure 1C:
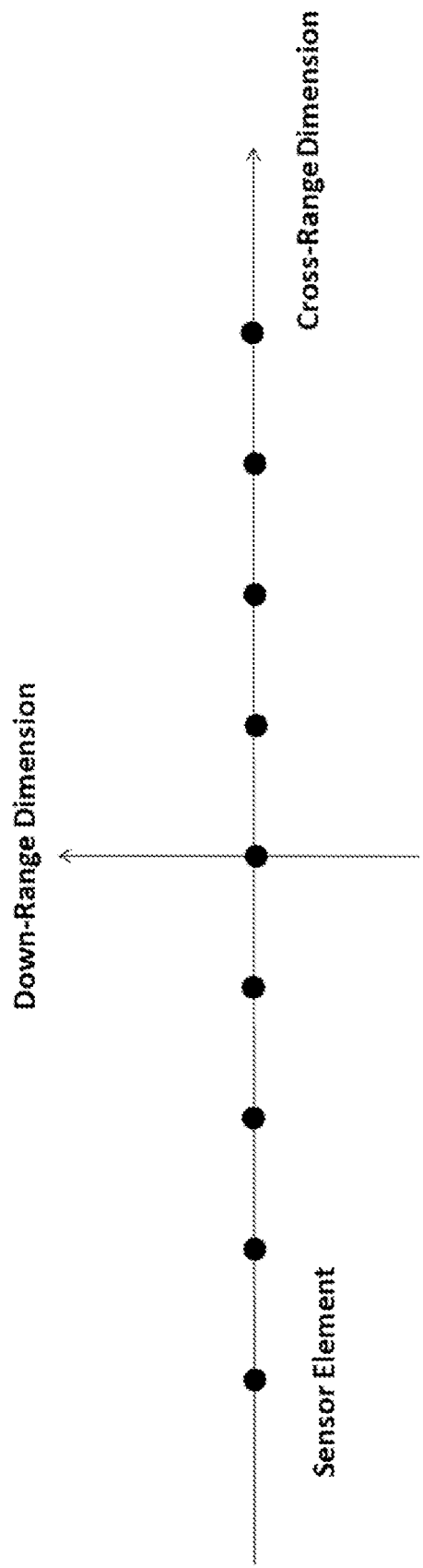
FIG. 1C illustrates a uniform linear sensor array according to one aspect of the disclosed technology.
Figure 1D:
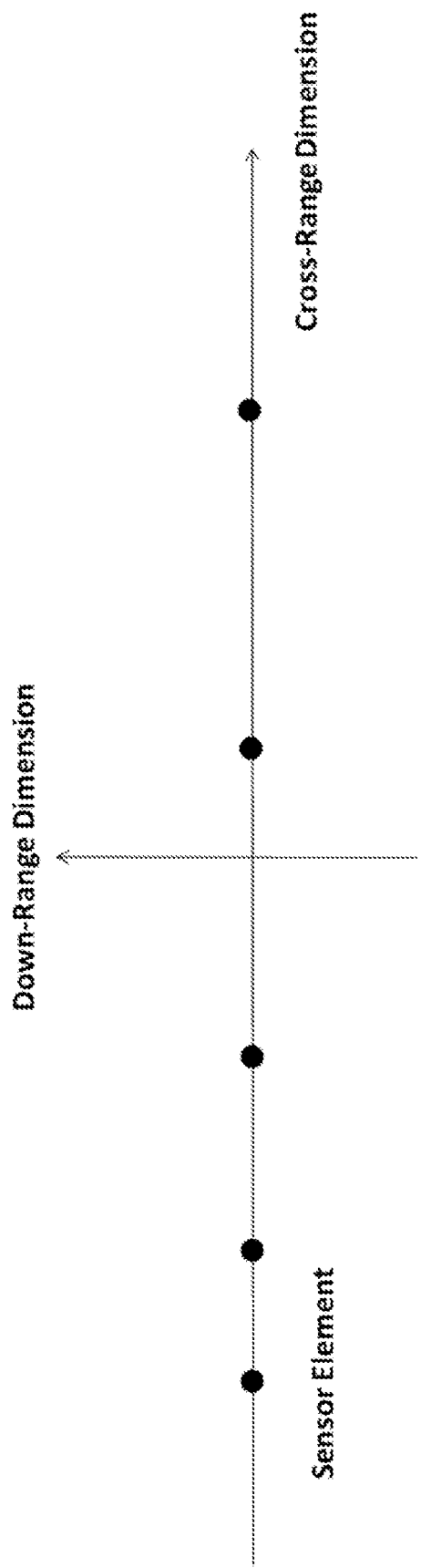
FIG. 1D illustrates a nonuniform linear sensor array according to one aspect of the disclosed technology.
Figure 1E:
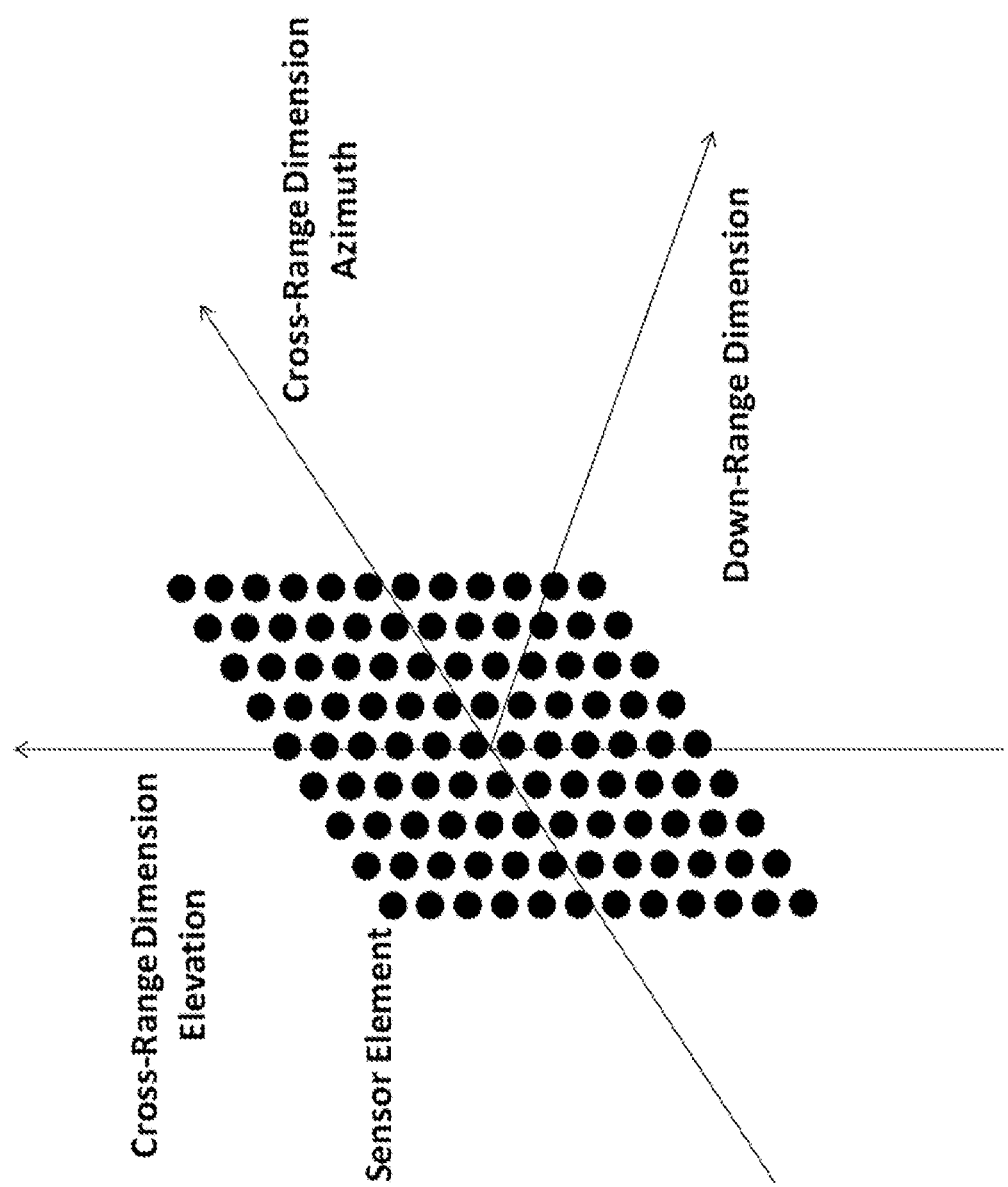
FIG. 1E illustrates a planar sensor array according to one aspect of the disclosed technology.
Figure 1F:
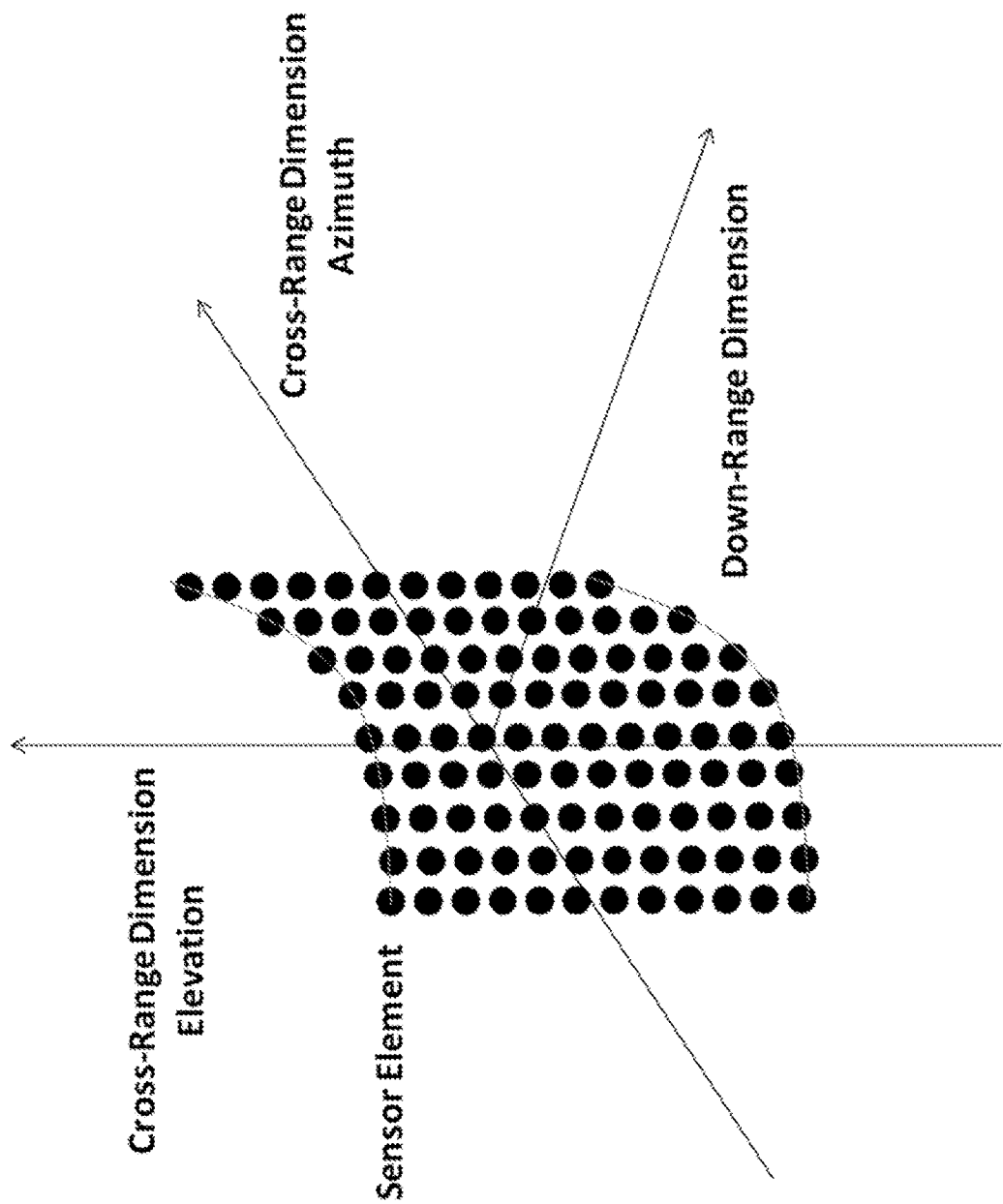
FIG. 1F illustrates a conformal sensor array according to one aspect of the disclosed technology.

The sensor elements of the sensor array 10 may have a predefined spacing. For example, there may exist a predefined physical spacing among the sensor elements as illustrated in FIGS. 1C-1F. The sensor array 10 may be a one-dimensional linear sensor array as illustrated by FIG. 1C. The predefined spatial arrangement of sensor elements may be uniform or nonuniform as illustrated respectively by FIGS. 1C-1D for the case of a linear array. The sensor array 10 may be a two-dimensional planar sensor array as illustrated by FIG. 1E. The sensor array 10 may be a multidimensional conformal surface array as illustrated by FIG. 1F.

Figure 1G:
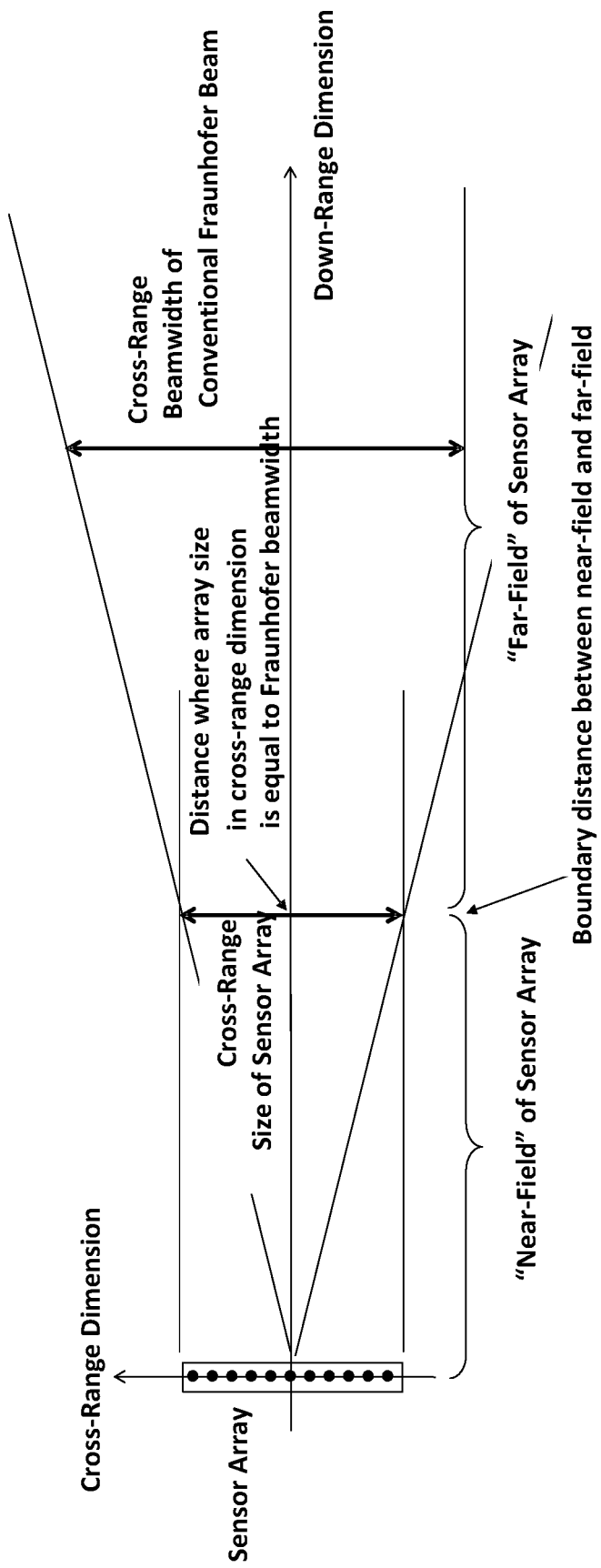
FIG. 1G illustrates definition of near-field and far-field of a sensor array according to one aspect of the disclosed technology.

In the context of the present invention, "near" means a field of view that may be at close distance, including adjacent to, the sensor array. In the context of the present invention, "far" means a field of view that may be at a larger distance. The boundary between "near" and "far" in the context of the present invention, as illustrated in FIG. 1G, is defined as that distance from the sensor array 10 where the beam width of a traditionally formed Fraunhofer plane wave beam is the same size in the cross-range dimension as the cross-range size of the sensor array.

The down-range extent of the field of view of the sensor array 10 may be arbitrarily set or bounded by any finite value. The cross-range (azimuth, elevation, or both) extent of the field of view may be arbitrarily set or bounded by any finite value, but at a minimum, may be at least as large in the cross-range dimension(s) as the cross-range extent of the sensor array 10.

The sensor array 10 may include, but not limited to, wireless communications antenna arrays, radar antenna arrays, seismic antenna arrays, sonar antenna arrays, acoustic antenna arrays and ultrasound antenna arrays. The sensor array 10 may perform one or more of the following: wireless communications sensing, microwave electromagnetic sensing, millimeter wave electromagnetic sensing, radio frequency electromagnetic sensing, lower frequency electromagnetic sensing, very low frequency acoustic sensing, low frequency acoustic sensing, and high/ultrasonic frequency acoustic sensing. Acoustic sensing may occur in air or water.

The system 1 may include a non-transitory computer readable medium 12, a processor 15, and an image display device 20 or an image processing computer 30. The non-transitory computer readable medium 12 may include one or more of the following: a sensor data buffer 40, a reference Fresnel field data buffer 70, a rectilinear spectrum data buffer 80, an angular spectrum data buffer 90, an inverse Huygens-Fresnel transfer data buffer 92 and a sensor wavenumber data buffer 43. The processor 15 may execute one or more of the following: spatial forward discrete Fourier transform 48, reference point determinator 50, a reference Fresnel field generator 60, spatial inverse spatial discrete Fourier transform 62, and Stolt format generator 64.

Figure 1H:
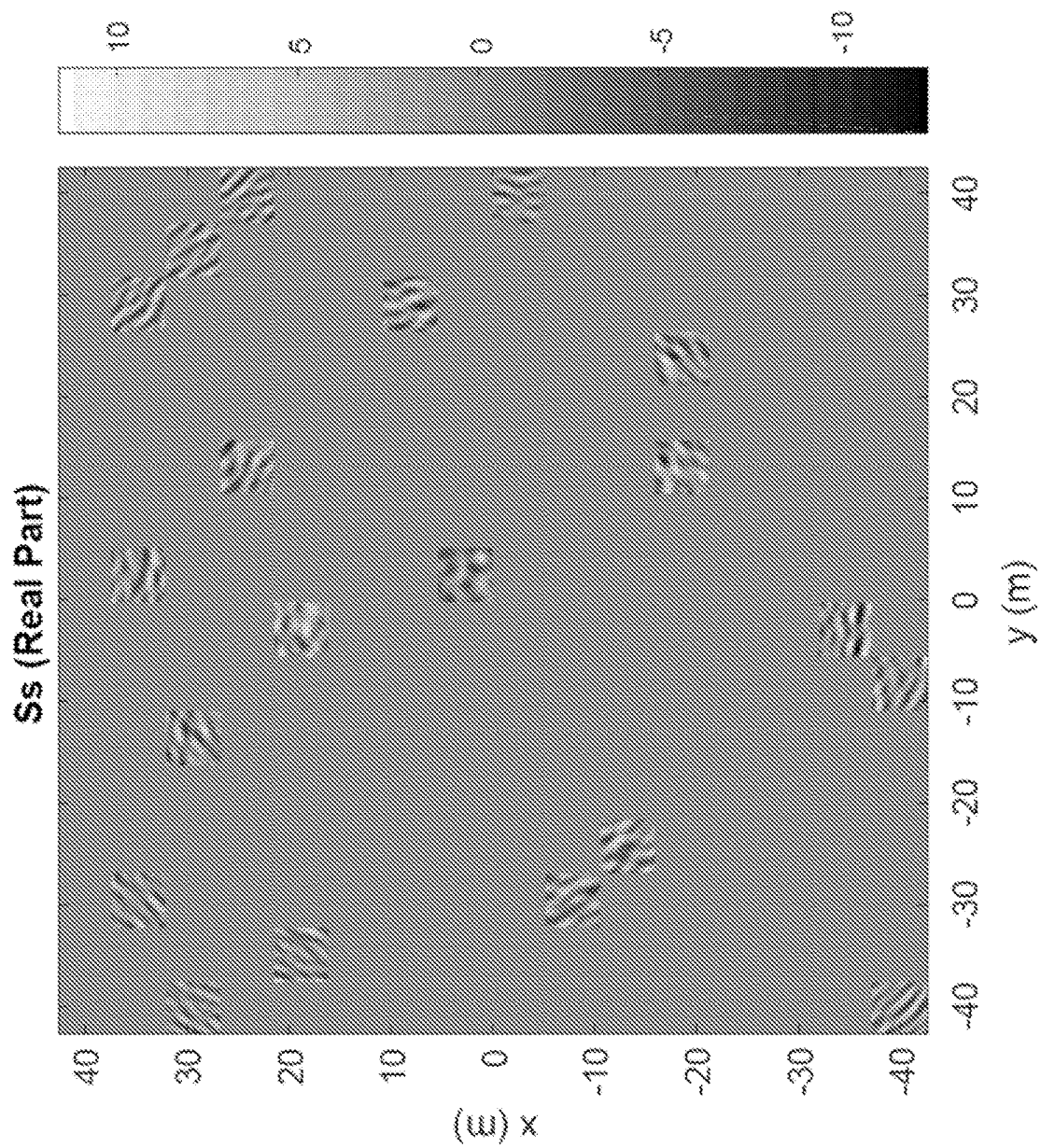
FIG. 1H illustrates the data collected by a swarm of twenty distinct sensor arrays, each with a planar array, according to one aspect of the disclosed technology.
Figure 1:
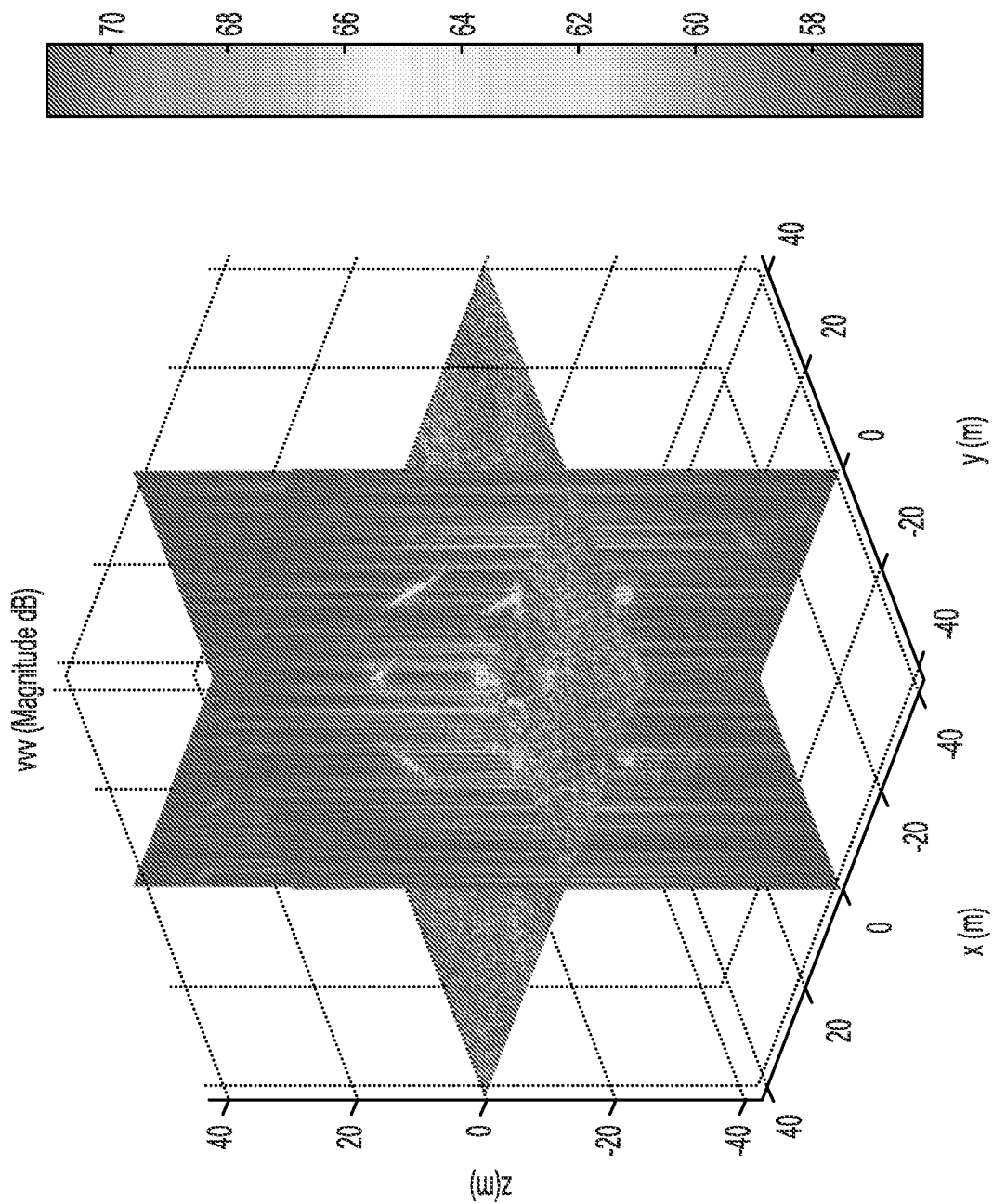
FIG. 1I illustrates the volumetric imagery of a set of nineteen distinct scatterers with data sensed and recorded by a swarm of twenty sensor arrays, each with a planar array, according to one aspect of the disclosed technology.

The processor 15 may integrate data from multiple sensor array positions, obtained by moving a sensor array, or obtained by a system of distinct sensor arrays, either stationary or moving as illustrated in FIG. 1H, where the two-dimensional sensor data array buffers are illustrated for a set of twenty sensor array positions. FIG. 1I illustrates the volumetric imagery produced with the multiple sensor array data of FIG. 1H.

Figure 2:
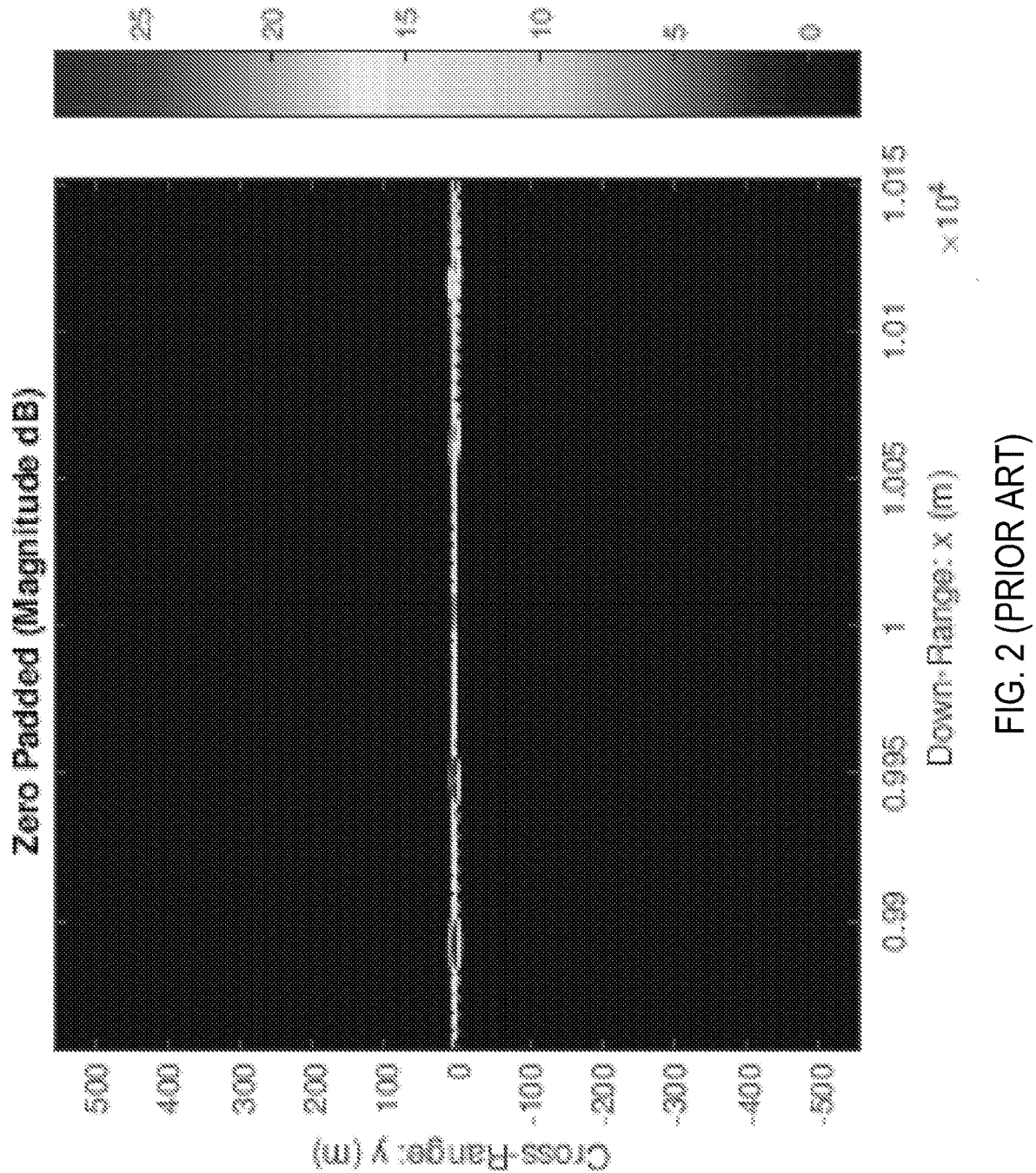
FIG. 2 illustrates Fraunhofer beamforming failure of the prior art to resolve scatterer position in azimuth with transmission of a single pulse waveform.
Figure 3:
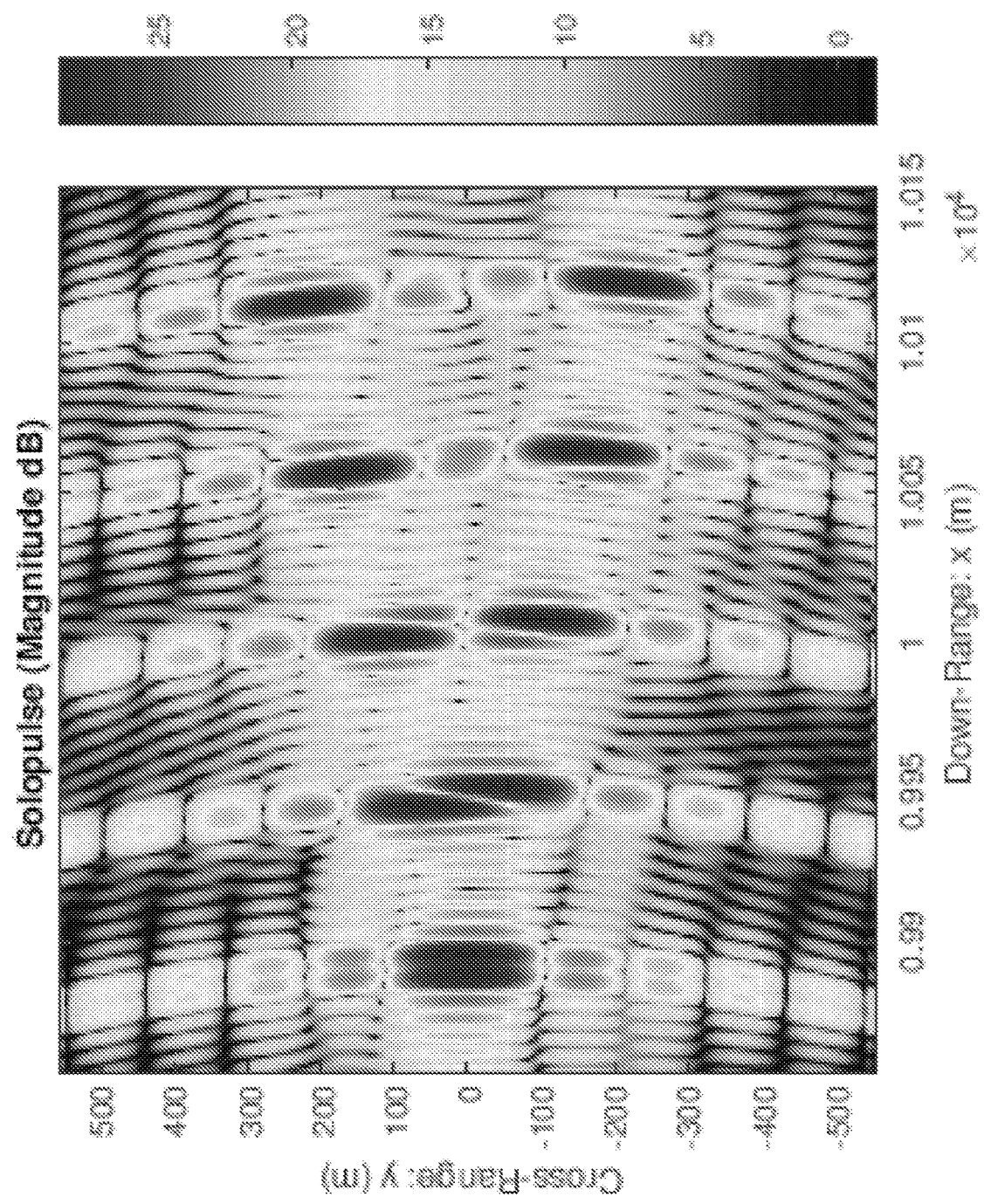
FIG. 3 illustrates a two-dimensional field of view image from the echo of a single pulse according to one aspect of the disclosed technology.

Contrary to traditional technology that produces conventional angle-of-arrival (AoA) parameter estimates or range (only) profiles (see FIG. 2 for an example conventional range profile produced by a single Fraunhofer plane wave beam), the processor 15 may generate a field-of-view image with transmission of a signal waveform and reception of reflected signal echoes. FIG. 3 provides an example field-of-view image produced with the same data set as conventionally used in FIG. 2. The field-of-view image may be displayed in the image display device 20 or the image processing computer 30. FIG. 3 illustrates a two-dimensional (down-range/cross-range) image from the echo of a single pulse with a one-dimensional sensor array. FIG. 3 illustrates an image of a field of view that contains ten point scatterers as distributed in FIG. 4. Scatterers may be descriptive of the contents of the field of view, and may be viewed as localized elements of the scene contents that reflect part of the transmitted signal received from the sensor array 10 back to the sensor array 10. The scatterers as imaged in FIG. 3 are all resolved in range and azimuth by an imaging approach to sensor array data processing. FIG. 2 illustrates conventional range profile of a single Fraunhofer beam of the field of view of FIG. 4 produced by prior art technologies. In the prior art, only the range position of scatterers is recovered and no angle information other than the steer angle of the transmitted/received beam is gathered about scatterer position in azimuth or elevation.

Figure 5:
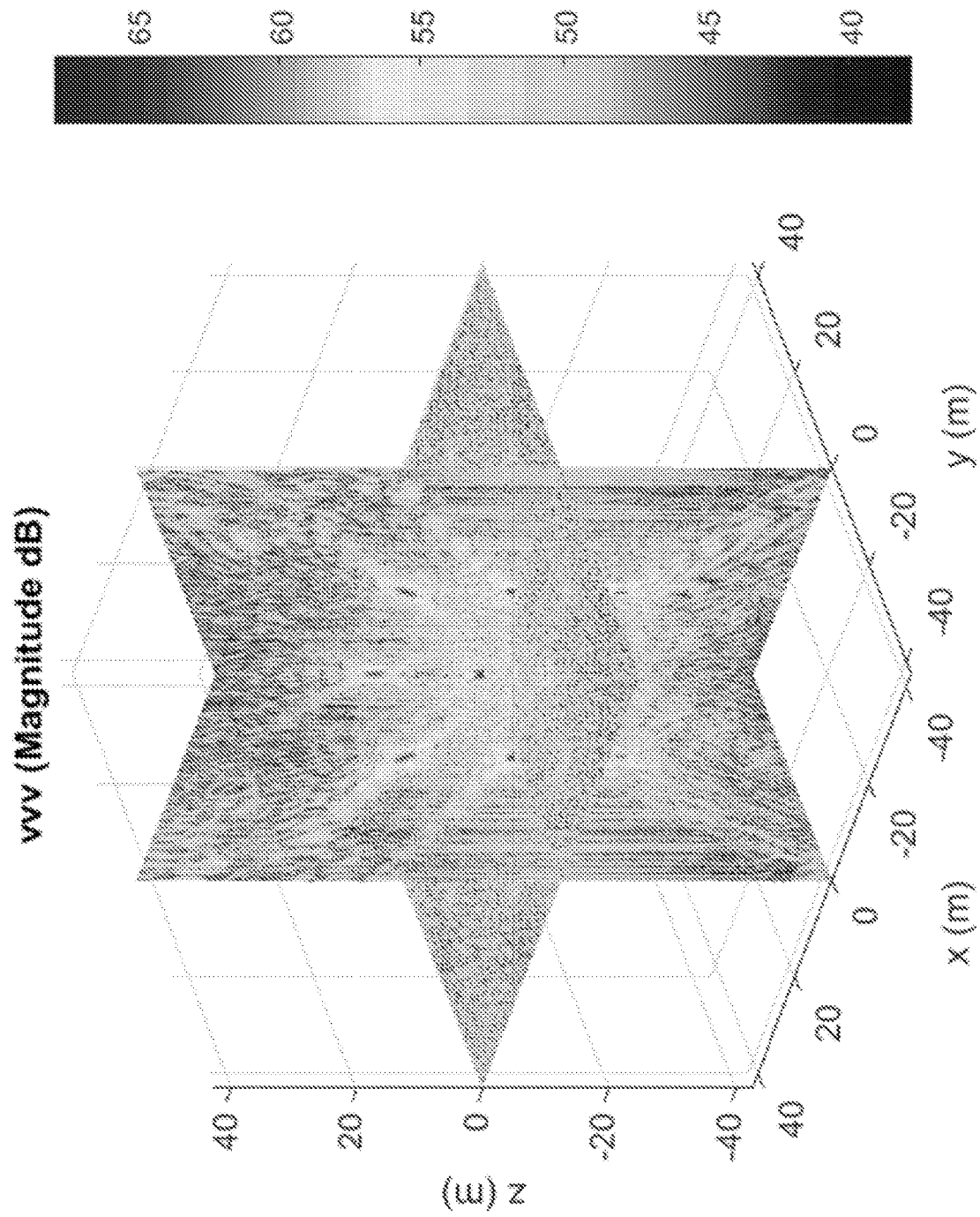
FIG. 5 illustrates a three-dimensional field of view image from the echo of a single pulse according to one aspect of the disclosed technology.
Figure 6B:
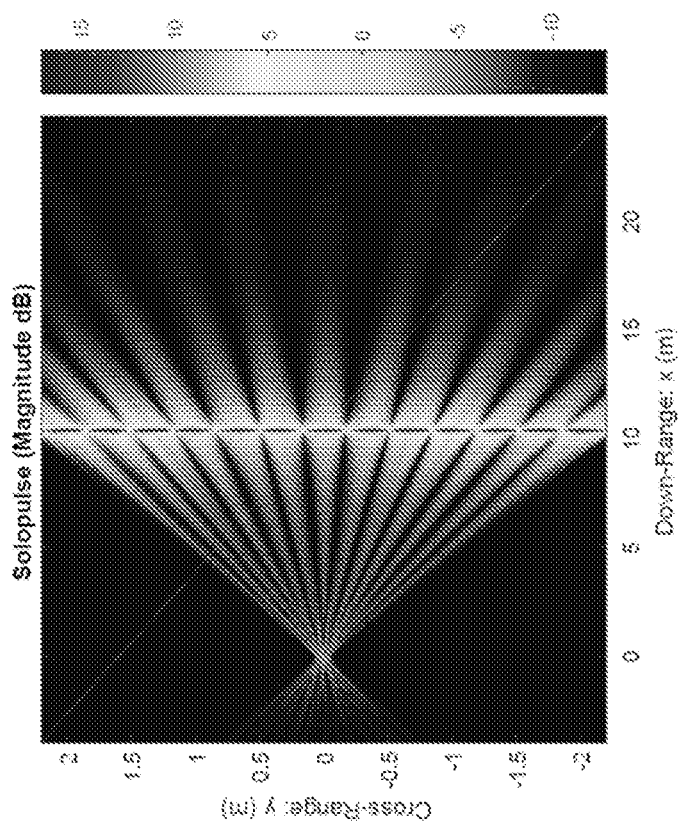
FIG. 6B illustrates the corresponding single pulse field of view image acquired with a stationary sensor array according to one aspect of the disclosed technology.
Figure 6A:
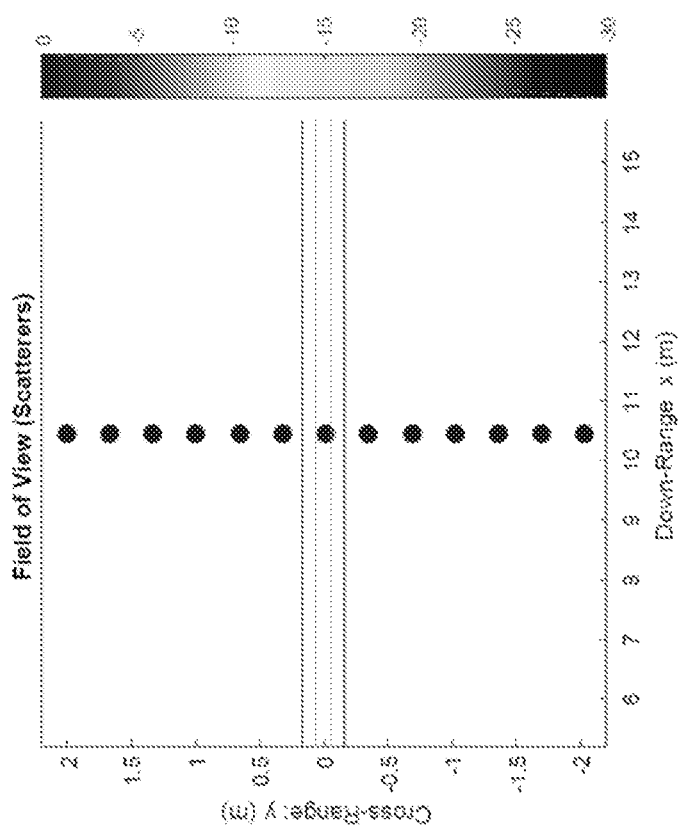
FIG. 6A illustrates a two-dimensional field of view image of a line of point scatterers.
Figure 7B:
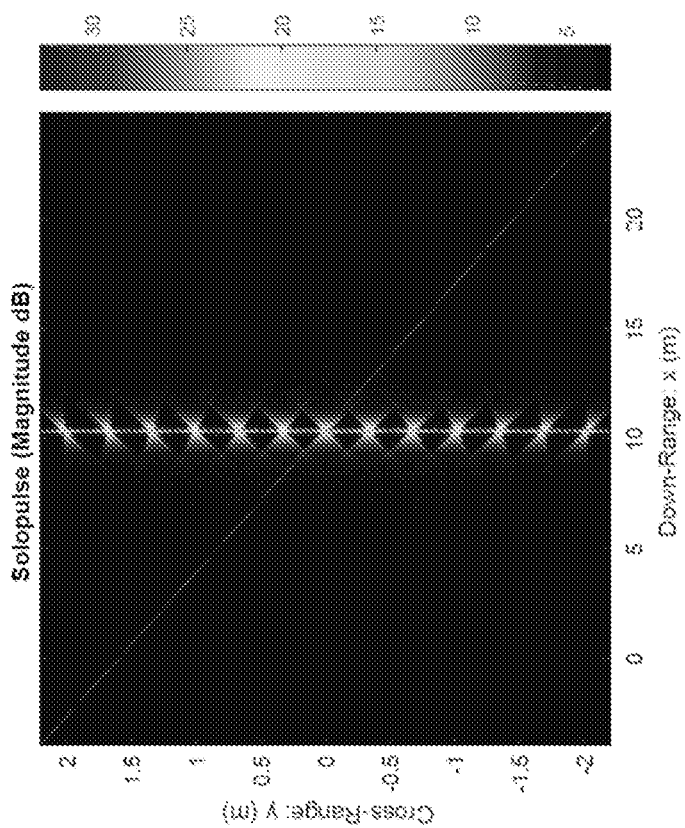
FIG. 7B illustrates an extended multiple pulse dwell field of view image, both achieved with sensor array movement according to one aspect of the disclosed technology.
Figure 7A:
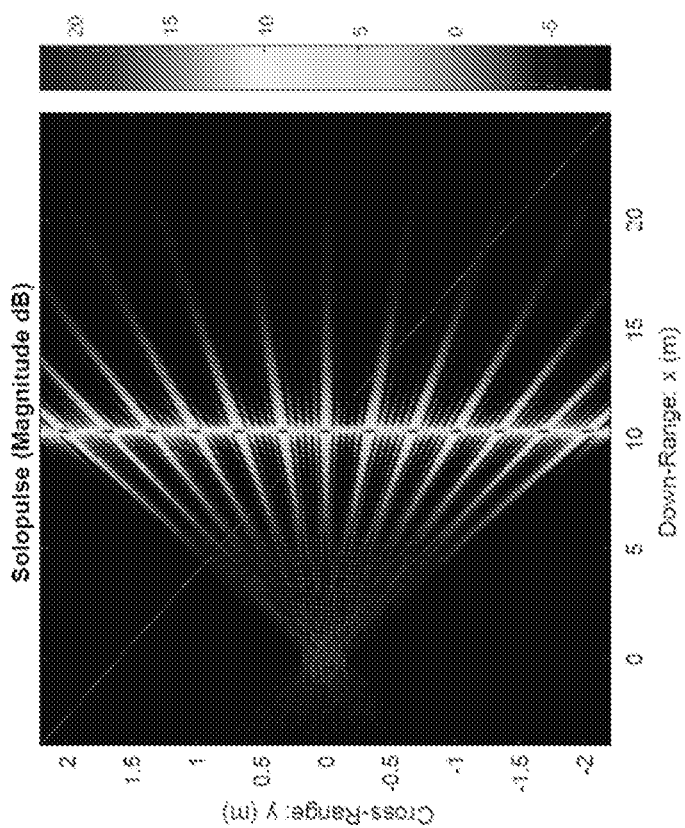
FIG. 7A illustrates a multiple pulse dwell field of view image of the line of scatterers in FIG. 6A.

The field-of-view image may be a volumetric image. FIG. 5 provides an example field-of-view volumetric image produced by the present invention. FIG. 5 illustrates the image of a field of view that contains nineteen discrete scatterers, all scatterer positions are resolved in range, azimuth and elevation, as accomplished by an imaging approach to sensor array data processing. FIG. 5 illustrates a three-dimensional (volumetric) image from the echo of a single pulse with a two-dimensional sensor array. FIG. 5 illustrates a three dimensional point spread function (PSF) of the imaging device. A point spread function may be descriptive of the quality of the focusing of the imagery formed by the system 1 for a single point scatterer. If the field of view contains multiple scatterers typical of a real environment, the resulting images may be more lifelike. For example, FIG. 6A shows a set of scatterers that may result from a line of lamp posts, or fence posts, or other possibilities where a set of disjoint scatterers are configured in a line. FIG. 6B shows an example two dimensional field of view image displayed on the image display device 20 of these lamp posts, etc, obtained with a single transmitted pulse. The field of view of FIGS. 6A-B has been significantly extended in the cross-range dimension beyond the traditional beamwidth and array size, which are illustrated by the horizontal lines of FIG. 6A. FIGS. 7A-B also show an example image displayed on the image display device 20 based on transmission of a single pulse. FIG. 7A shows the refinement of the point spread function that comes from a multiple pulse dwell and movement of the sensor array. FIG. 7B shows the further refinement achieved by extending the multiple pulse dwell with additional pulses and with additional sensor movement.

Depending on the position of the within-scene reference point of FIG. 1B, the field of view image may be positioned either near or far from the sensor array 10, including adjacent to the sensor array 10. In the context of the present invention, "near" means a field of view that may be within the "near-field" distance range as illustrated in FIG. 1G; whereas "far" means a field of view that may be within the "far-field" distance range as illustrated in FIG. 1G. The boundary between "near-field" and "far-field" in the context of the present invention, as illustrated in FIG. 1G, is defined as that distance from the sensor array where the beam width of a traditionally formed Fraunhofer plane wave beam is the same size in the cross-range dimension as the cross-range size of the sensor array.

Figure 8:
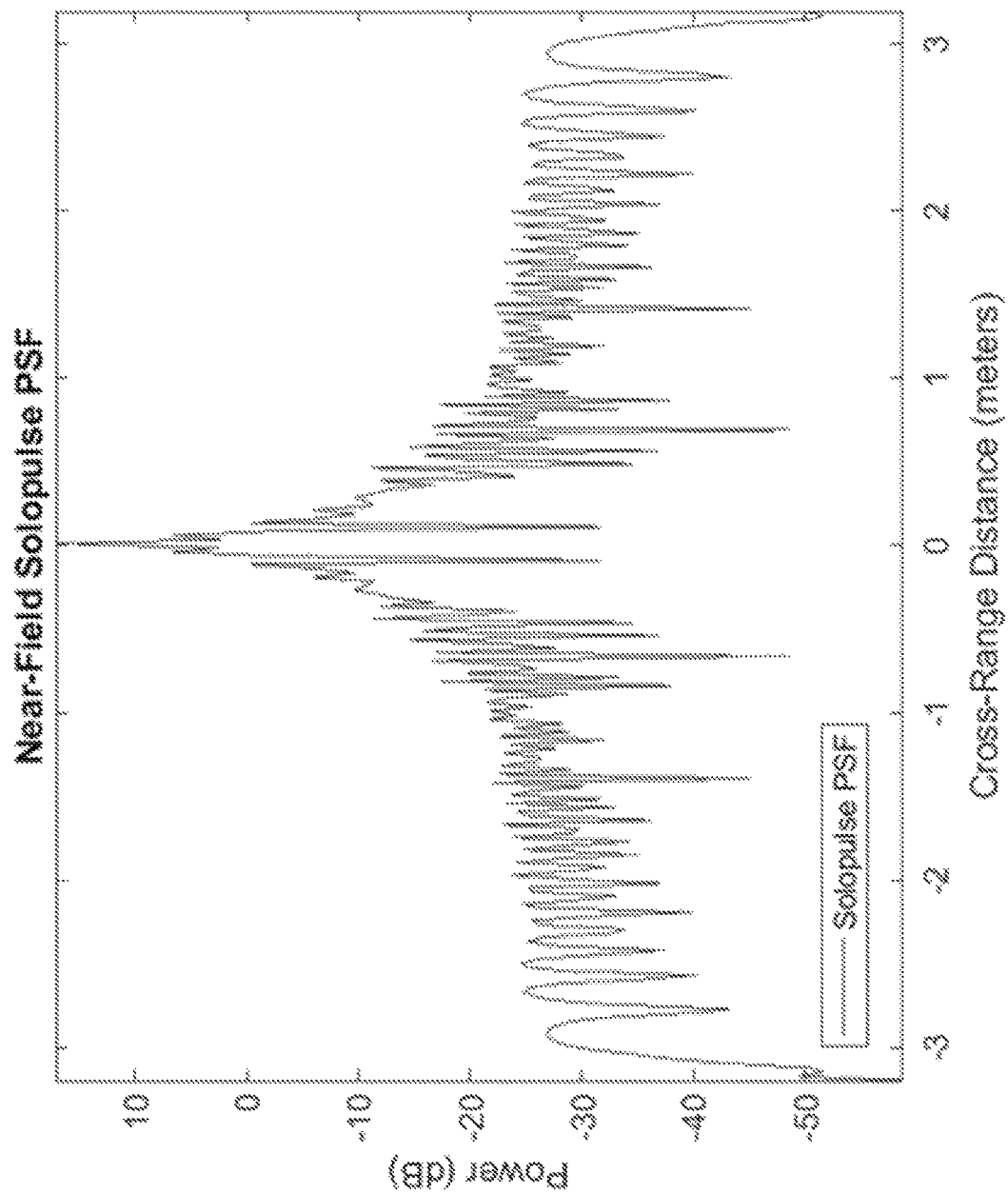
FIG. 8 illustrates an image (one-dimensional) of a field of view that is relatively near the sensor array according to one aspect of the disclosed technology.
Figure 9:
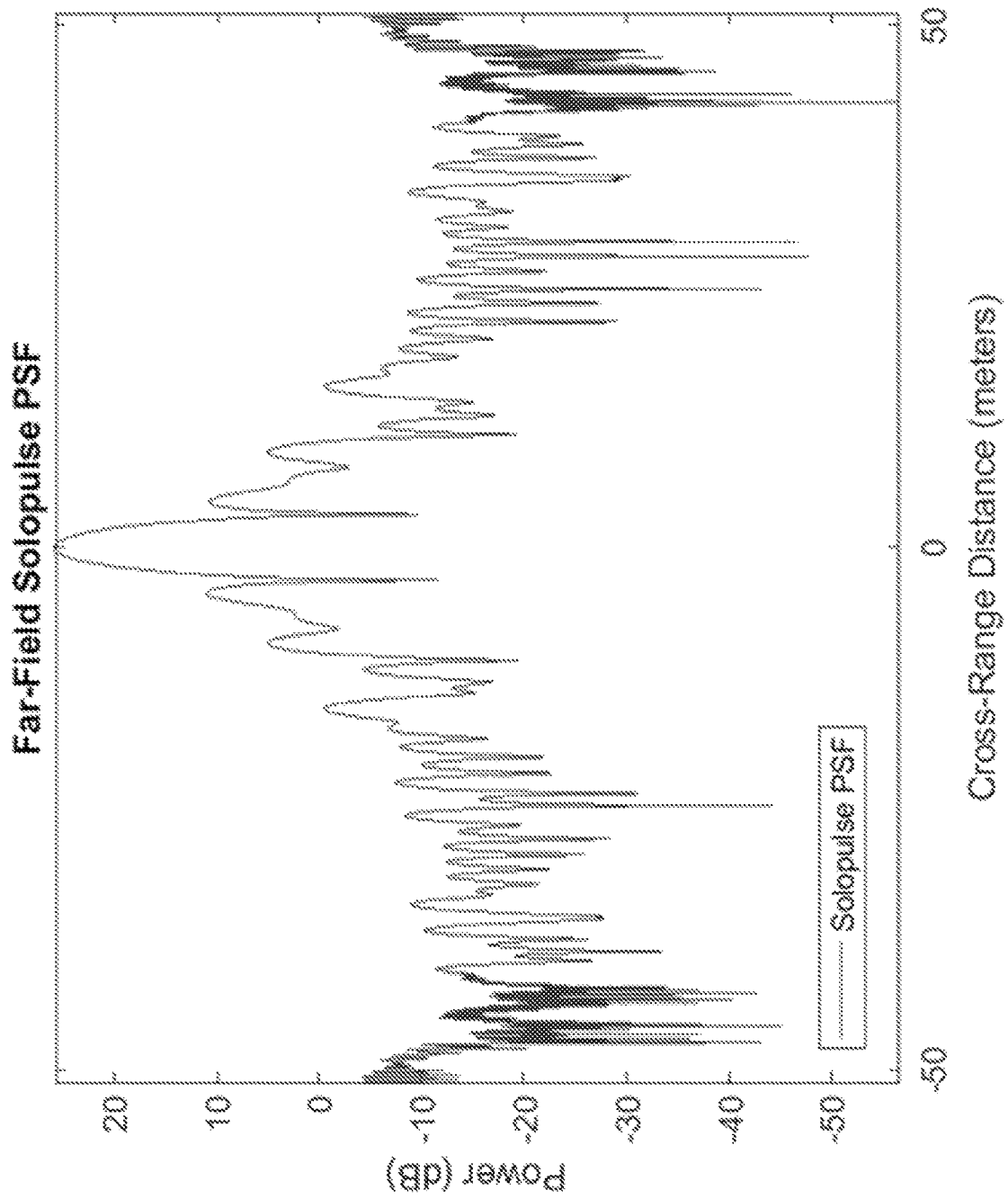
FIG. 9 illustrates an image (one-dimensional) of a field of view that is relatively far from the sensor array according to one aspect of the disclosed technology.

Depending on the configuration of the sensor array 10 and processing options of the system 1, the field-of-view image may be one-dimensional. FIG. 8 provides an example one-dimensional image of a field of view near the sensor array. FIG. 9 provides an example one-dimensional image of a field of view relatively far from the sensor array. The field-of-view image may be two-dimensional, such as provided by an image array of pixels. FIG. 3 provides an example two-dimensional field-of-view image. The field-of-view image may be three-dimensional, such as a voxel based three-dimensional image array. FIG. 5 provides an example three-dimensional field-of-view image. FIGS. 3, 5 and 8-9 each contain one or more point scatterers within the field of view.

Figure 10:
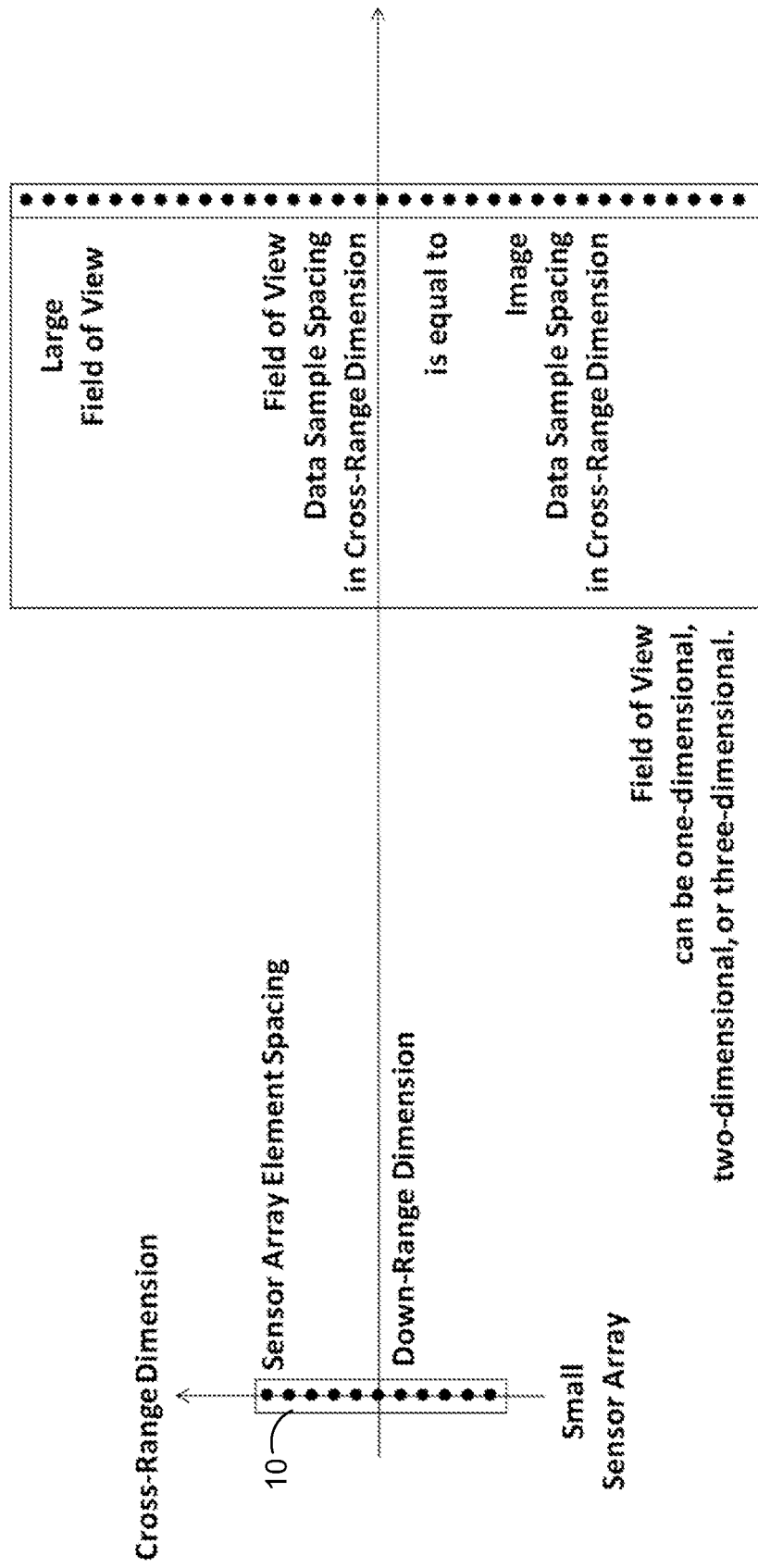
FIG. 10 illustrates sensor array element spacing and field of view predefined data sample spacing according to one aspect of the disclosed technology.

In one embodiment, with reference to FIG. 10, the field-of-view image may be associated with a predefined image sample (pixel/voxel) spacing in any dimension. The predefined sample spacing of the field-of-view image in the dimension aligned with the sensor array 10 may be proportional to, including possibly equal to, a predefined spacing between the sensor elements of the sensor array 10. This means that a physical distance between two adjacent pixels in an image (the associated points in the field of view) is proportional to, including possibly equal to, a physical distance between two sensor elements in the physical environment of the sensor array. For example, the predefined spacing between the sensor elements may be set to one half of the wavelength of a transmitted sinusoidal waveform; and likewise, the predefined distance of the image sample spacing may also be set to one half of the wavelength of this signal. In FIG. 10, each black dot in the sensor array 10 may represent a sensor element, and the space between the black dots represent the spacing between the sensor elements. In FIG. 10, each black dot on the right side may represent the points of image pixels in the image sample (pixel/voxel) array constructed by the processor 15. Each pixel may be associated with a location in the physical environment of the field of view. If the image of the field of view is one-dimensional, the black dots represent data sample positions on a line. If the image of the field of view is two-dimensional, then the black dots represent pixel locations in the image and their corresponding locations within the field of view. If the image of the field of view is three-dimensional, then the black dots represent voxel locations in the image and their corresponding locations within the three-dimensional field of view. With continued reference to FIG. 10, a total number of pixels that span a cross-range extent of the field of view image may be equal to or be greater than a total number of sensor elements in the sensor array 10. "Cross-range" may refer to directions orthogonal (e.g., azimuth, elevation) to a line that connects the position of the sensor array 10 and the nominal center position of the field of view.

In one embodiment, the sensor array 10 may include a stationary sensor array. Alternatively, the processor 15 may command movement of the sensor array 10 and collect data from echoes of single pulses at each position along a sensor movement path, thereby gathering a multiplicity of echoes from multiple pulses, in order to more quickly (compared to conventional SAR processing methods) improve the cross-range resolution achieved within the field of view image to a value proportional to the cross-range size of the sensor array 10. The processor 15 may further collect data from a larger number of pulses and a longer sensor movement path, or from a moving field of view (as is done in conventional "inverse SAR" systems), in order to improve the cross-range resolution to a value proportional to the transmitted signal wavelength as illustrated in FIGS. 6-7.

Figure 11A:
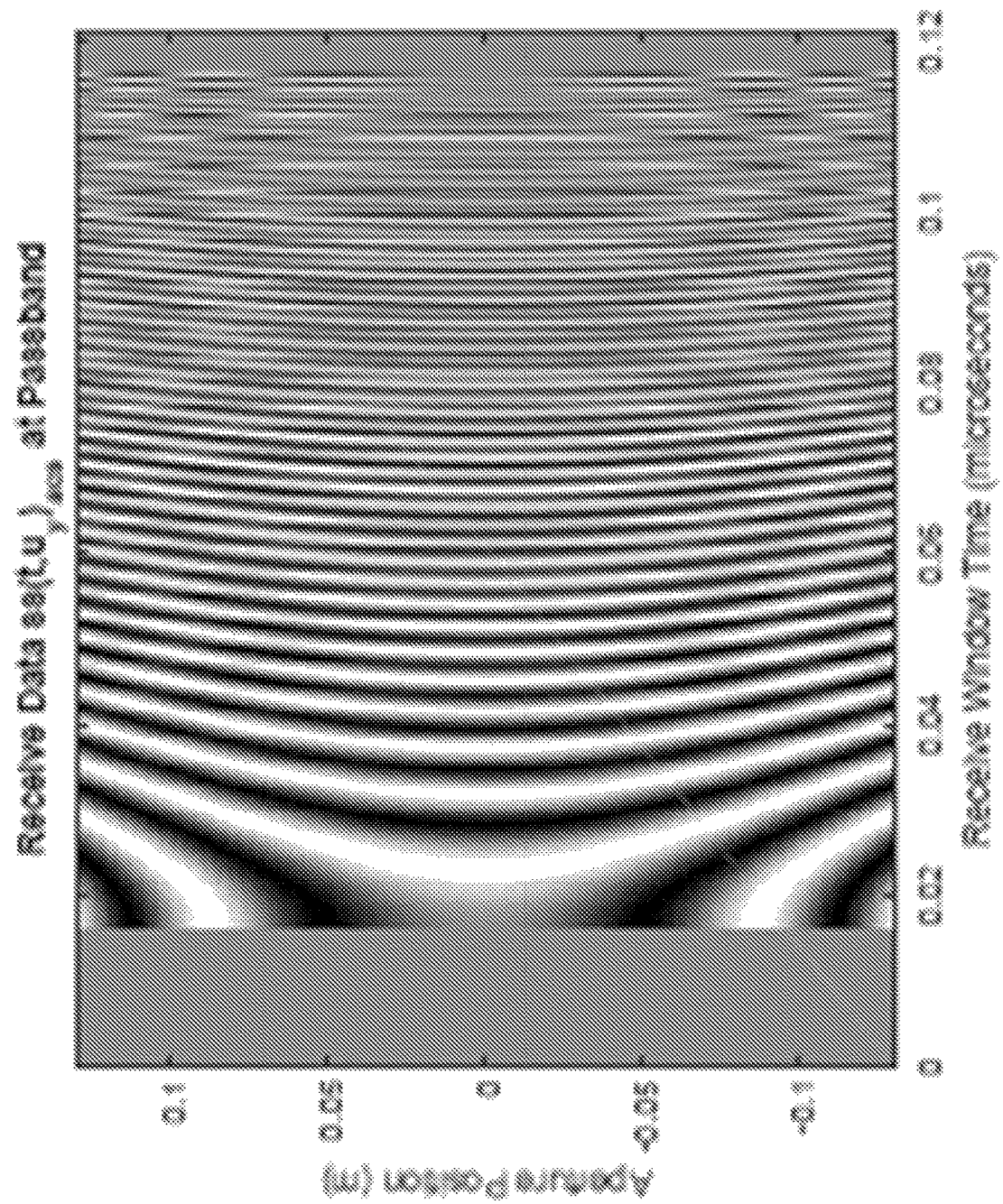
FIGS. 11A-C illustrate example sensor array data for near, midrange and far ranges according to one aspect of the disclosed technology.
Figure 11B:
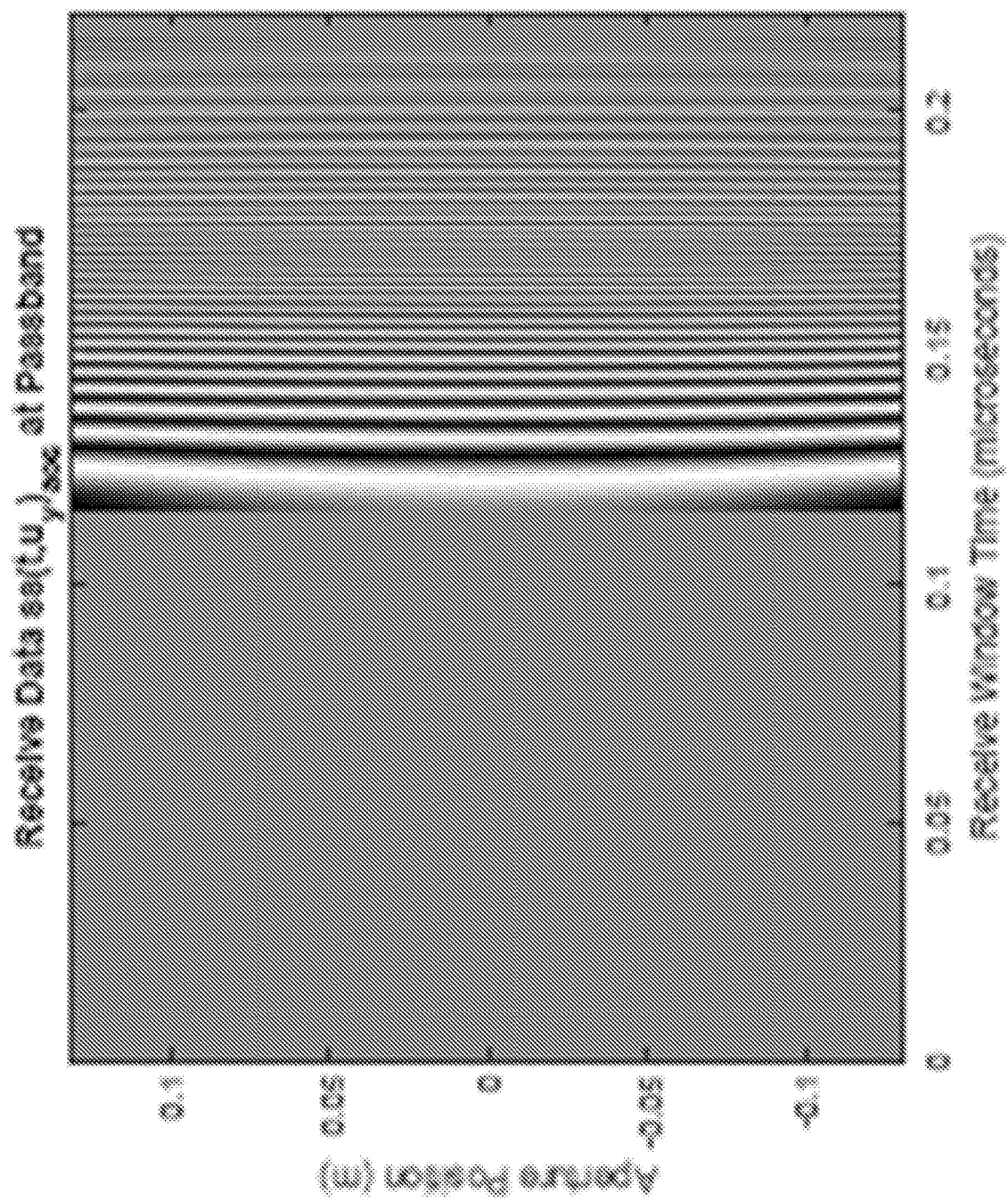
Figure 11C:
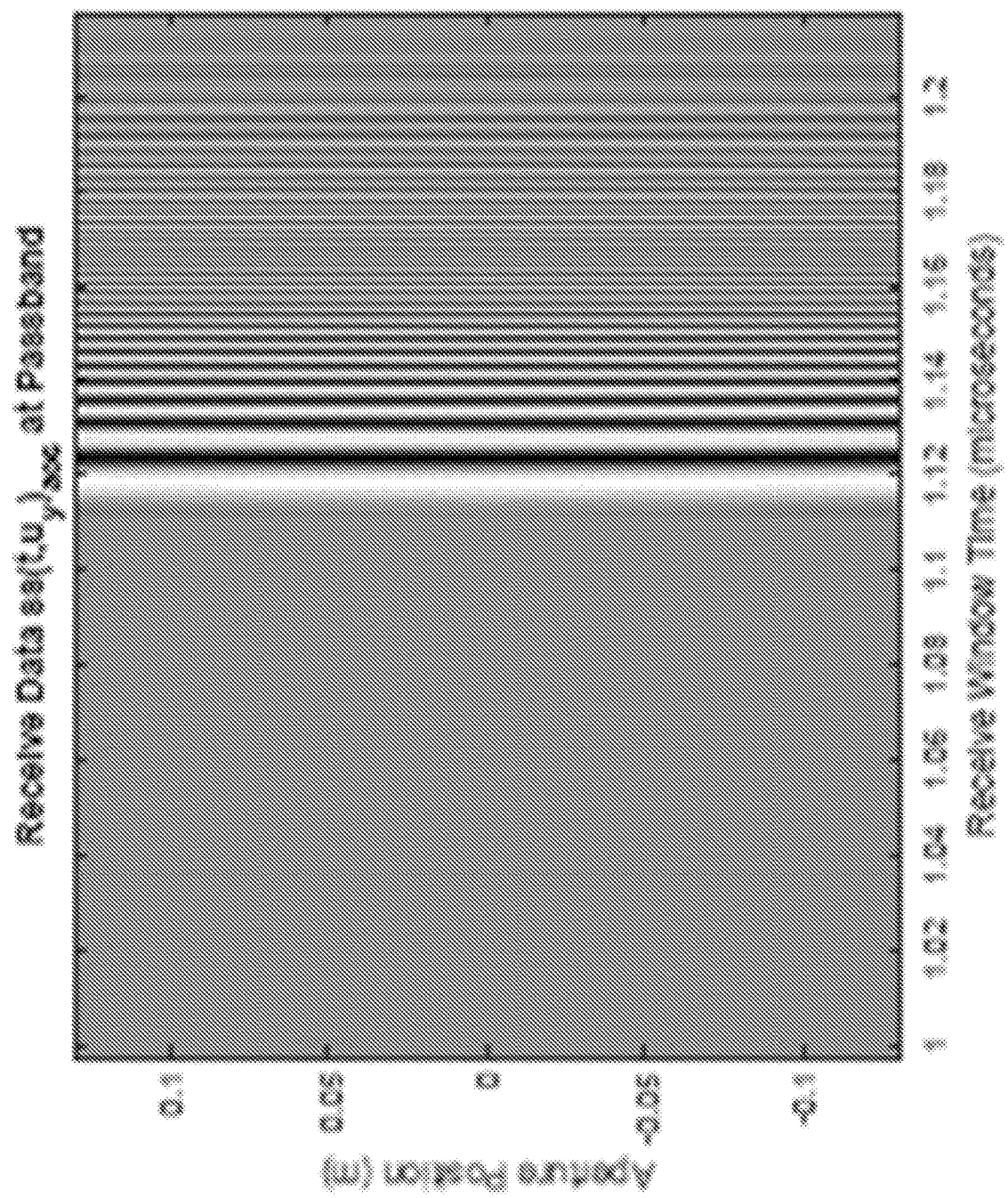
Figure 12A:
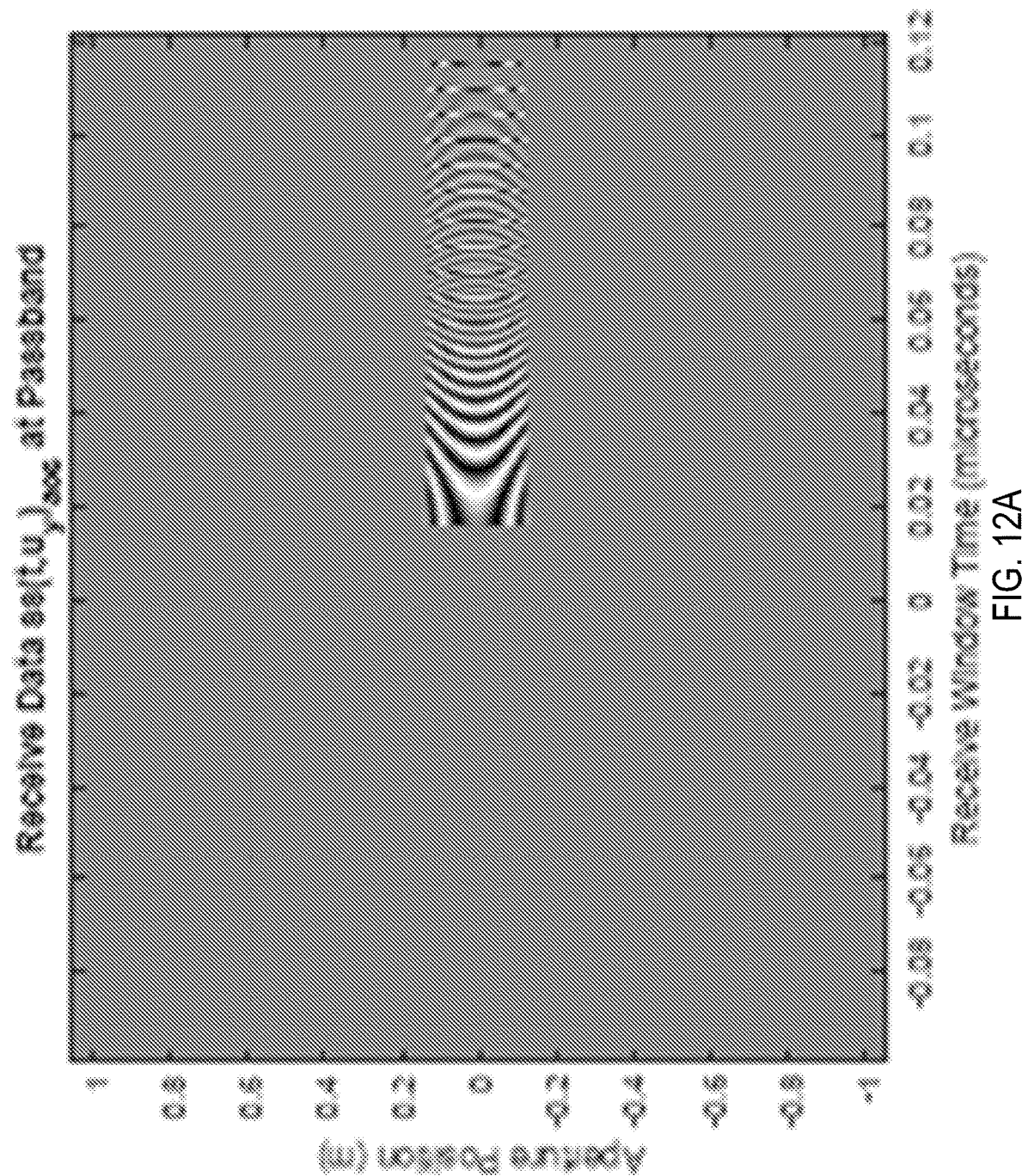
FIGS. 12A-C illustrate example zero-padded sensor array data for near, midrange and far ranges according to one aspect of the disclosed technology.
Figure 12B:
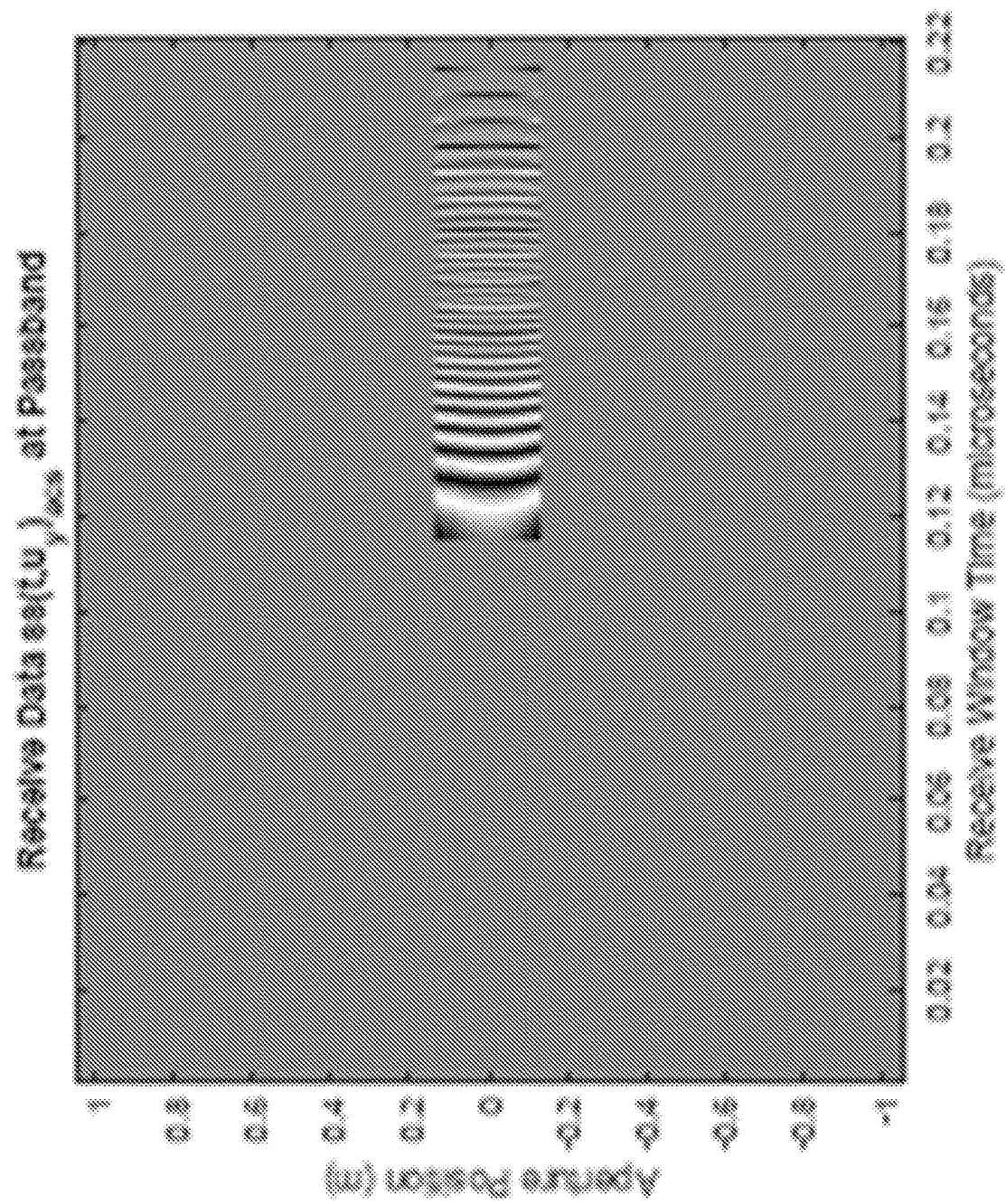
Figure 12C:
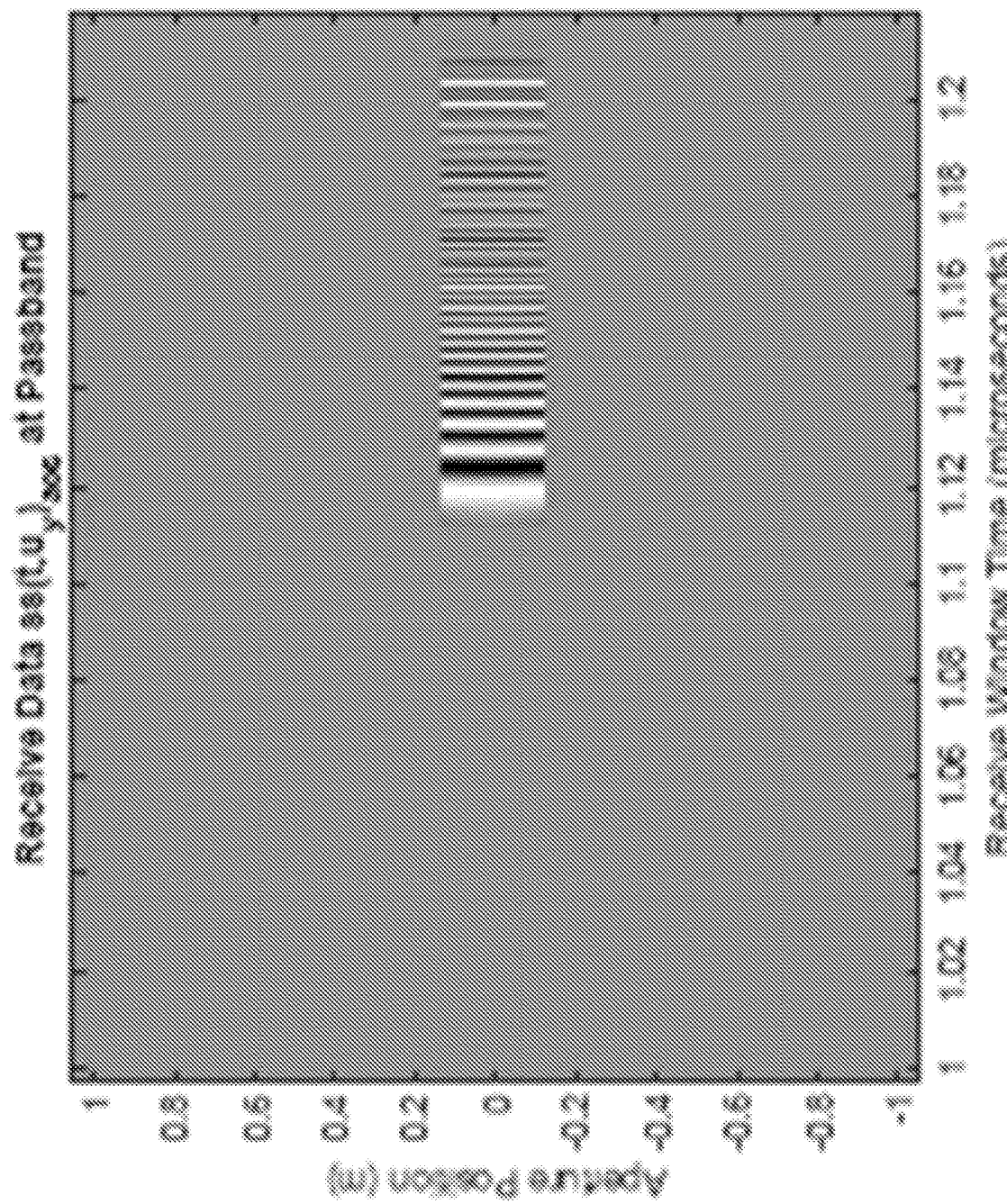

The system 1 may include the sensor data buffer 40 for receiving sensor element data from the sensor array 10. Example sensor data buffer 40 contents are illustrated in FIG. 11A-C, where example sensor array data collected at near-range, medium-range and far-range distances from the sensor array 10 are illustrated. The processor 15 may perform zero padding on the received sensor element data. Example zero-padded sensor data buffer 40 are illustrated in FIG. 12A-C, where example sensor array data are collected at near-range, medium-range and far-range distance from the sensor array 10 with a partial zero-pad on each side of the sensor array data. The total size of the zero-pad may be equal to the size of the number of samples in the field-of-view image minus the size (number of sensor elements) of the sensor array. If the sensor array size (number of sensor elements) and the field of view image size (number of image samples) are the same, then the zero pad may not be required. The minimum size of the field of view may be set to the size of the sensor array 10.

Figure 13A:
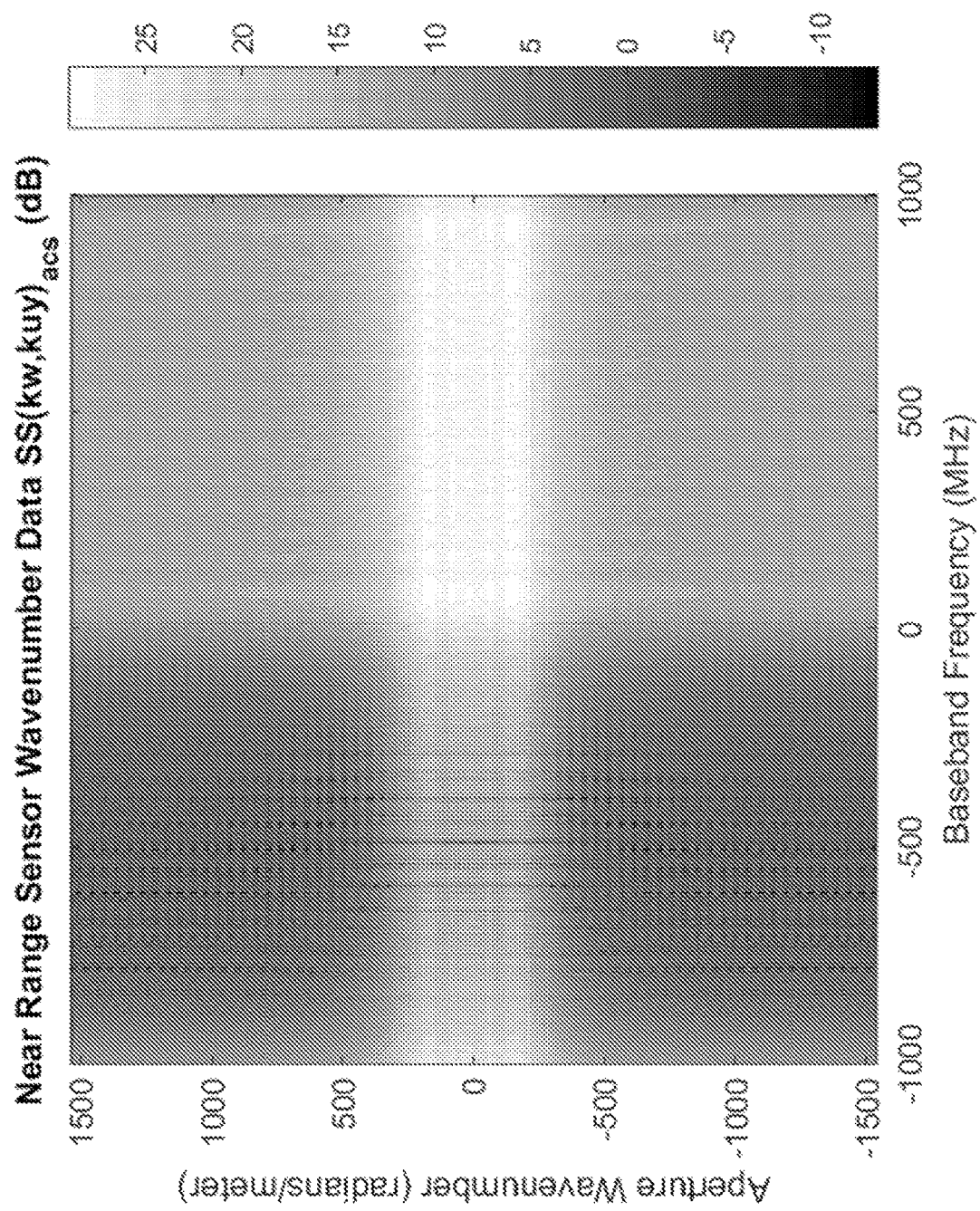
FIGS. 13A-C illustrate sensor wavenumber data buffer contents for near-range, midrange and far-range fields of views according to one aspect of the disclosed technology.
Figure 13B:
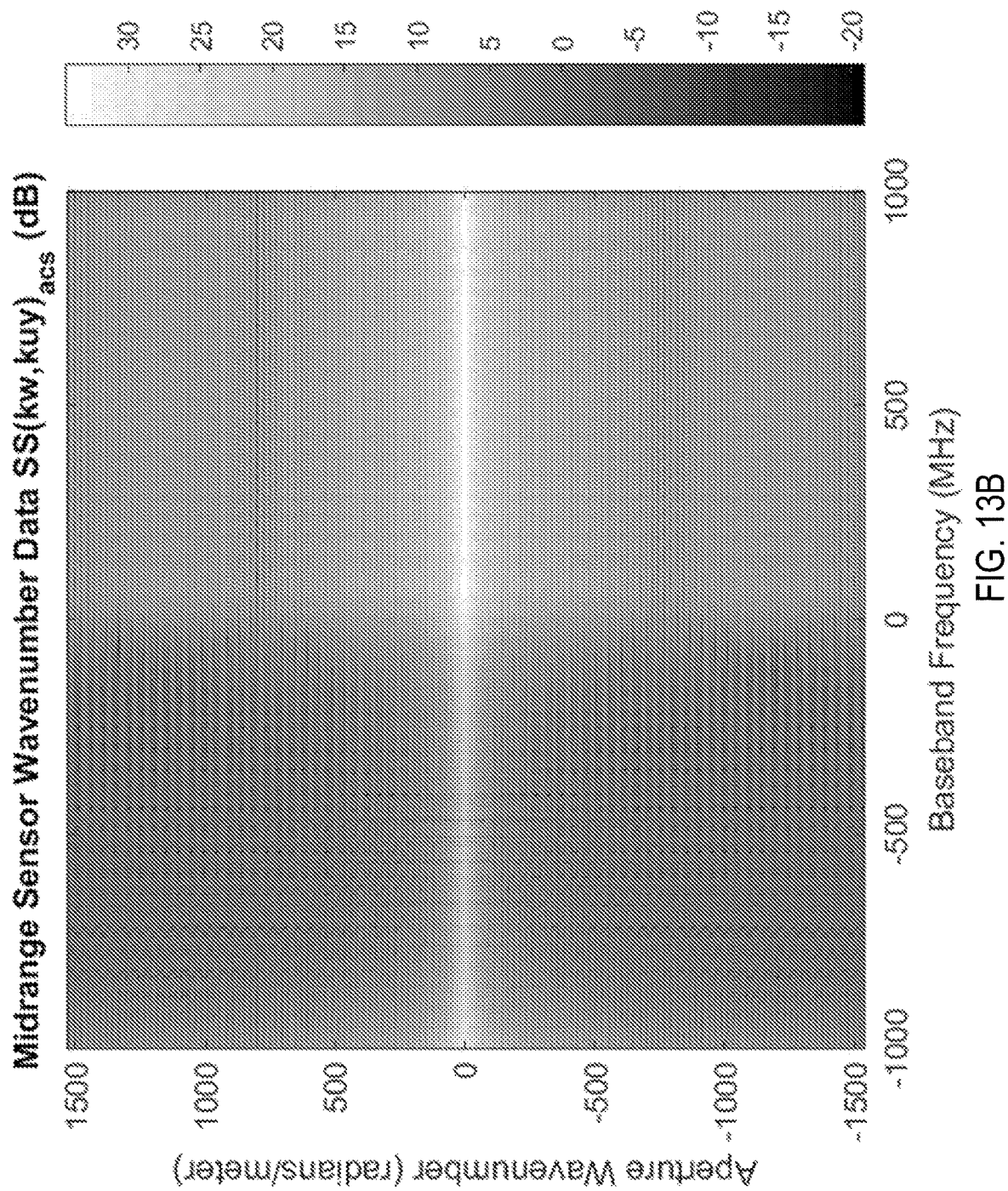
Figure 13C:
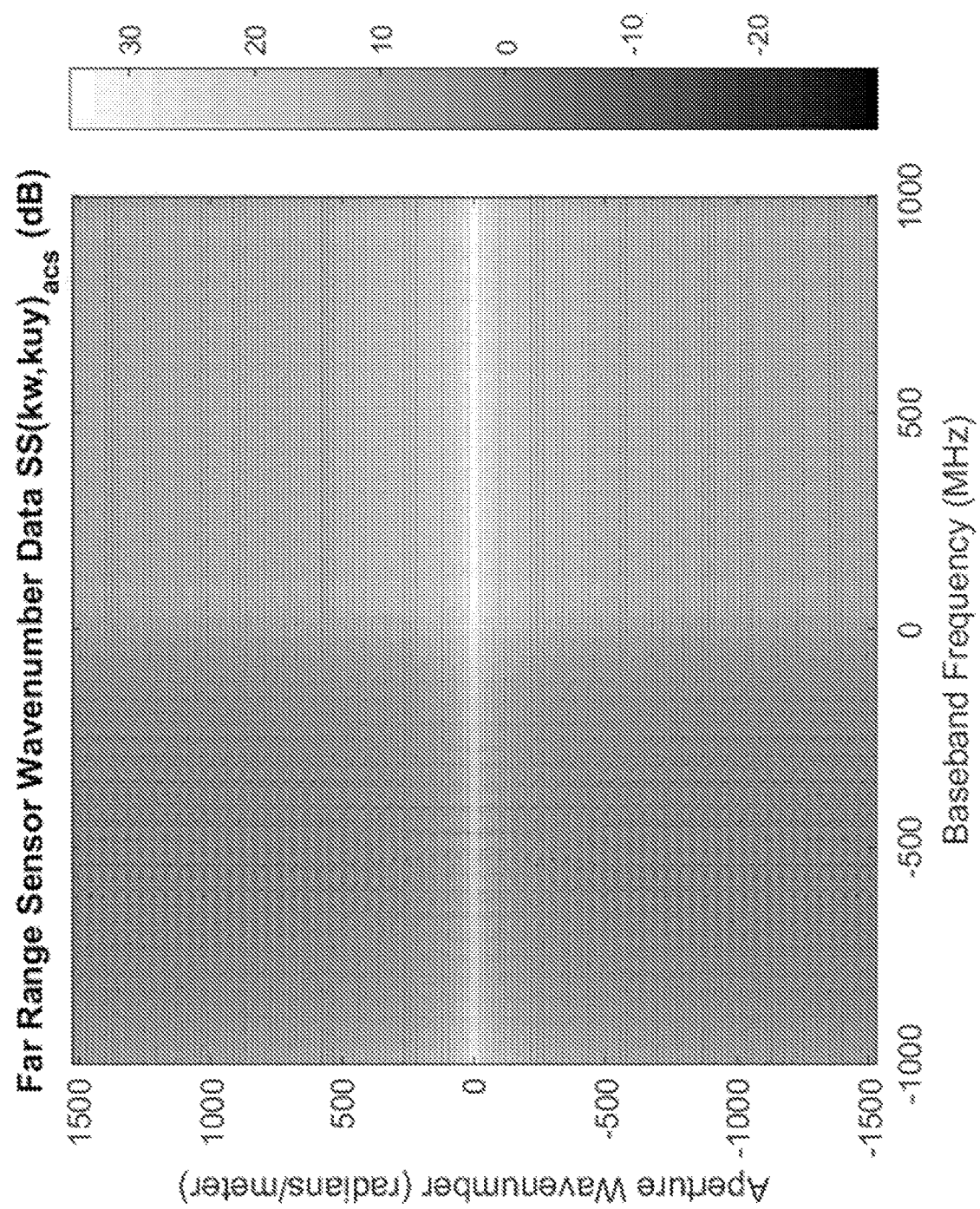

The processor 15 may perform a temporal discrete Fourier transformation on the sensor data buffer 40 and a spatial discrete Fourier transform on the sensor data buffer 40 to convert zero-padded temporal-spatial data received by the senor array 10 into the frequency-wavenumber domain. The frequency-wavenumber domain are data placed into the sensor wavenumber buffer 43. Example sensor wavenumber data buffer 43 contents are illustrated in FIG. 13A-C, where example sensor wavenumber data processed for near-range, medium-range and far-range distances from the sensor array 10 are illustrated.

The processor 15 may perform conventional waveform pulse compression, as typically done in radar systems, by multiplication of the sensor wavenumber data buffer 43 data by multiplication with the spectral data of a pulse compression matched filter designed in accordance with the transmitted waveform. The processor 15 may perform pulse compression matched filtering, if required, by multiplication of the matched filter spectrum and the sensor wavenumber buffer data;

The processor 15 may determine a spatial reference point for the sensor array 10 and a spatial reference point for the field of view. These spatial reference points identify the locations of the sensor array 10 and the field of view. For example, the processor 15 may execute a reference point determinator 50 and also execute a reference Fresnel field generator 60. The reference point determinator 50 may determine a spatial reference point that identifies a nominal center point location of the sensor array 10. The reference point determinator 50, as executed by the processor 15, may also determine a spatial reference point that identifies a nominal center point location of the field of view. The spatial reference points of both the field of view and the sensor array 10 may be determined by position determination and motion compensation systems as typically used in airborne or spaceborne synthetic array radar systems.

Figure 14:
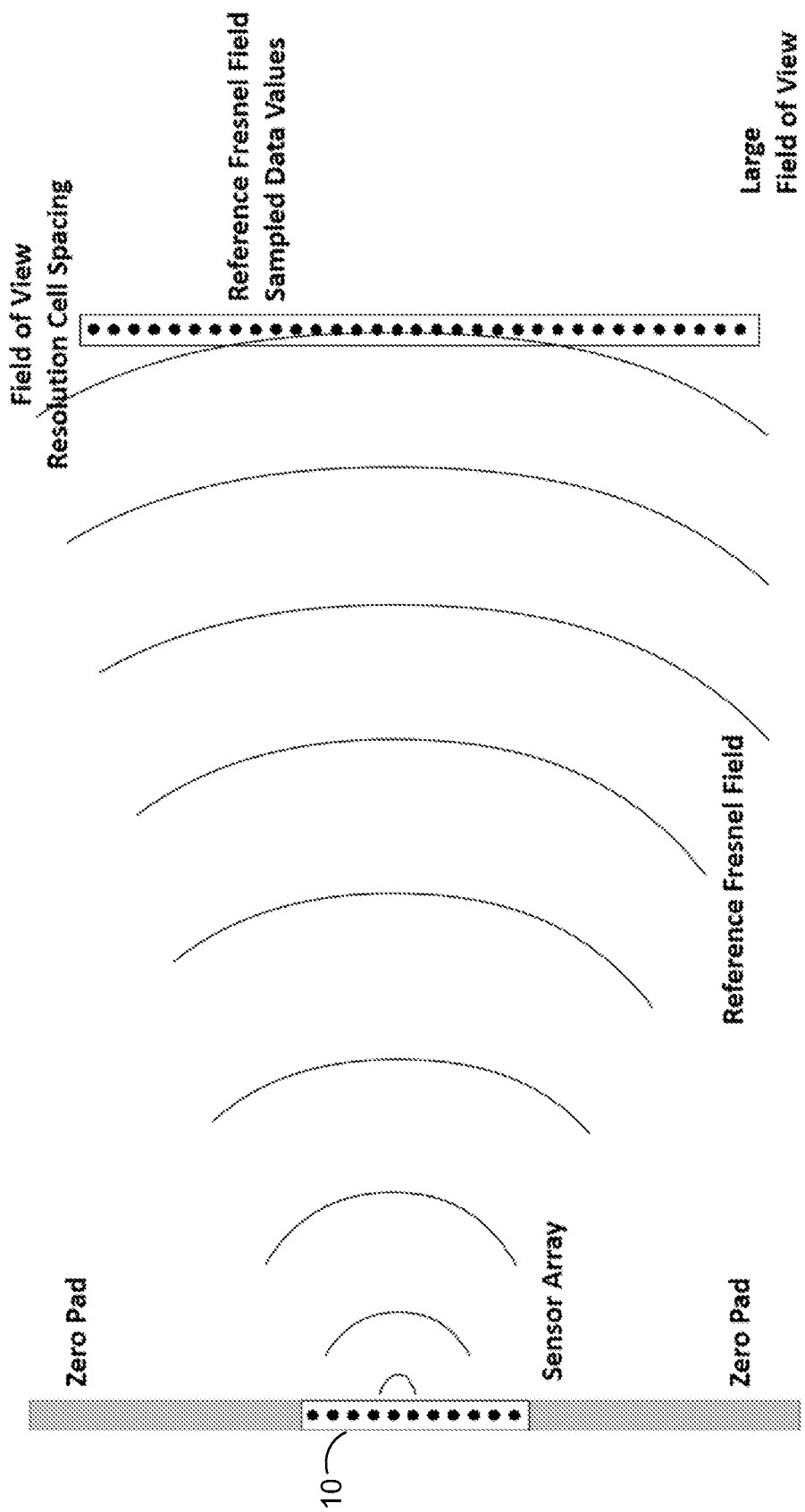
FIG. 14 illustrates a reference Fresnel field according to one aspect of the disclosed technology.
Figure 15B:
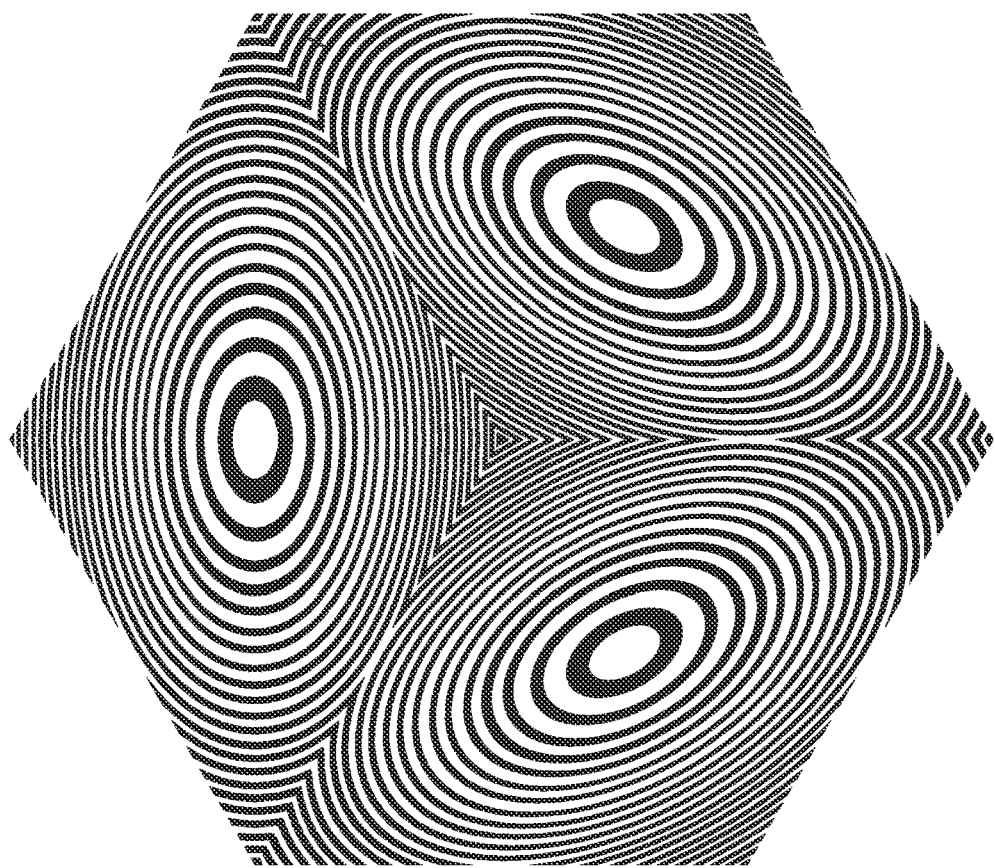
FIG. 15B illustrates an example reference Fresnel field presented in a three-dimensional format according to one aspect of the disclosed technology.
Figure 15A:
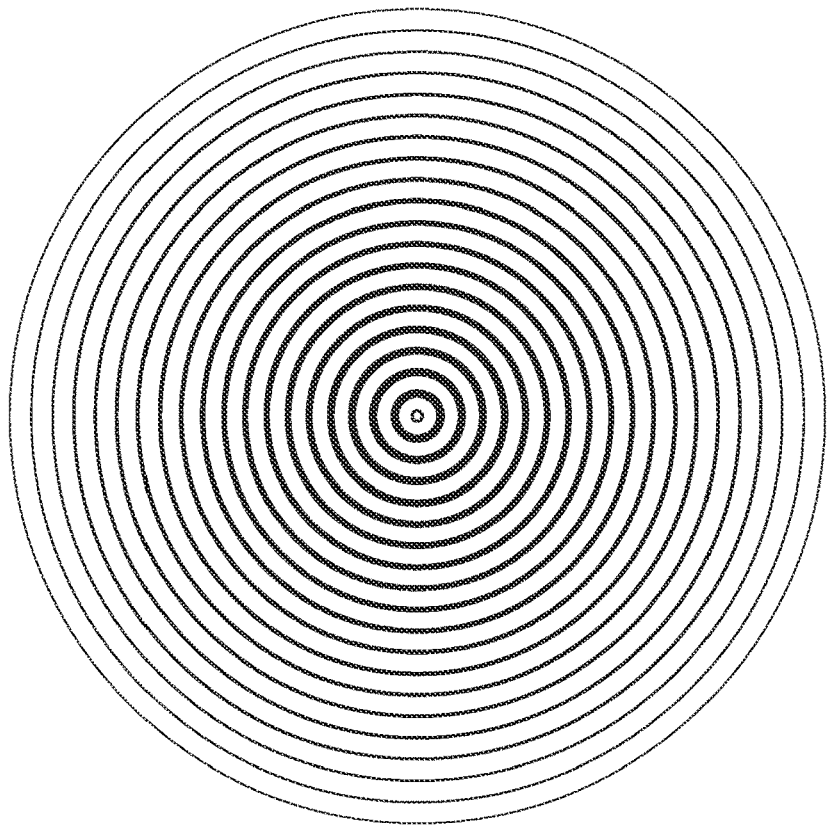
FIG. 15A illustrates an example reference Fresnel field presented in a two-dimensional format according to one aspect of the disclosed technology.
Figure 16:
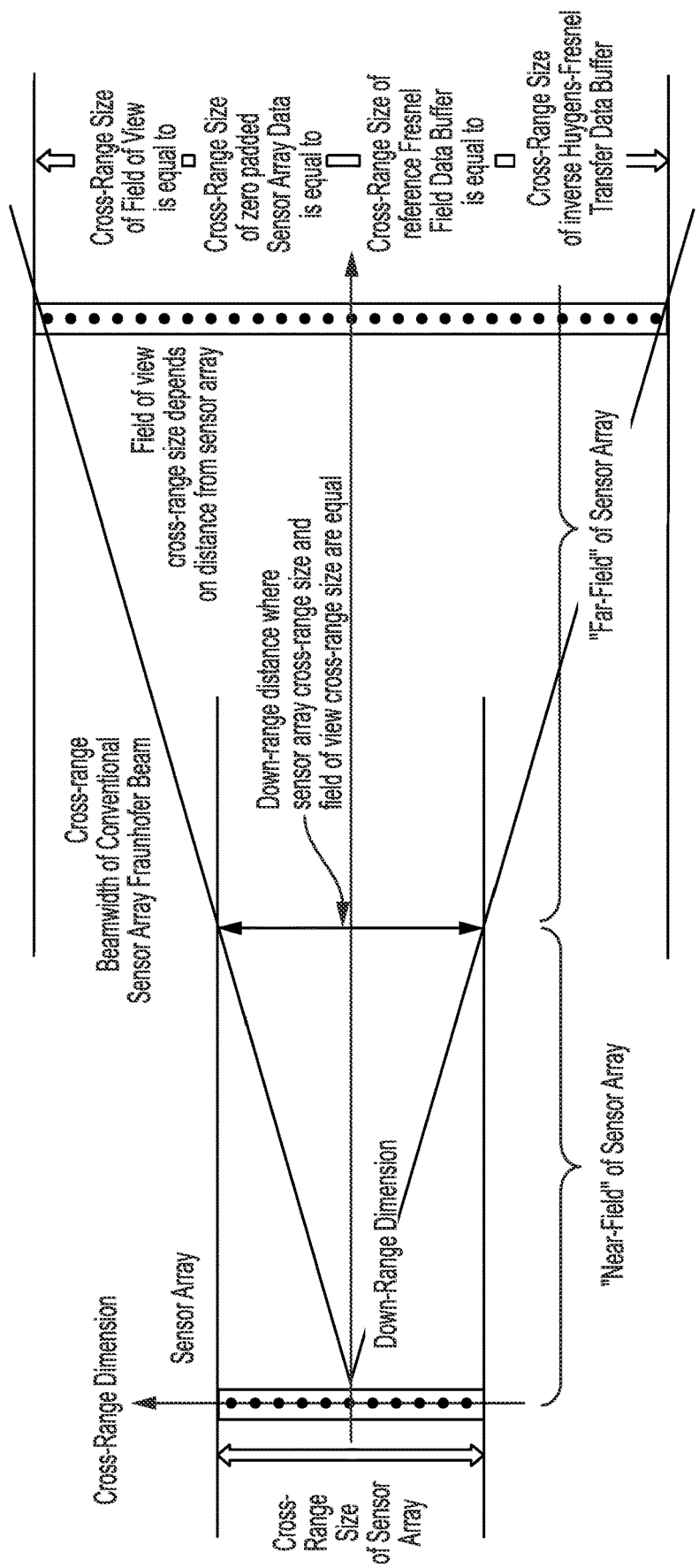
FIG. 16 illustrates the definition of cross-range sizes of sensor array, zero-padded sensor array data buffer, expanded field of view, reference Fresnel field data buffer, forward Huygens-Fresnel transfer function and inverse Huygens-Fresnel transfer data buffer according to one aspect of the disclosed technology.
Figure 17A:
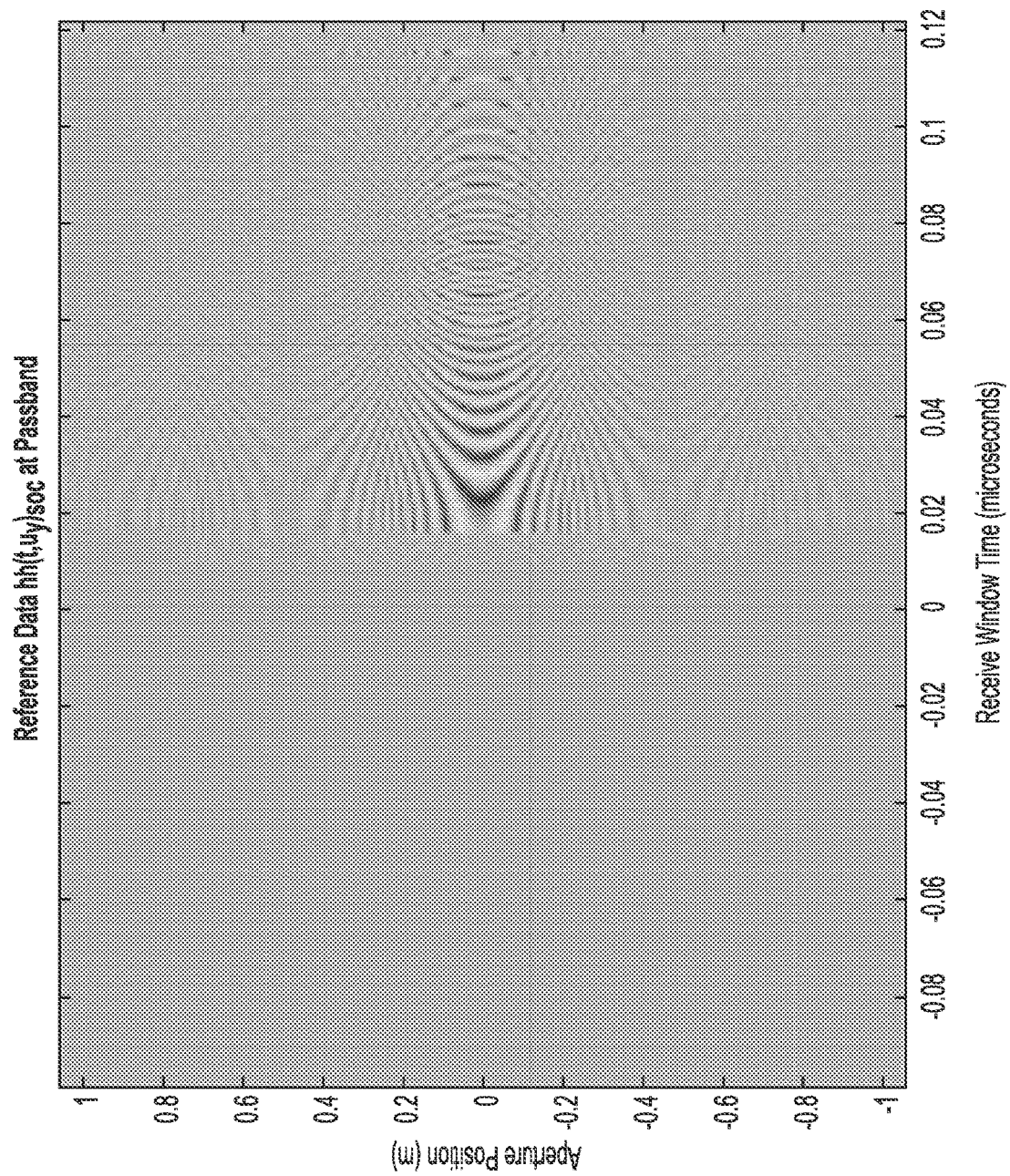
FIGS. 17A-C illustrates example reference Fresnel field data buffer contents for near, midrange and far ranges according to one aspect of the disclosed technology.
Figure 17B:
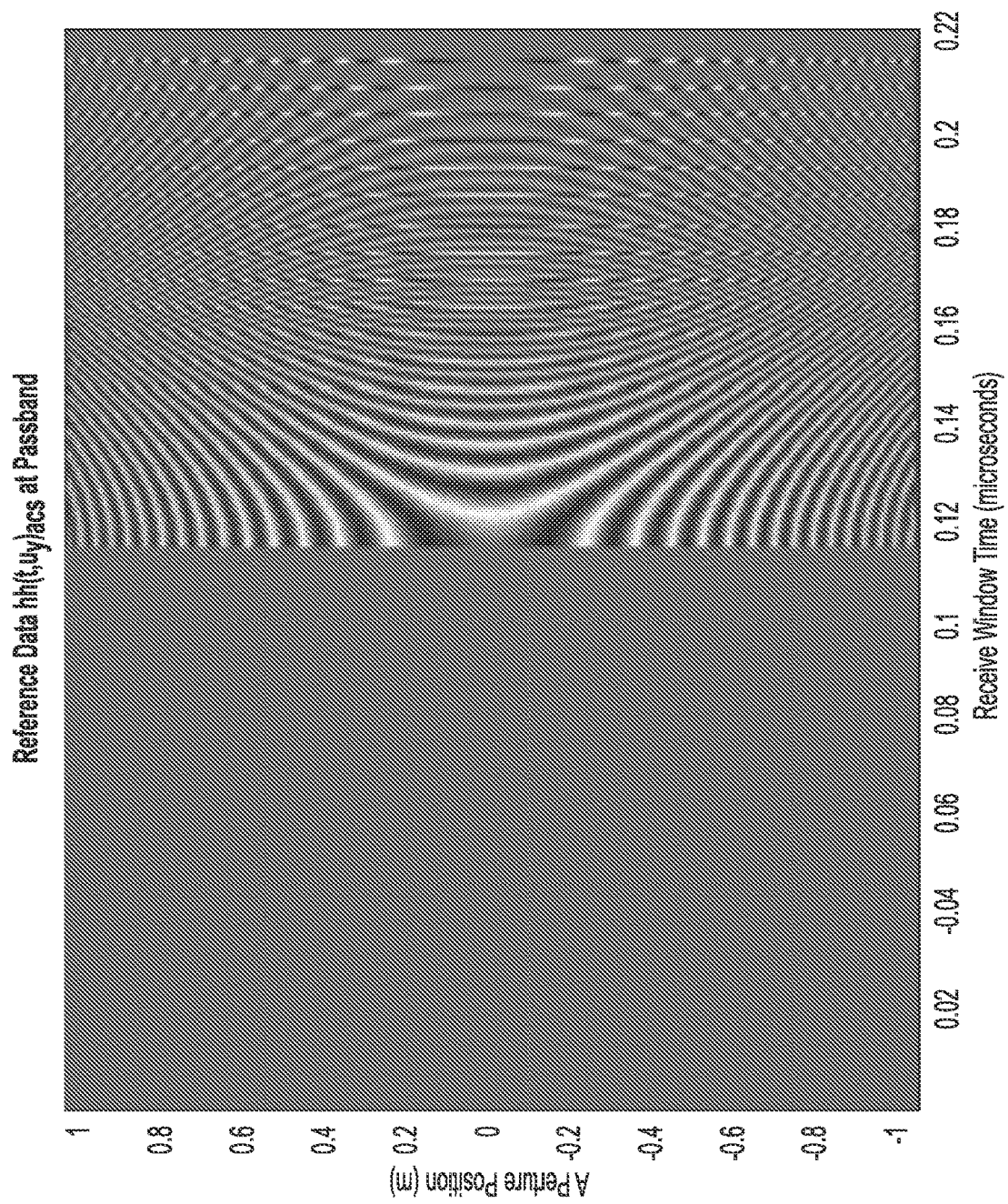
Figure 17C:
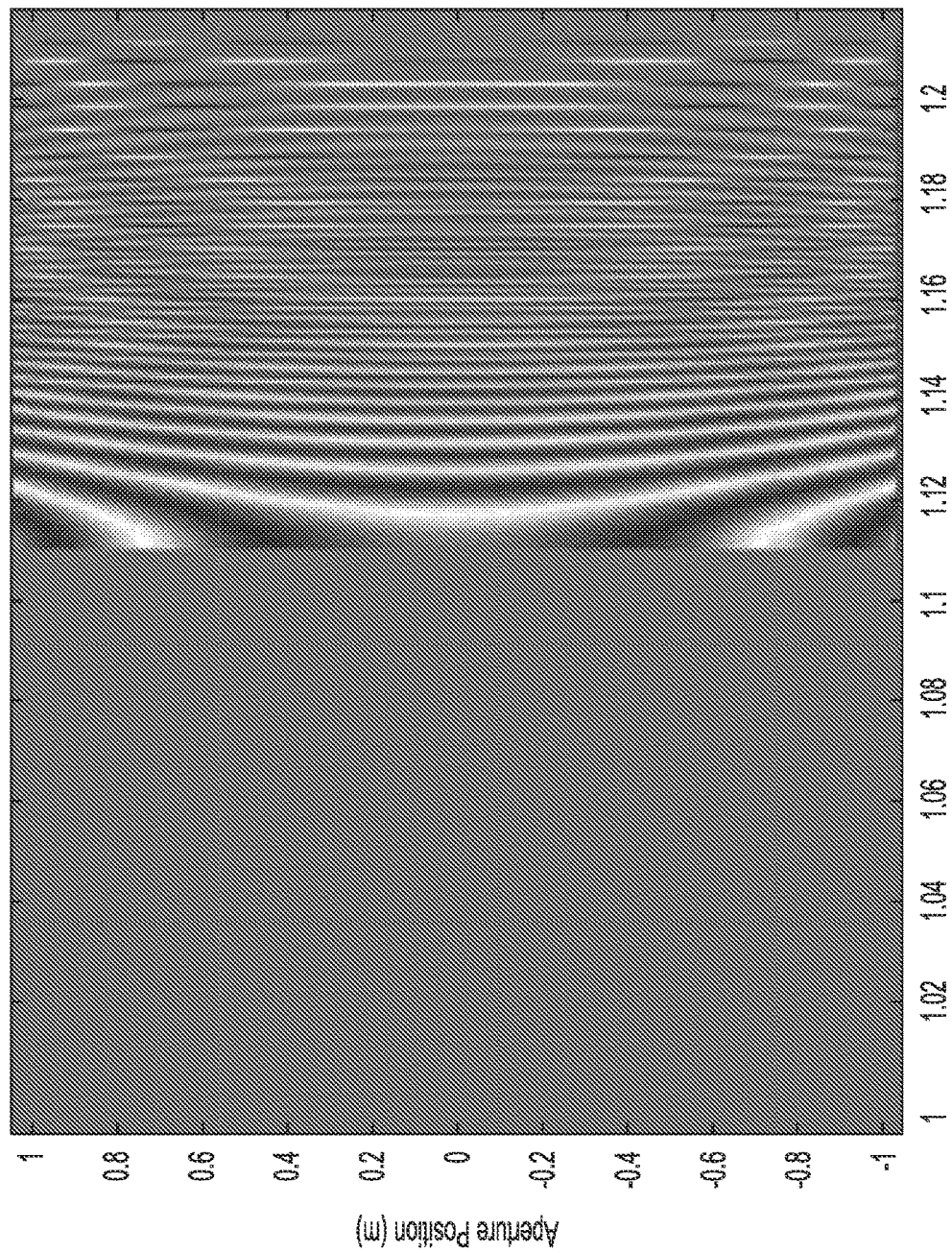

The processor 15 may generate reference Fresnel field sample data that is descriptive of the distance or a space between the spatial reference points of the sensor array 10 and the field of view, and which is also descriptive of the cross-range difference in the size of the sensor array and the field of view as illustrated in FIG. 14. The reference Fresnel field generator 60 may determine a reference Fresnel field that has as its origin the spatial position reference point of the sensor array 10 and has as its destination a spatial position reference point of the field of view as shown in FIG. 14. The reference Fresnel field as illustrated in FIGS. 15A-B may include a spatial isotropic sinusoidal wave field for each monochromatic spectral element of a possibly polychromatic (passband) transmitted waveform. FIG. 15A illustrates a monochromatic (corresponding to selection of a continuous wave signal selected for the sensor array transmitted waveform) reference Fresnel field in a two-dimensional format. FIG. 15B illustrates a monochromatic (single frequency) reference Fresnel field in a three-dimensional format. As illustrated in FIG. 14, the image sample positions within the field of view determine the sample data of the reference Fresnel field. The reference Fresnel field sample data determined along the field of view image sample positions are stored in the reference Fresnel field data buffer 70. The processor 15 may generate a data buffer containing reference Fresnel field sample data, such as the reference Fresnel field data buffer 70, with reference signal data sample spacing proportional to, including possibly equal to, the predefined spacing of the sensor elements, and with a total number of data samples in cross-range dimensions identical to a total number of cross-range data samples of the field of view and corresponding pixel counts of the field of view image, as illustrated in FIG. 16. Examples of reference Fresnel field sample data stored in the reference Fresnel field data buffer 70 are shown in FIGS. 17A-C. The reference Fresnel field created by the reference Fresnel field generator 60 may be an expanded (since the field of view image may be larger than the sensor array size), isotropic, harmonic, monochromatic or polychromatic, reference Fresnel wave field that characterizes the electromagnetic or acoustic field that spans the void between the system 1 and the field of view. The extent of the void between the system 1 and the field of view may be determined by the spatial positional reference points of the field of view and the sensor array 10.

Figure 18:
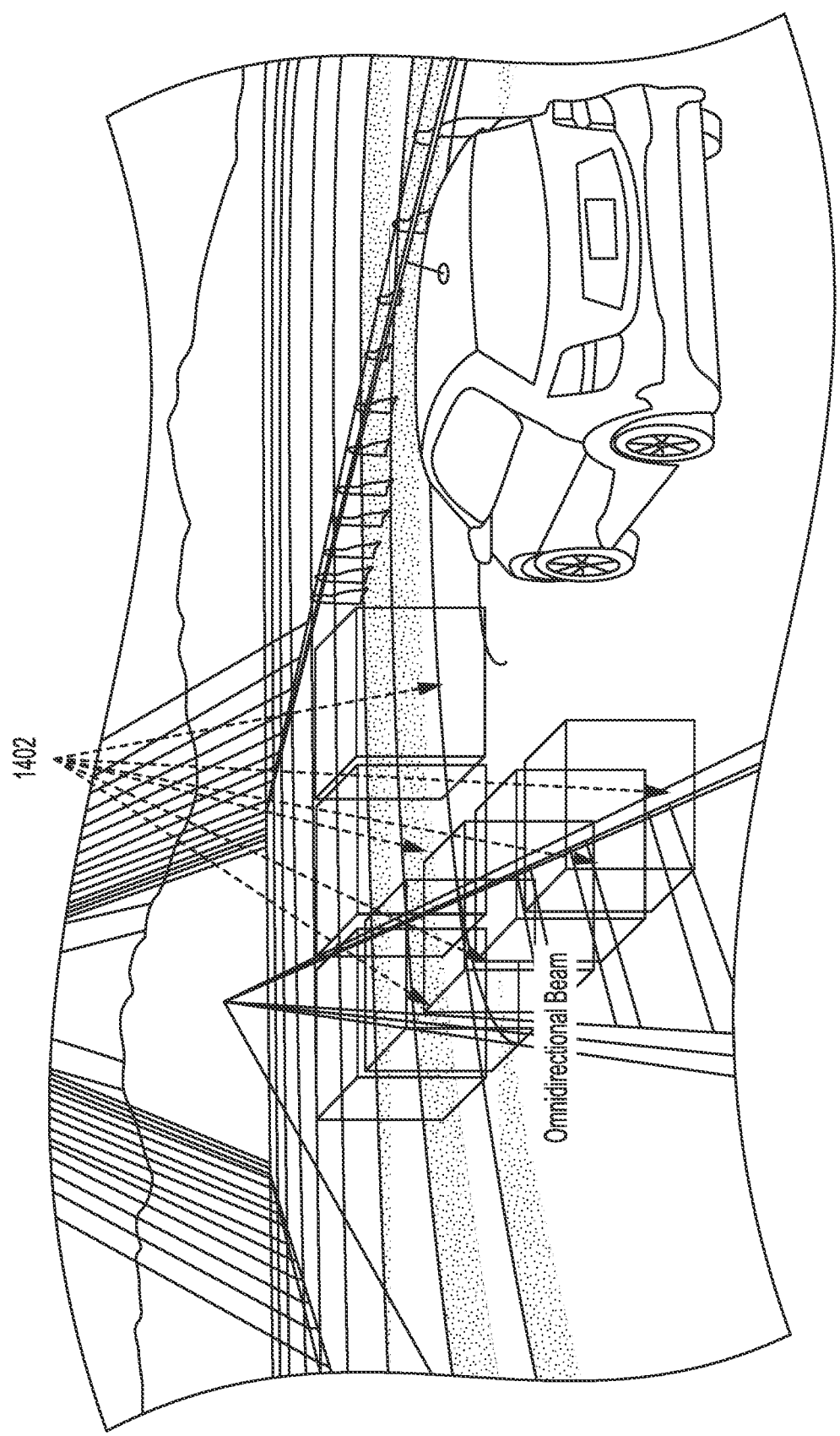
FIG. 18 illustrates use of an omnidirectional signal transmission with multiple receive fields of view according to one aspect of the disclosed technology.

The processor 15 may generate one or more disjoint fields of views, each with distinct field-of-view reference points. Accordingly, distinct Fresnel reference signals are generated to place reference data into distinct reference Fresnel field data buffers 70. FIG. 18 illustrates an application example of multiple volumetric fields of view defined with respect to one application involving self-driving cars. FIG. 18 illustrates volumetric imagery built with multiple fields of view boxes 1402. When the sensor array is electromagnetic and used with a self-driving car as an example, multiple field-of-view images may provide a volumetric imaging capability of the entire surrounding environment of the car. An electromagnetic sensor array may have the advantages of sensing in both day and night operations, and may have advantages of sensing in adverse weather conditions. The adverse weather conditions may include rain, ice, and snow, among other possibilities.

Figure 19A:
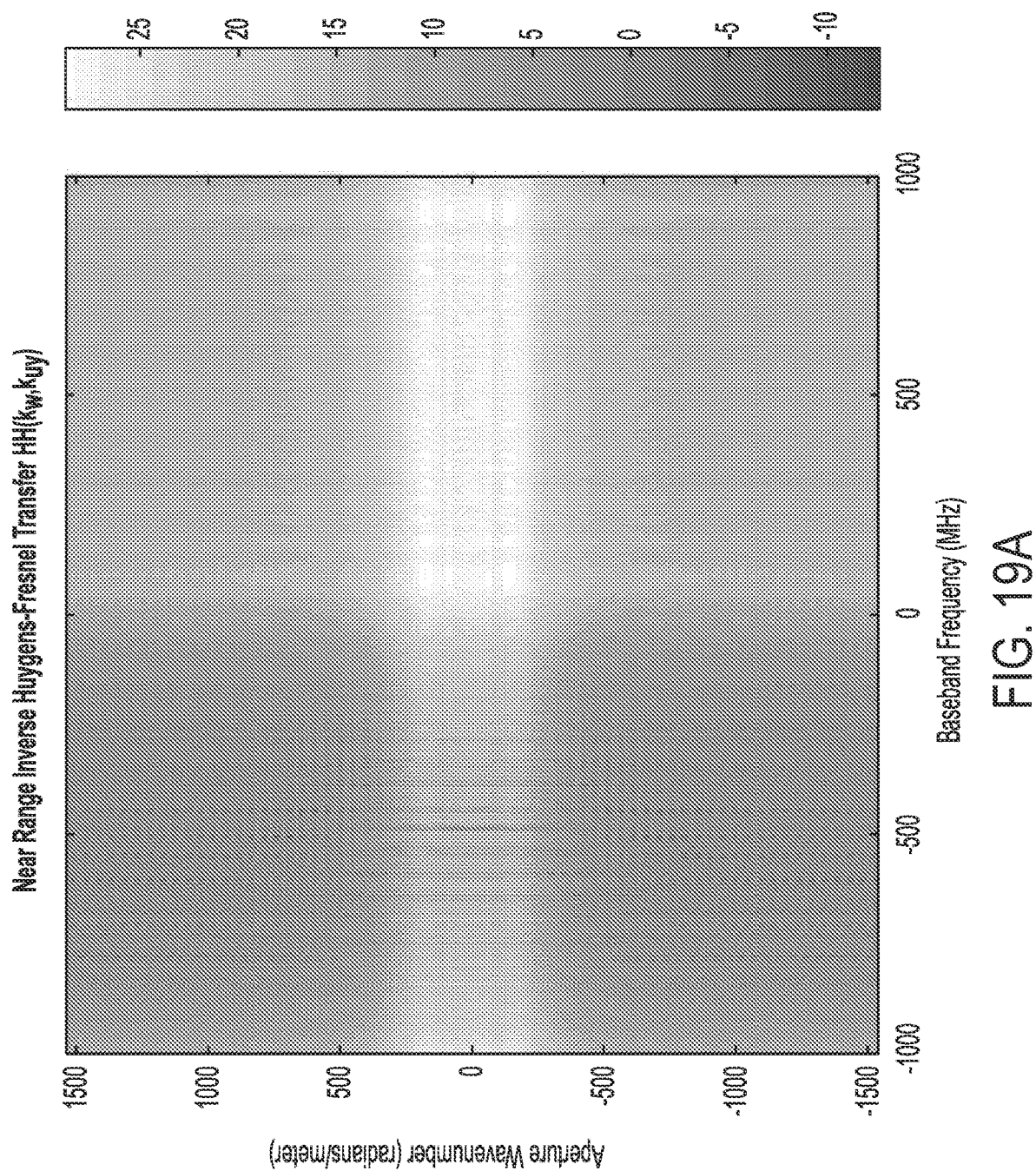
FIGS. 19A-C illustrate inverse Huygens-Fresnel transfer data buffer contents for near-range, midrange and far-range fields of views according to one aspect of the disclosed technology.
Figure 19B:
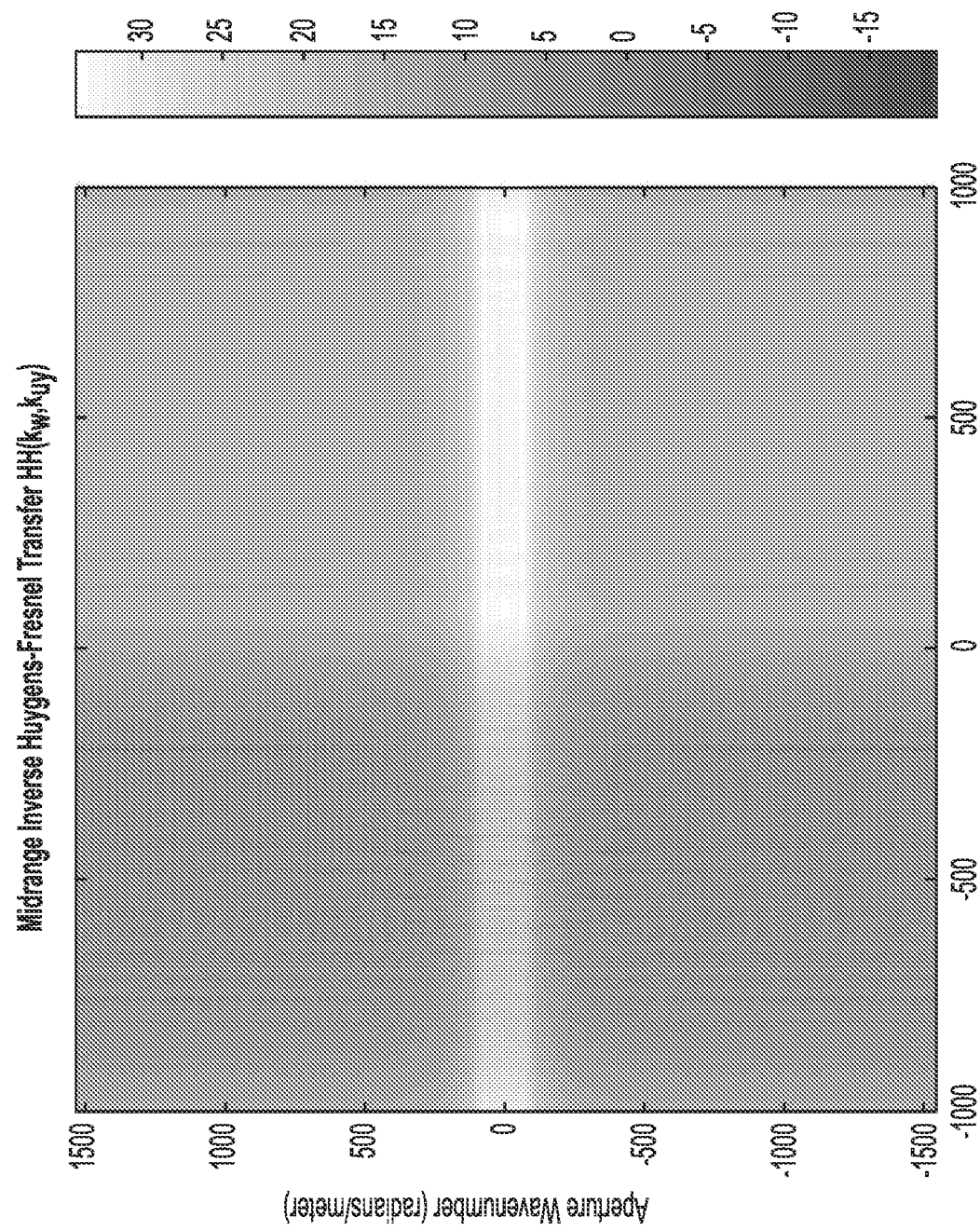
Figure 19C:
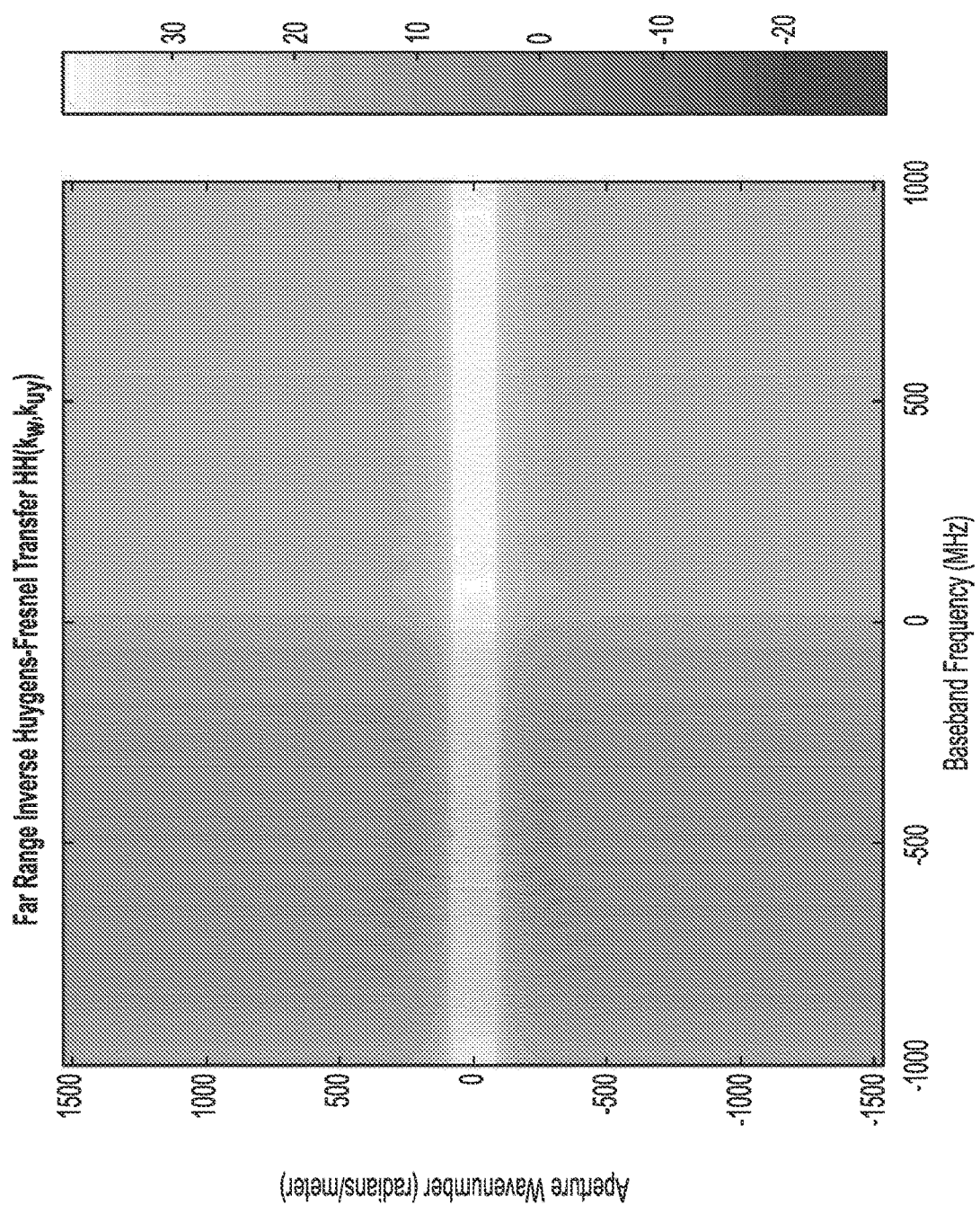

The processor 15 may perform a spatial forward discrete Fourier transform 48 on the data produced by the reference Fresnel field generator 60, stored in the reference Fresnel field data buffer 70, and store the result in the inverse Huygens-Fresnel transfer data buffer 92. In one embodiment, a total number of data samples contained in the Huygens-Fresnel inversion data buffer 92 may equal the number of data samples of the reference Fresnel field data buffer 70. The processor 15 may perform a complex number conjugation of the inverse Huygens-Fresnel transfer data buffer 92, thereby creating an inverse Huygens-Fresnel transfer function. Example inverse Huygens-Fresnel transfer data buffer 92 contents are illustrated in FIG. 19A-C, where example inverse Huygens-Fresnel transfer function generation for near-range, medium-range and far-range distances from the sensor array 10 are illustrated. This multidimensional spatial discrete Fourier transform of the reference Fresnel field and complex conjugation performed by processor 15 creates an isotropic Huygens-Fresnel wave field inverter that is operative in the wavenumber domain. Contrary to traditional signal processing technology, the Huygens-Fresnel wave field inversion function based on isotropic wave propagation replaces the Fraunhofer plane wave assumption often used in conventional sensor array beam forming methods. The reference Fresnel field generator 60 implements a spherical (isotropic) wave field model, which removes the plane wave approximation used in traditional signal processing technology.

Each element of the sensor wavenumber data buffer 43 may be connected with each corresponding element of the Huygens-Fresnel inversion data buffer 92 to form a plurality of signal paths. With reference to FIG. 1B, the signal paths are arrows that lead to the multiplication symbols 94. The processor 15 may multiply sensor wavenumber data buffer 43 contents with inverse Huygens-Fresnel transfer data buffer 92. Each element of the sensor wavenumber data buffer 43 may multiply with the corresponding element of the Huygens-Fresnel inversion data buffer 92 contents and possibly, with spectral elements of a conventional pulse compression matched filter. Corresponding elements between the sensor wavenumber data buffer 43 and the Huygens-Fresnel inversion data buffer 92 may be parings of wavenumber domain data elements.

Figure 20A:
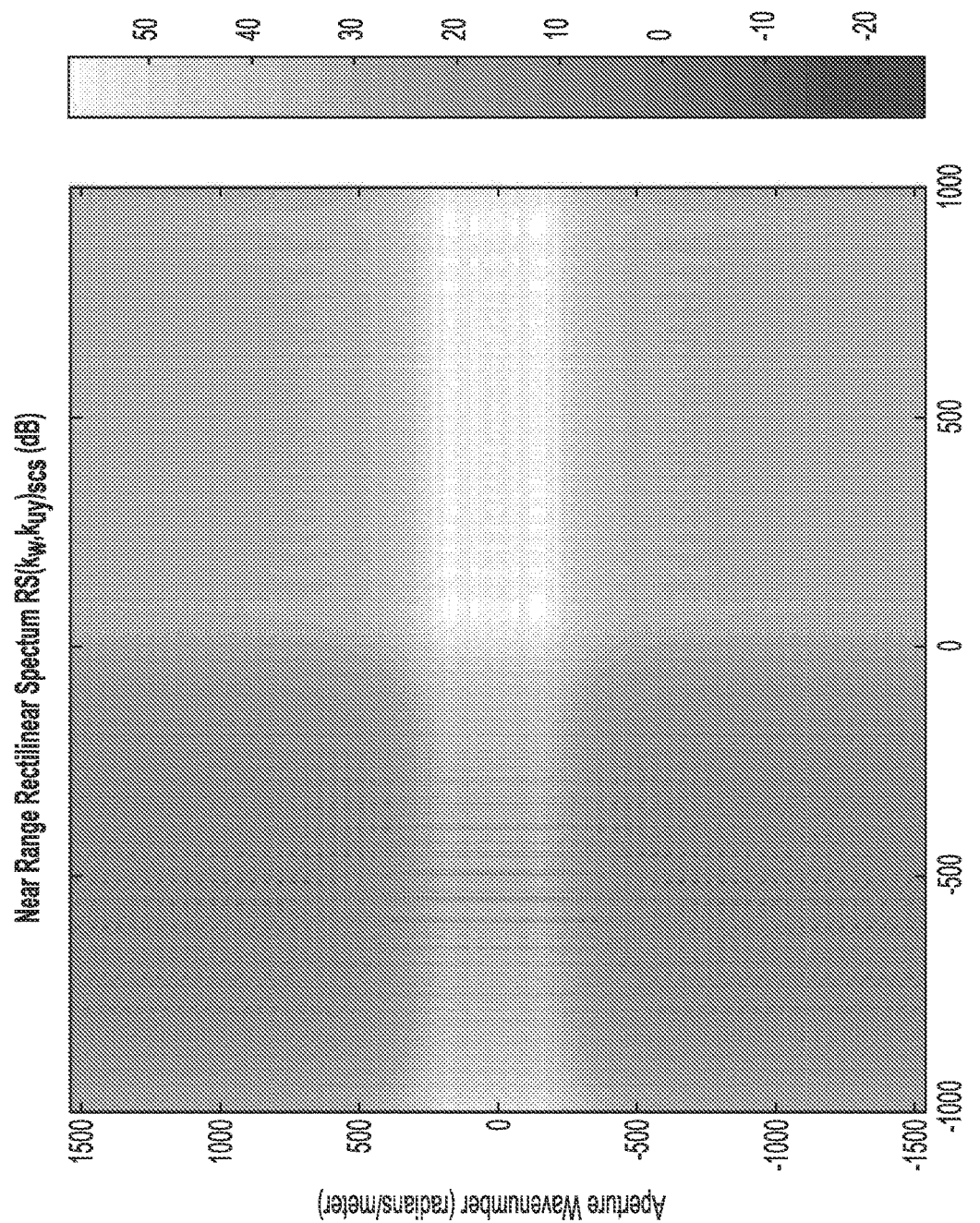
FIGS. 20A-C illustrate rectilinear spectrum data buffer contents for near-range, midrange and far-range fields of views according to one aspect of the disclosed technology.
Figure 20B:
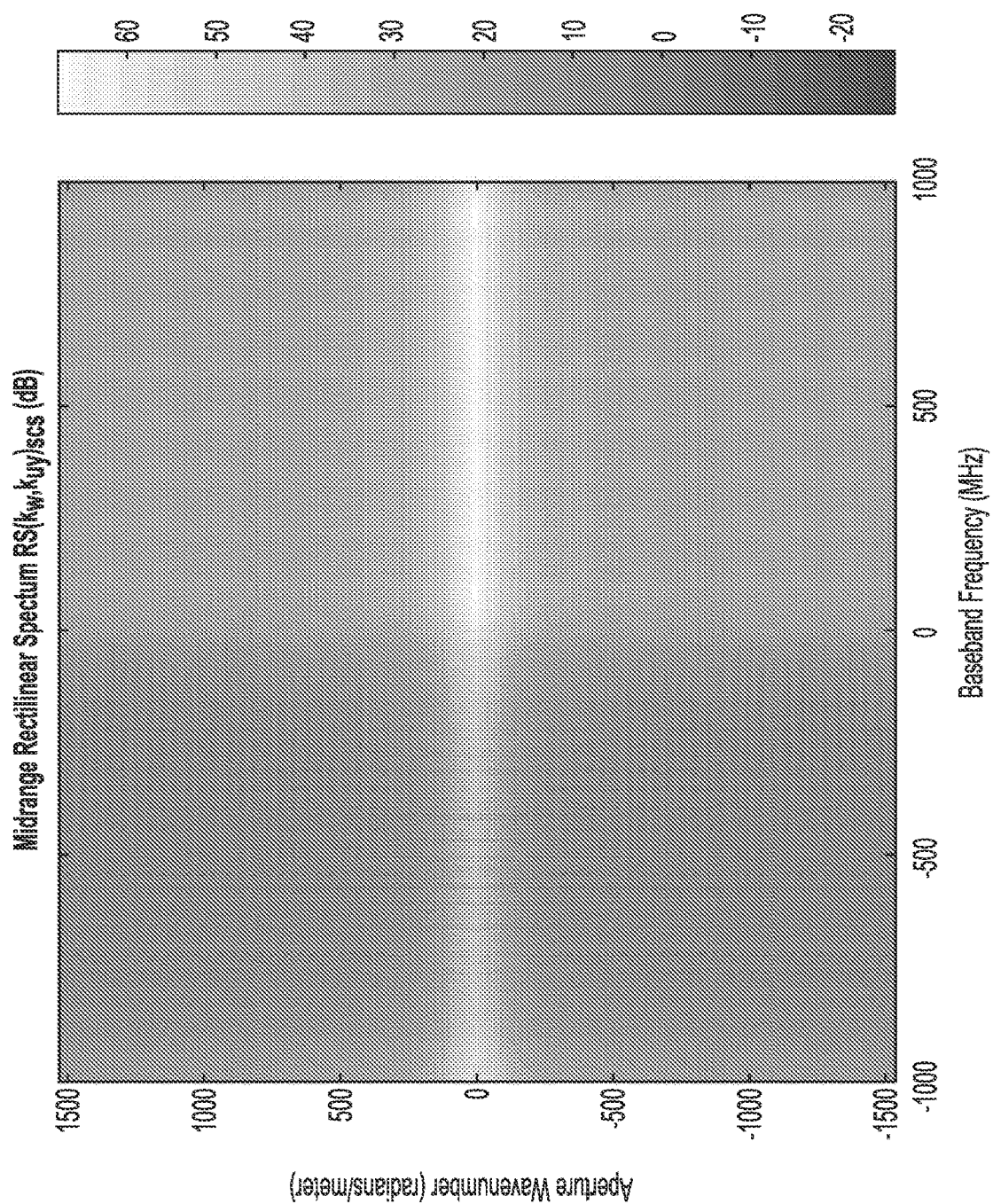
Figure 20C:
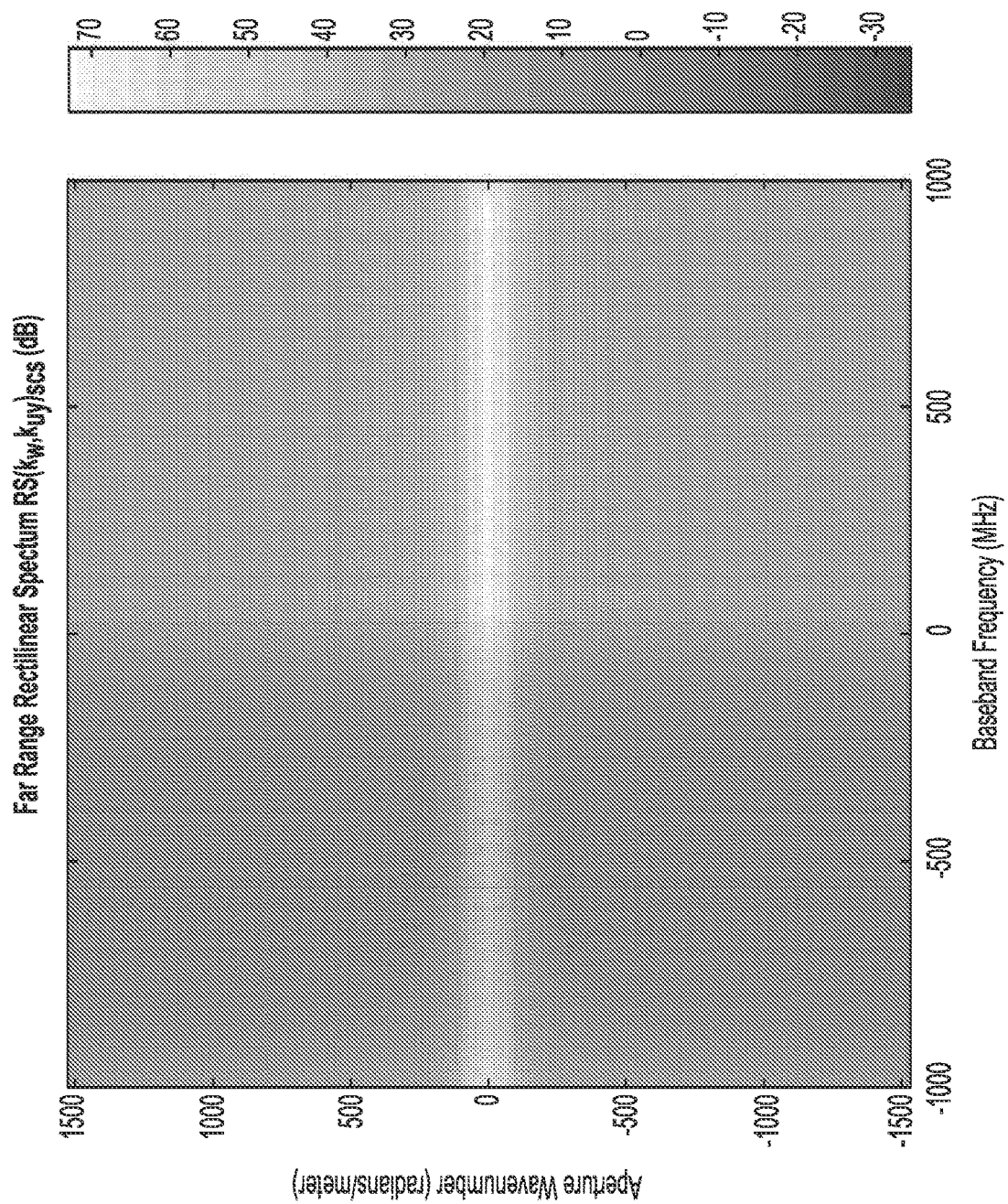
Figure 21A:
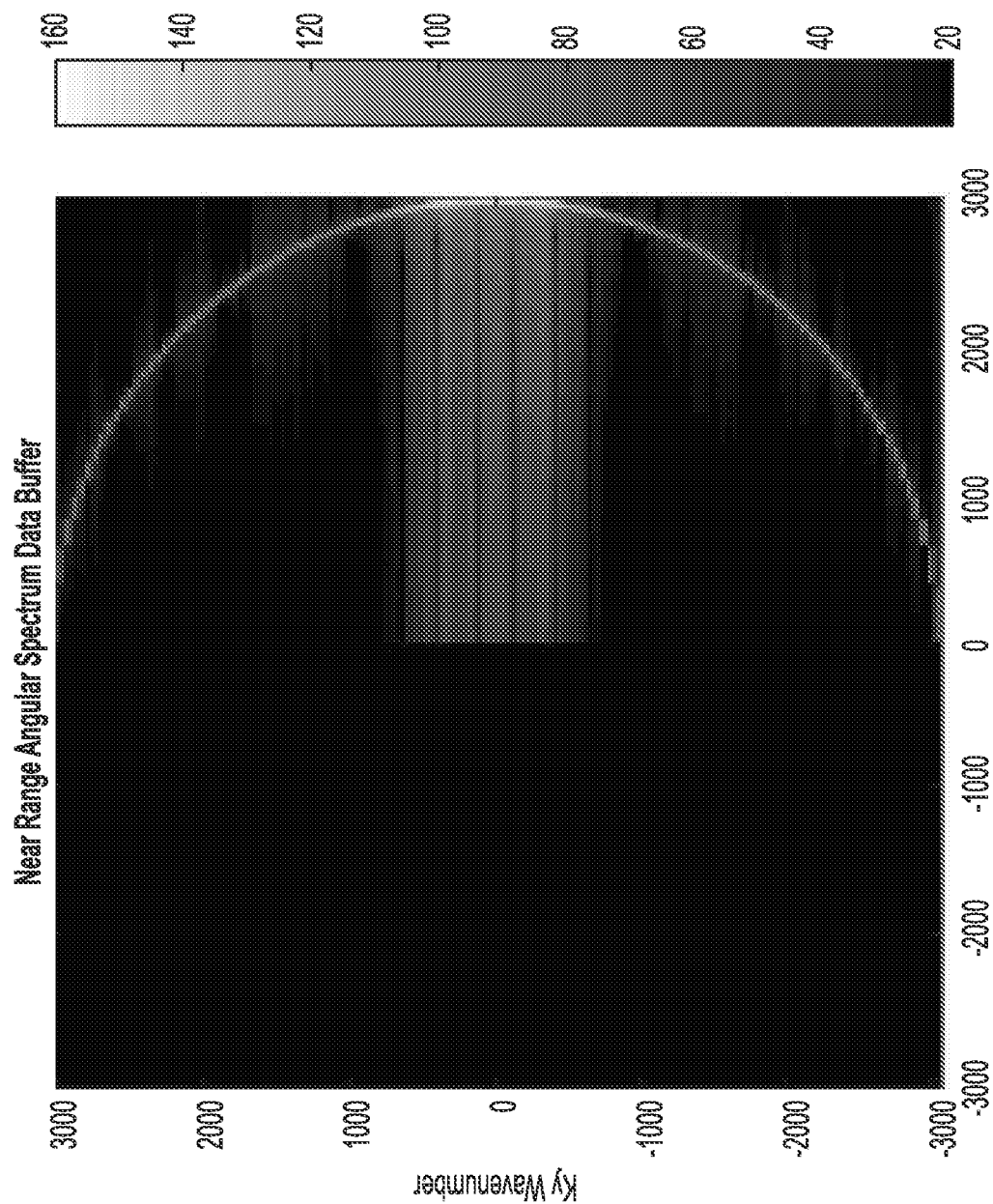
FIGS. 21A-C illustrate angular spectrum data buffer contents for near-range, midrange and far-range fields of views according to one aspect of the disclosed technology.
Figure 21B:
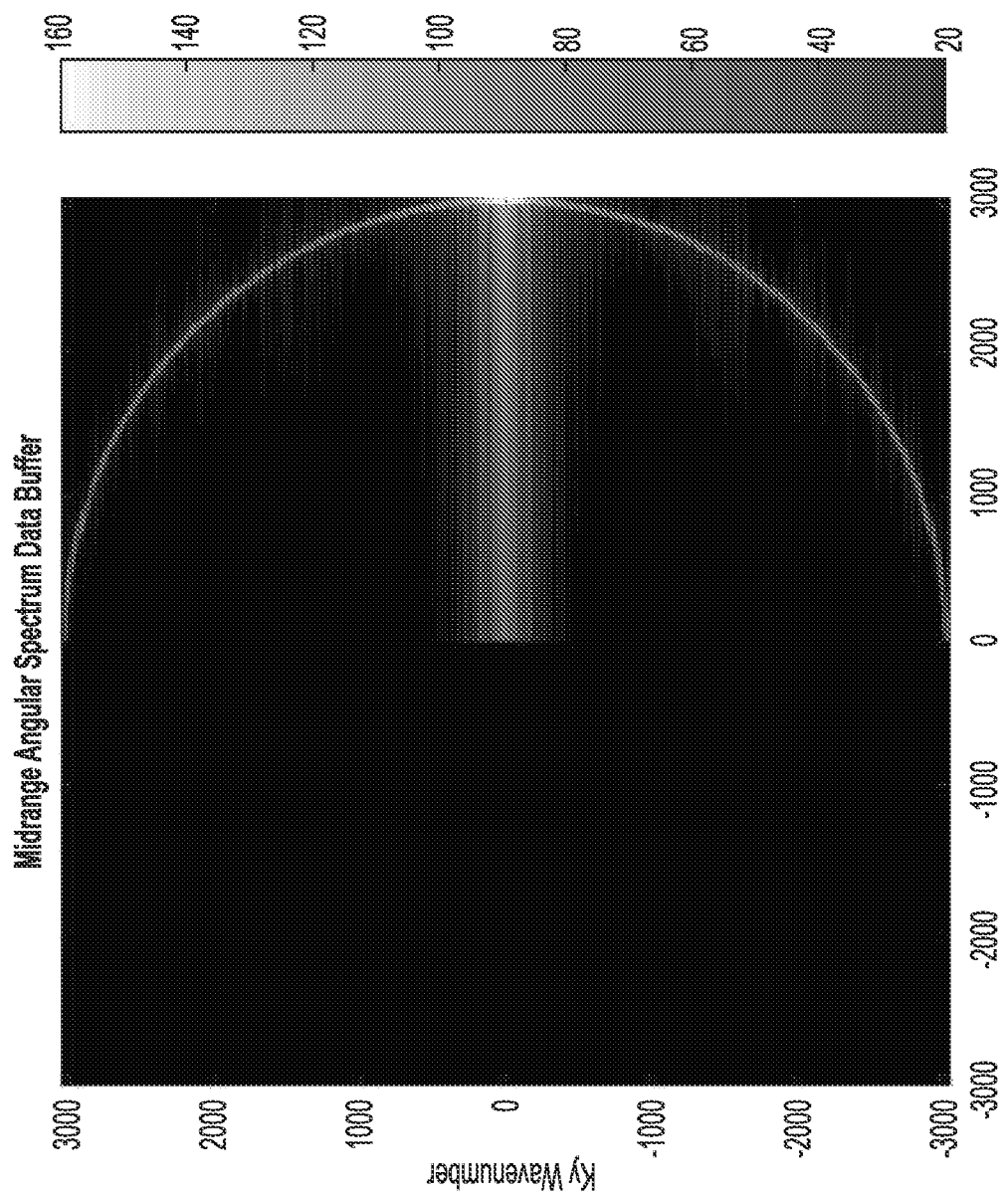
Figure 21C:
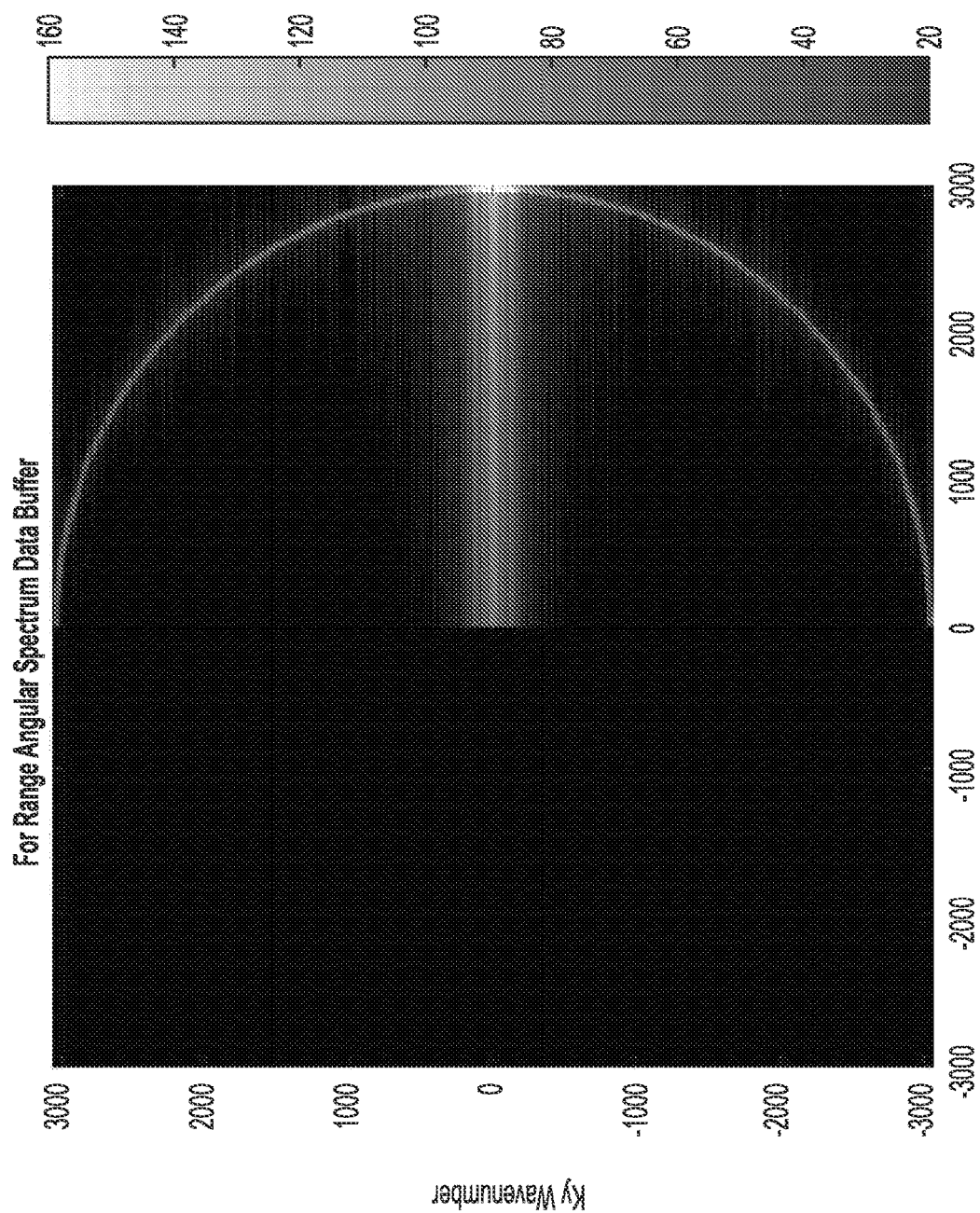

The system 1 may include the rectilinear spectrum data buffer 80 for receiving the multiplication results. Example rectilinear spectrum data buffer 80 contents are illustrated in FIG. 20A-C, where example rectilinear spectrum data for near-range, medium-range and far-range distances from the sensor array 10 are illustrated. The processor 15 may convert the rectilinear spectrum data buffer 80 by Stolt formatting with the Stolt format generator 64 to an angular spectrum data buffer 90. The angular spectrum data buffer 90 are nonuniformly spaced in the wavenumber domain. In one example, the rectilinear spectrum data buffer 80 is one-dimensional, and the angular spectrum data buffer 90 is two-dimensional, as required by conventional Stolt format processing. Example angular spectrum data buffer 90 contents are illustrated in FIG. 21A-C, where example angular spectrum data for near-range, medium-range and far-range distances from the sensor array 10 are illustrated.

Figure 22A:
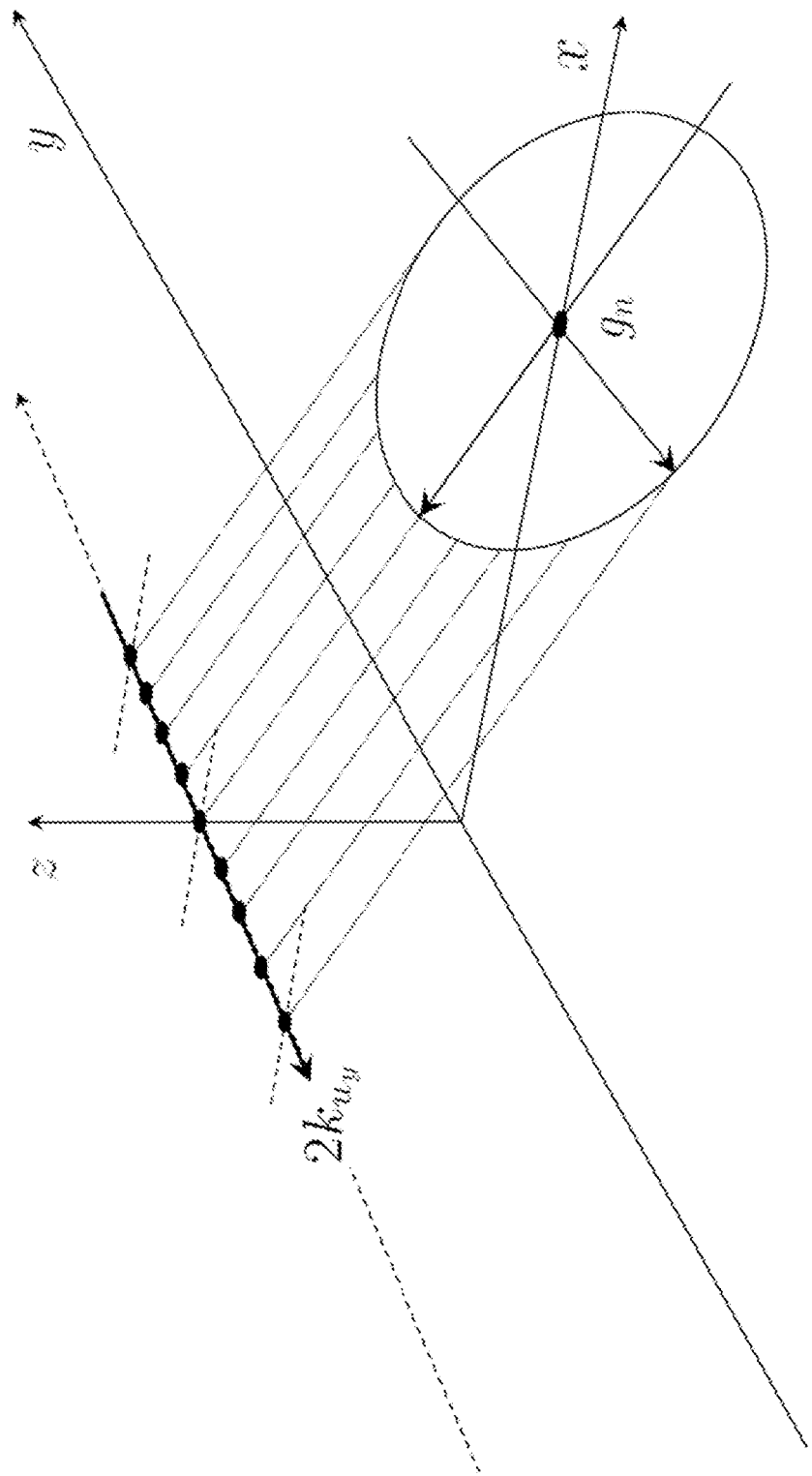
FIG. 22A illustrates one possible format for expression of a rectilinear spectrum according to one aspect of the disclosed technology.
Figure 22B:
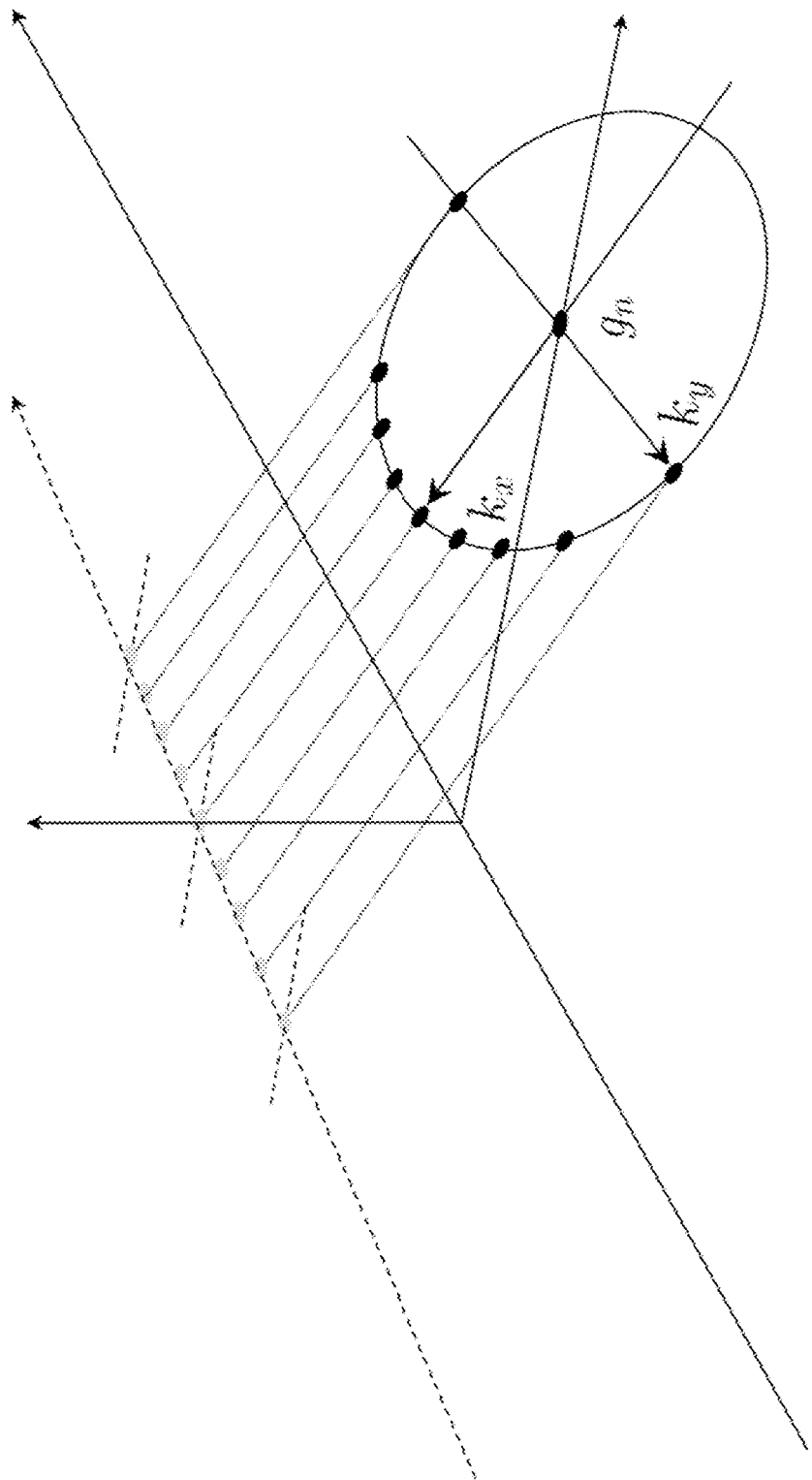
FIG. 22B illustrates Stolt formatting of a rectilinear spectrum into a nonuniformly sampled angular spectrum according to one aspect of the disclosed technology.
Figure 22C:
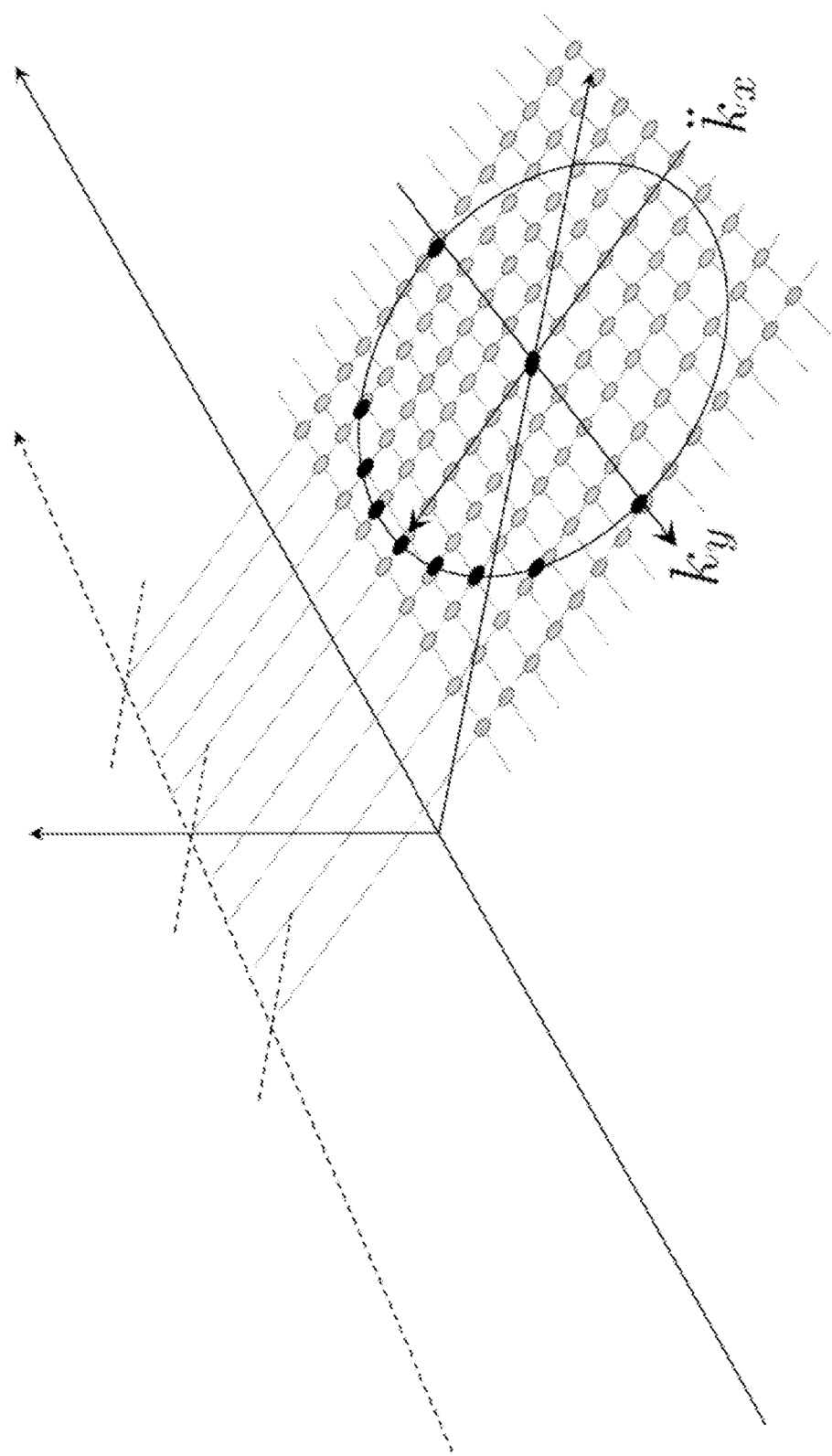
FIG. 22C illustrates uniform resampling of angular spectrum data according to one aspect of the disclosed technology.

The Stolt format generator 64 may also be applied to the angular spectrum data buffer 90 to yield an image spectrum as illustrated in FIGS. 22A-B. The Stolt format generator 64 resamples elements of the angular spectrum data buffer 90 uniformly to create a Fourier transform invertible spectrum of the field of view image spectrum as illustrated in FIG. 22C.

Figure 23A:
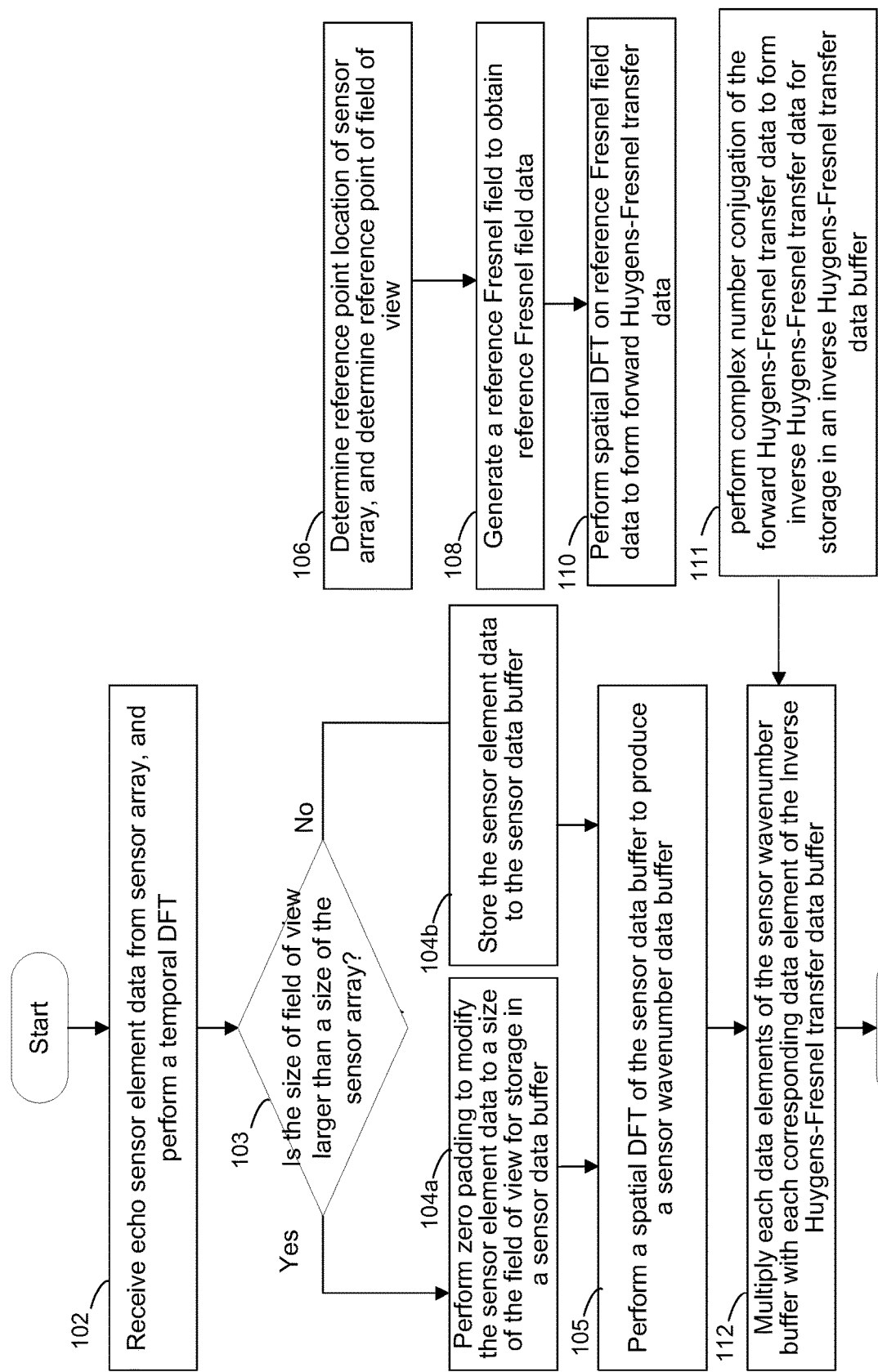
FIGS. 23A-B illustrates a flow diagram of example processes performed by the system of FIG. 1A according to one aspect of the disclosed technology.
Figure 23B:
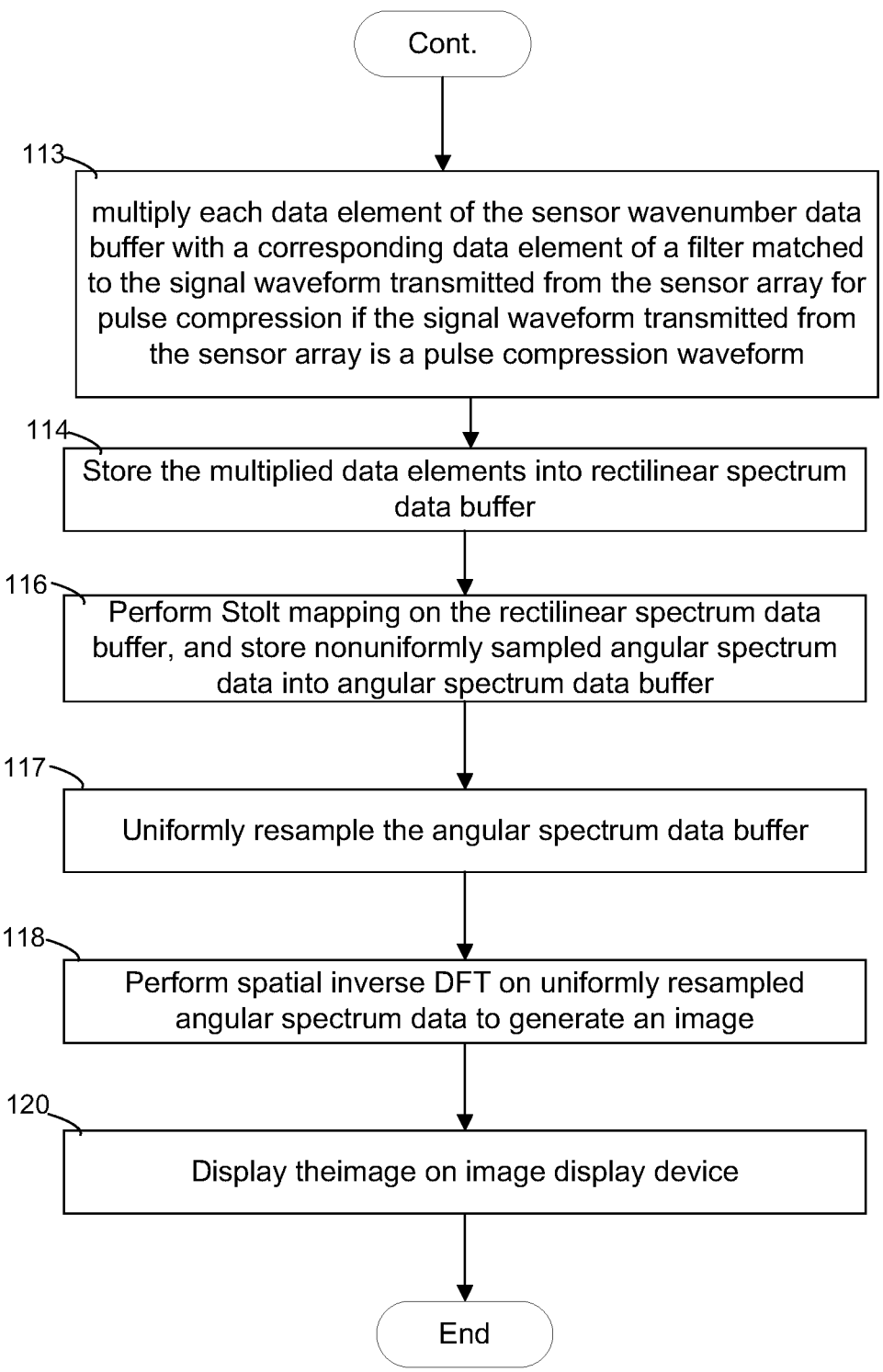

FIGS. 23A-B illustrate an example flow diagram performed by the processor 15. At 102, the processor 15 may receive echo sensor element data from the sensor array 10, and a temporal discrete Fourier transform may be performed on the sensor element data to provide a frequency-spatial expression of the received temporal-spatial form of waveform echo data gathered by the sensor array. Example sensor array data in frequency-spatial format are shown in FIGS. 11A-C. At 103, the processor 15 determines whether the size of the field of view is larger than a size of the sensor array 10. At 104a, the processor 15 may perform zero padding to modify the frequency-spatial sensor element data to a size of the field of view for storage in the sensor data buffer 40, when the size of the field of view is larger than the size of the sensor array 10. Example zero-padded sensor array data are shown in FIGS. 12A-C. If the field of view and the sensor array 10 have the same size, then a zero pad may not be required. At 104b, the processor stores the sensor element data to the sensor data buffer 40. At 105, the processor 15 may perform a spatial discrete Fourier transform of the possibly zero-padded sensor data buffer 40 to produce a sensor wavenumber data buffer 43. The spatial DFT converts the frequency-spatial expression of the possibly zero-padded sensor array data of the sensor data buffer 40 into frequency-wavenumber domain data of the sensor wavenumber data buffer 43. Example sensor wavenumber data buffer 43 are shown in FIGS. 13A-C for fields of view near-range, midrange and far-range from the sensor array 10.

Figure 26A:
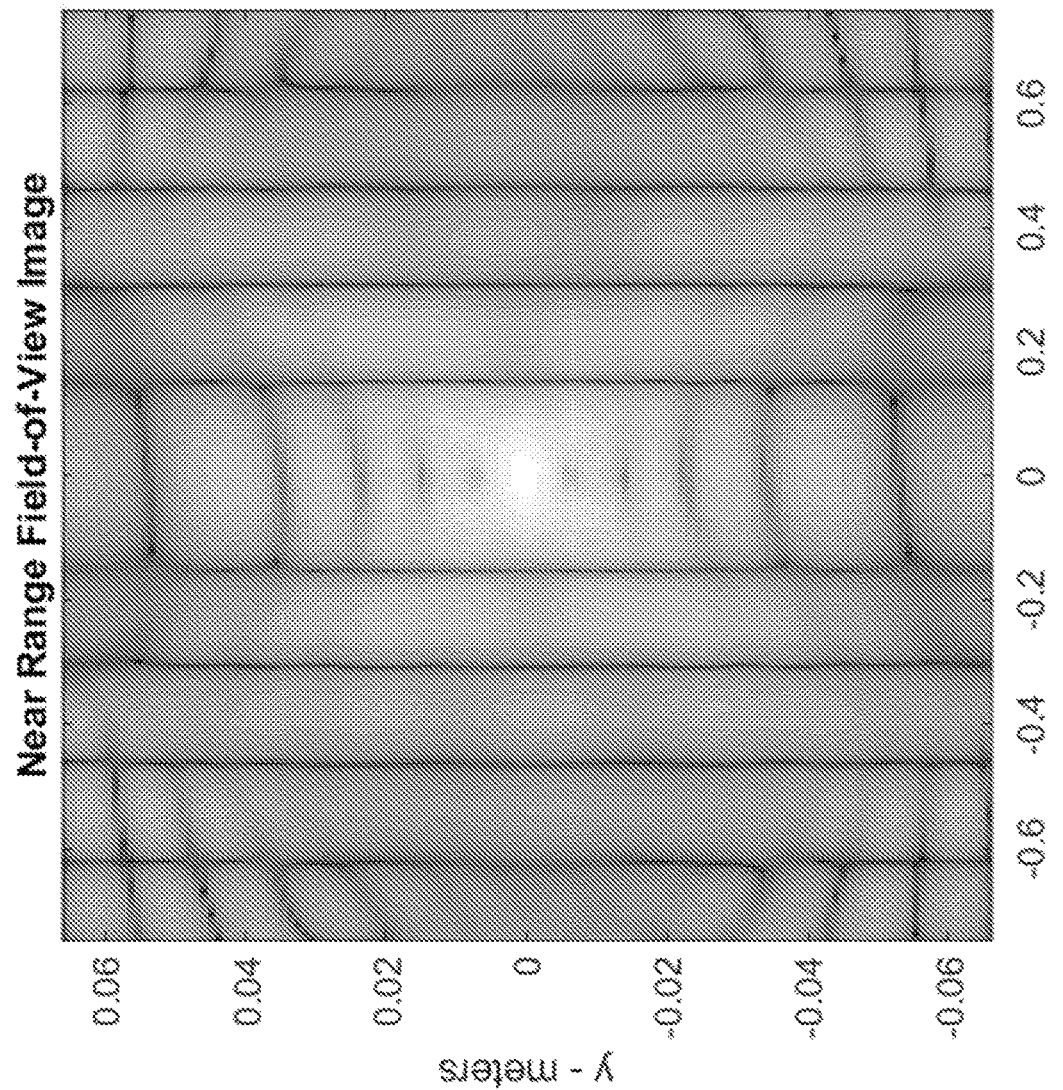
FIGS. 26A-C illustrate two-dimensional images for near-range, midrange and far-range fields of views according to one aspect of the disclosed technology.
Figure 26B:
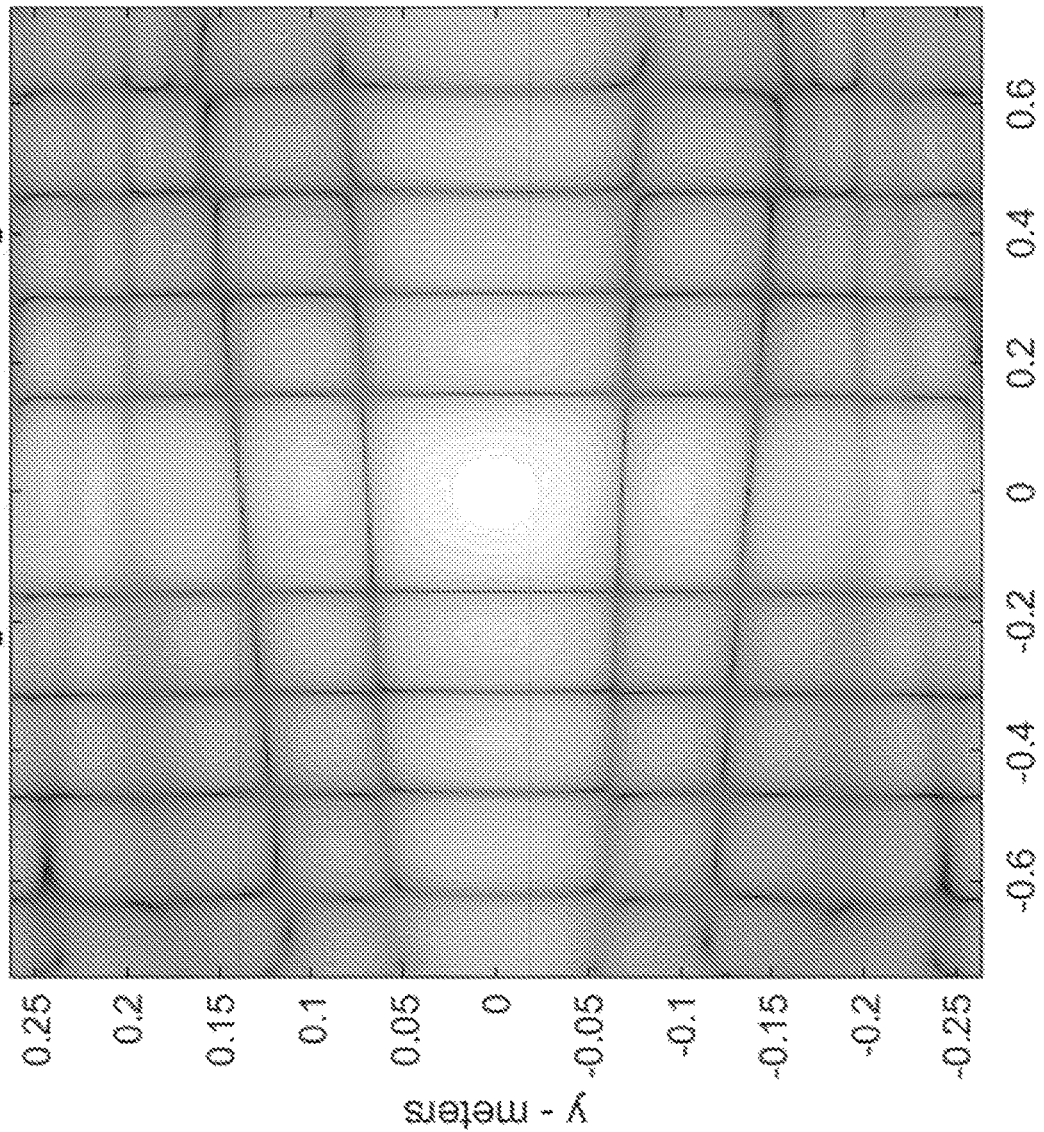
Figure 26C:
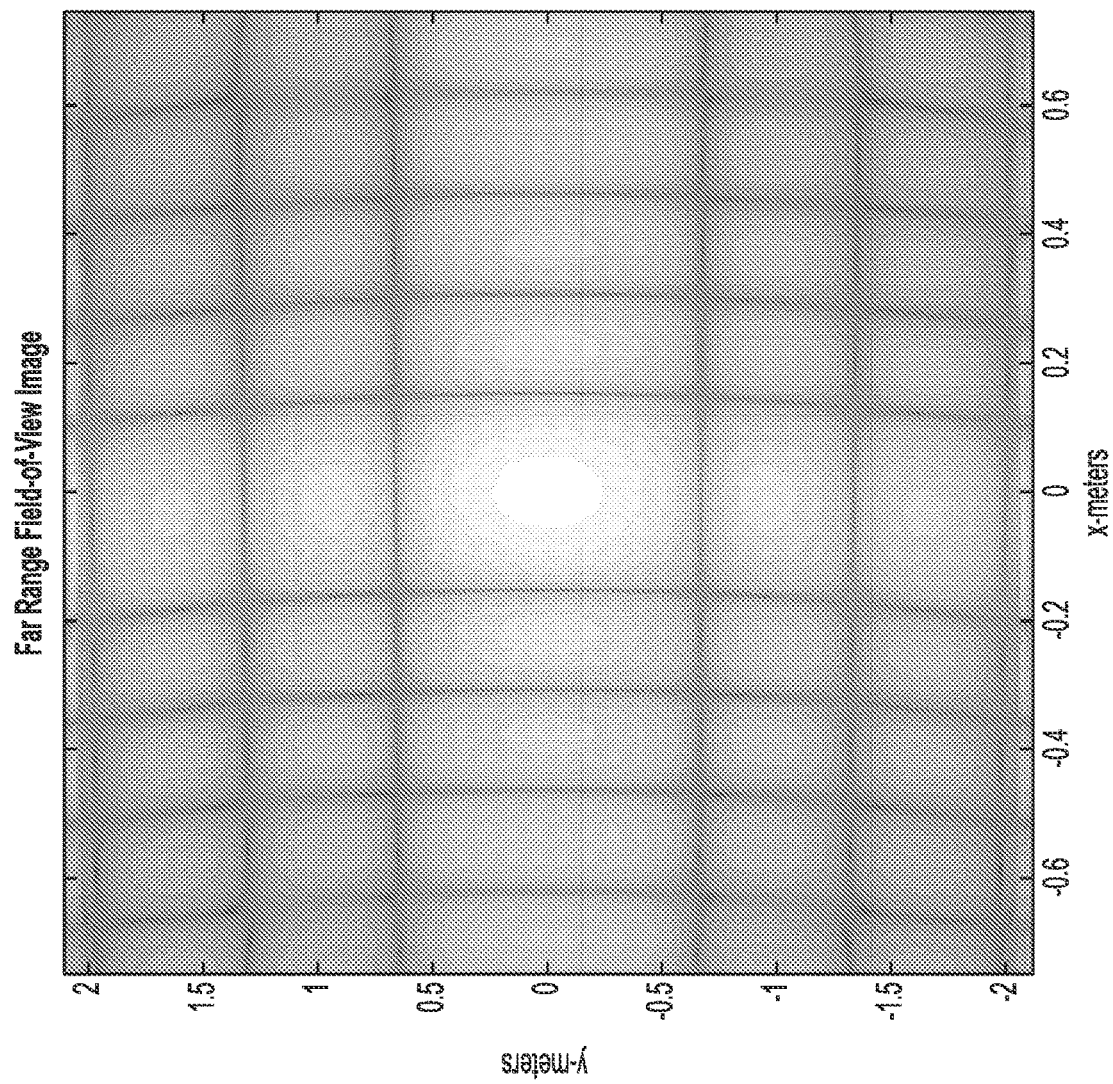

At 106, the processor 15 may determine a first reference point location of the sensor array 10 and a second reference point location of the field of view. At 108, based on the first and second reference point locations of the sensor array 10 and the field of view, also based on a signal waveform transmitted from the sensor array 10, and based on the size of the field of view, the processor 15 may generate a reference Fresnel field to obtain reference Fresnel field data. At 110, the processor 15 may perform spatial DFT on the reference Fresnel field data to form forward Huygens-Fresnel transfer data. At 111, the processor 15 may perform complex number conjugation of the forward Huygens-Fresnel transfer data to form inverse Huygens-Fresnel transfer data for storage in the inverse Huygens-Fresnel transfer data buffer 92. Example inverse Huygens-Fresnel transfer data are shown in FIGS. 19A-C for fields of view near-range, midrange and far-range from the sensor array 10. At 112, the processor 15 may multiply data elements of the sensor wavenumber data buffer 43 with corresponding data elements of the inverse Huygens-Fresnel transfer data buffer 92. At 113, the processor 15 may multiply each data element of the sensor wavenumber data buffer 43 with a corresponding data element of a filter matched to the signal waveform transmitted from the sensor array 10 for pulse compression if the signal waveform transmitted from the sensor array 10 is a pulse compression waveform. Conventional waveform matched filtering may be performed with multiplication of sensor wavenumber data buffer 43 with corresponding data elements of the spectrum of the matched filter of the signal waveform transmitted by the sensor array 10. At 114, the processor 15 may store the multiplied data elements of step 112 into the rectilinear spectrum data buffer 80. Example rectilinear spectrum data are shown in FIGS. 20A-C for fields of view near-range, midrange and far-range from the sensor array 10. At 116, the processor may perform Stolt mapping on the rectilinear spectrum data buffer 80 to form a nonuniformly sampled angular spectrum. The nonuniformly sampled angular spectrum data are stored in the angular spectrum data buffer 90. Example angular spectrum data are shown in FIGS. 21A-C for fields of view near-range, midrange and far-range from the sensor array 10. At step 117, the processor 16 may uniformly resample the angular spectrum data buffer 90. At step 118, the processor may perform spatial inverse DFT on the uniformly resampled angular spectrum data to generate an image such as shown for a single scatterer in FIGS. 26A-C for fields of view near-range, midrange and far-range from the sensor array 10. The image may illustrate contents of the field of view. At step 120, the processor 15 may format the image for display on the image display device 20.

Figure 24:
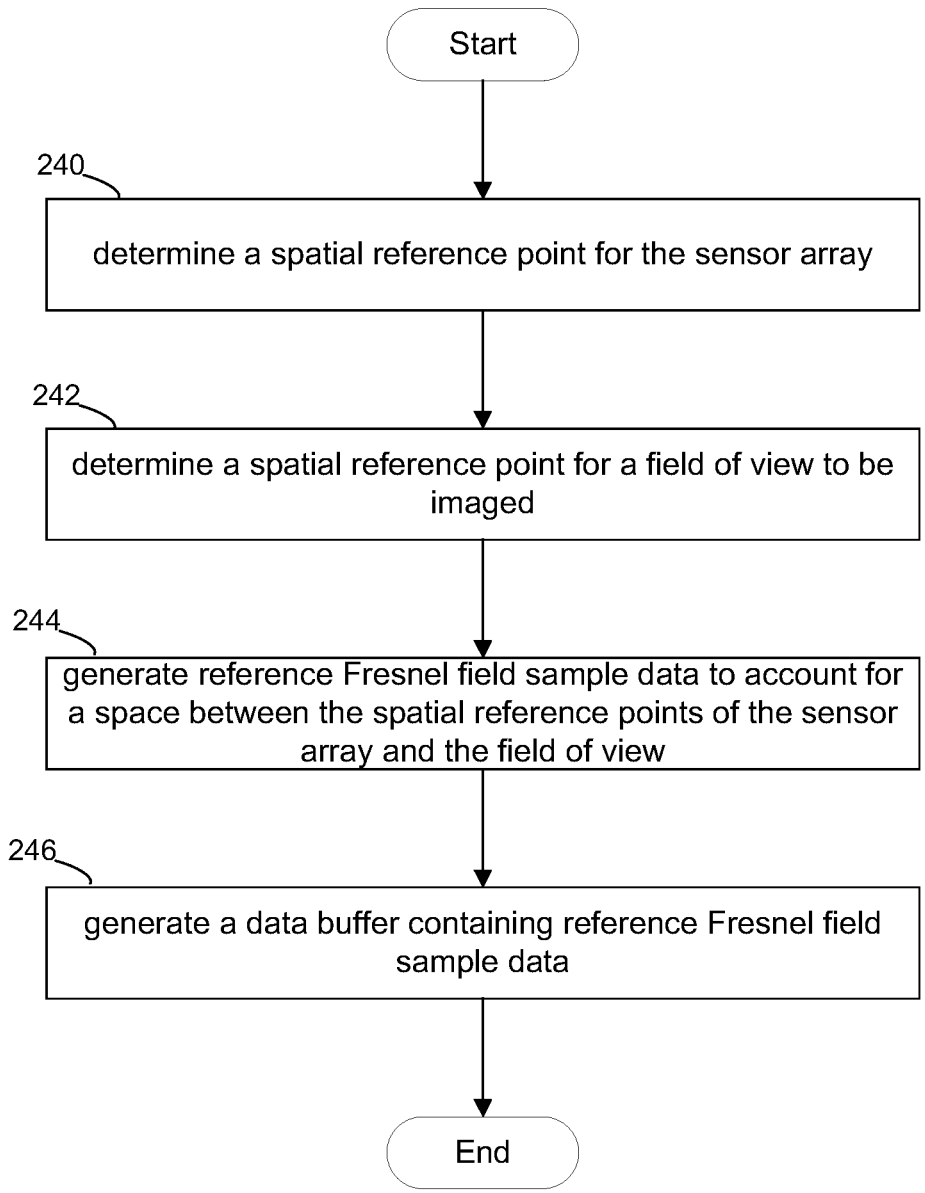
FIG. 24 illustrates another flow diagram of example processes performed by the system of FIG. 1A according to one aspect of the disclosed technology.

FIG. 24 illustrates another example flow diagram performed by the processor 15. At 240, the processor may determine a spatial reference point for the sensor array 10. At 242, the processor may determine a spatial reference point for a field of view to be imaged. At 244, the processor may generate reference Fresnel field sample data, based on a predefined waveform transmitted from the sensor array 10, to account for a space between the spatial reference points of the sensor array and the field of view. If the transmitted waveform is a not a monochromatic continuous wave signal, the processor may perform a temporal DFT at 244. Example polychromatic waveforms that may induce the processor to perform a temporal DFT at 244 may include a single pulse signal at passband. At 246, the processor may generate a data buffer containing reference Fresnel field sample data. The reference Fresnel field sample data may have reference Fresnel field data sample spacing which is proportional to, including possibly equal to, the predefined spacing of the sensor elements of the sensor array 10. A total number of Fresnel field data samples of the reference Fresnel field sample data may be identical to a total number of cross-range data samples of a field of view.

Figure 25:
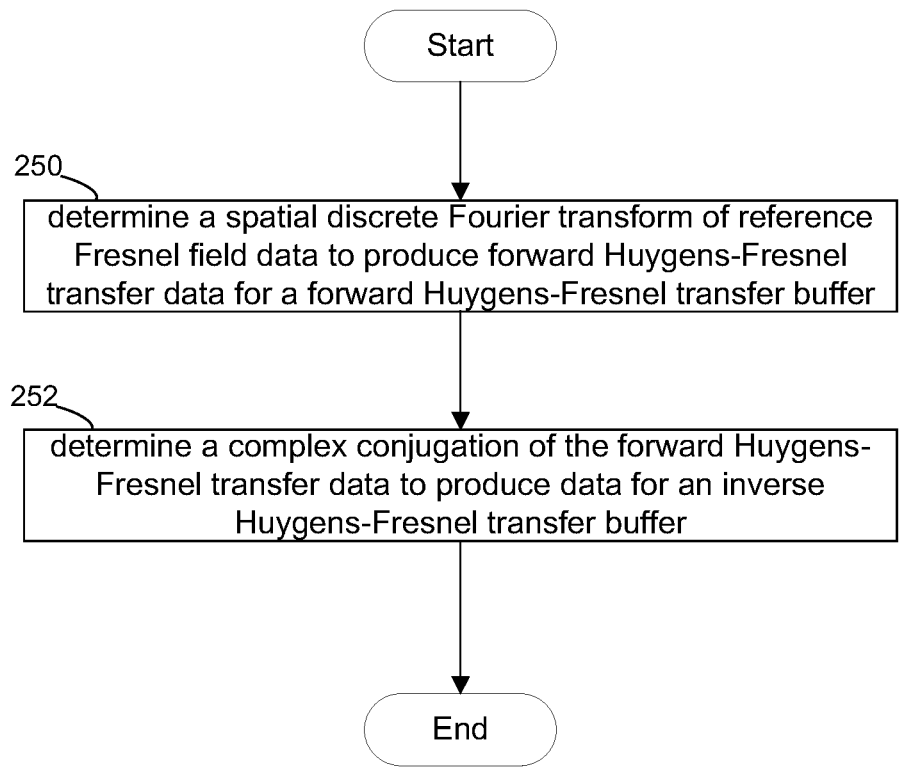
FIG. 25 illustrates yet another flow diagram of example processes performed by the system of FIG. 1A according to one aspect of the disclosed technology.

FIG. 25 illustrates yet another flow diagram of example processes performed by the processor 15. At 250, the processor may determine a spatial discrete Fourier transform of reference Fresnel field data to produce forward Huygens-Fresnel transfer data for a forward Huygens-Fresnel transfer buffer. The reference Fresnel field data may have reference Fresnel field data sample spacing which is proportional to, including possibly equal to, the predefined spacing of sensor elements of the sensor array 10. A total number of Fresnel field data samples of the reference Fresnel field sample data may be identical to a total number of cross-range data samples of a field of view. At 252, the processor may determine a complex conjugation of the forward Huygens-Fresnel transfer data to produce data for an inverse Huygens-Fresnel transfer buffer.

The disclosed technology replaces the multiple pulse beamforming/beamsteering approach used by sensor arrays with a single pulse imaging approach. The disclosed technology provides an imaging alternative to conventional Fraunhofer plane-wave based beamforming. In particular, to overcome the limitations of angle-of-arrival and beamforming/beamsteering based processing of sensor array data as presented in conventional technology, and to provide one-dimensional, two-dimensional or three-dimensional imaging capabilities of the contents of a possibly expanded field of view, the disclosed technology implements the following features.

First, the disclosed technology removes the plane wave approximation at the core of legacy sensor array capabilities and replaces the foundational plane wave system formulation with spherical (isotropic) wave field models.

Second, the disclosed technology removes any on-array analog combining required for beamforming. For instance, the disclosed technology creates an expanded, isotropic, harmonic, reference, monochromatic or polychromatic, Fresnel wave field that characterizes the electromagnetic or acoustic field that spans the void between the disclosed system and an expanded field of view to be imaged. The disclosed technology creates a wave field inversion operator, which may be referred to as inverse Huygens-Fresnel transfers; these isotropic wave field inverters are created by a multidimensional Fourier transform and complex number conjugation of the reference Fresnel wave field. The disclosed technology performs discrete Fourier transforms to convert temporal-spatial data received by the array into the frequency-wavenumber domain. The disclosed technology inverts the sensed wave field with inverse Huygens-Fresnel transfers with simple multiplications performed in the wavenumber domain; this Fourier transformed data comprise the rectilinear spectrum. The disclosed technology converts via Fourier migration the inverted sensed wave field rectilinear spectrum into angular spectrum descriptive of the spectrum of the contents of the field of view, the resulting Fourier migrated data are nonuniformly spaced. A Stolt formatting operator is used in the Fourier migration that yields the angular spectrum. The disclosed technology resamples the angular spectrum uniformly to create the Fourier transform invertible spectrum of the image spectrum. Inverse Fourier transforms are performed to create a one, two or three-dimensional image of the contents of the sensed field of view.

Figure 27:
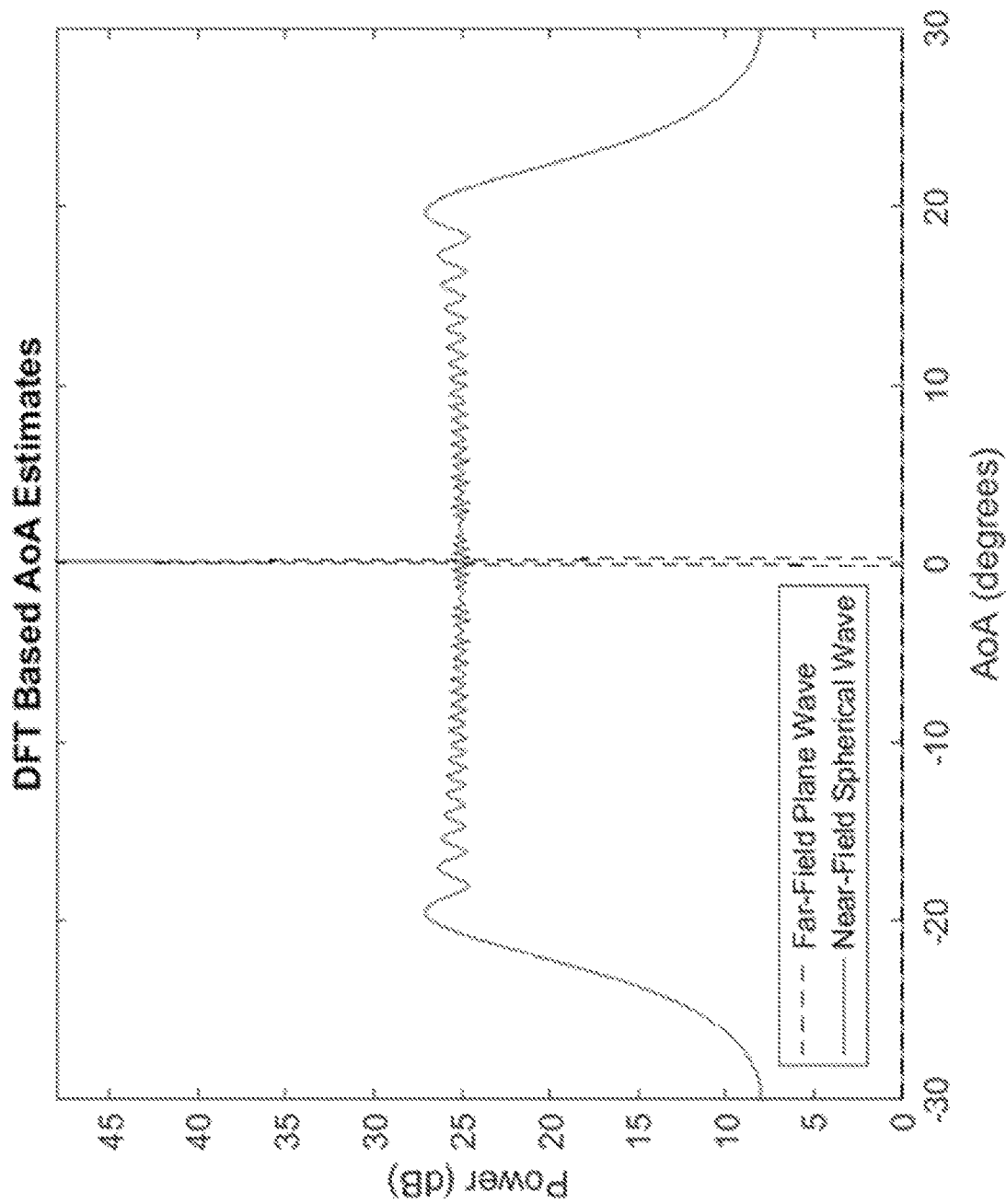
FIG. 27 illustrates prior art technologies failure of discrete Fourier transform (DFT) based angle-of-arrival (AoA) estimate with near-field spherical waves.

FIG. 27 illustrates realm of failure of prior art in near-field sensor with a linear sensor array. FIG. 27 illustrates DFT based AoA estimates with incident plane wave and spherical wave fields. The near field scatterer produces a spherical wave field and fails to resolve and provide a usable AoA estimate. By contrast, FIG. 8 illustrates success of the present technology in creating an AoA estimate of a single scatterer in the near-field of the sensor array.

FIG. 8 illustrates success of the disclosed technology to solve failure of prior art of array sensing in near-field. FIG. 8 illustrates a cross-range image in near field displayed on the image display device 20 according to one aspect of the disclosed technology.

FIG. 9 illustrates success of the disclosed technology to solve failure of prior art of array sensing in an expanded field of view in the far-field, where FIG. 9 shows a cross-range image of the far-field, expanded, field of view according to one aspect of the disclosed technology. In particular, this example illustration demonstrates the value of zero padding sensor array data to the size of a larger, distant, field of view. The number of sensor elements in the sensor array would conventionally only be able to support a cross-range image that spans only a portion of the main lobe of the beam pattern, which corresponds roughly to the main lobe of a conventionally formed Fraunhofer beam. Zero padding allows both main lobe and side lobe characteristics of the distant scatterer to be expressed in the cross-range image point spread function, within an expanded field of view probed with a single transmitted pulse.

Figure 4:
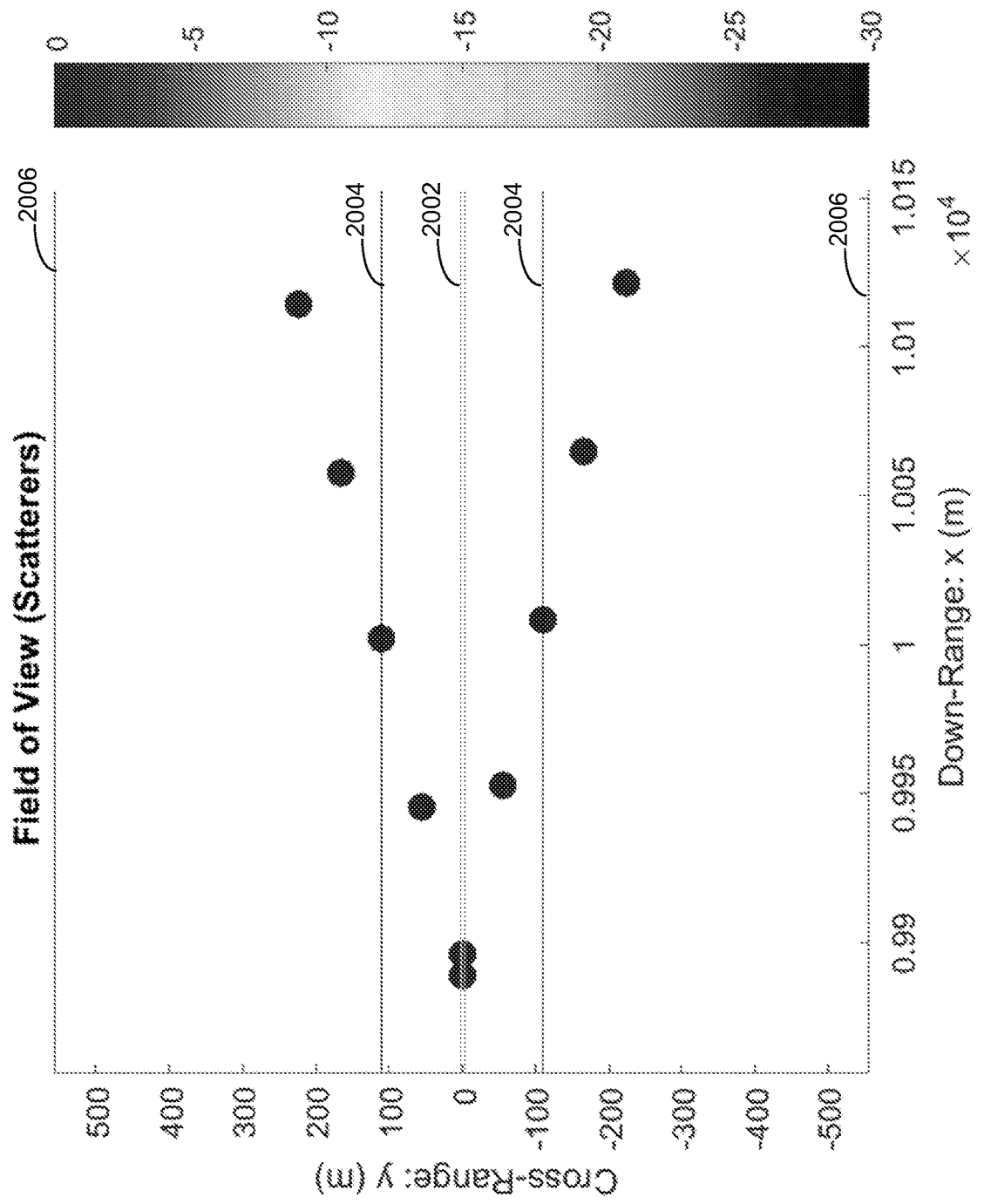
FIG. 4 illustrates a set of scatterers within an expanded field of view that produces the image of FIG. 3 according to one aspect of the disclosed technology.

FIG. 4 illustrates scatterers in field of view (lines 2002 indicate array size, lines 2004 indicate beamwidth at the field of view, lines 2006 indicate processing field of view).

FIG. 2 illustrates inability of prior art to provide a range/cross-range image of scattering field and only produce a conventional range profile of a single Fraunhofer plane wave beam.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall there between.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

For example, the disclosed technology may include radar sensor arrays for self-driving cars and radar sensor arrays for surveillance of airborne drone traffic. The disclosed technology may also implement computed imaging for seismic exploration, defense and civilian applications in radar and sonar, and ultrasonic medical imaging devices, among many other possibilities. The disclosed technology may serve multiple purposes, including electromagnetic based communications with utility in multiple-input/multiple-output (MIMO) array processing protocols as part of the Fifth Generation (5G) Long-Term Evolution (LTE) wireless communications and data networks. The disclosed technology may enable MIMO base stations to use sensor array imaging to thereby localize fixed and mobile transmitters such as entities within the Internet-of-Things (TOT) that reside within sensor array fields of view.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for producing images of scene content within a sensed field of view comprising:
    a sensor array of sensor elements configured to transmit a signal;
    an image display device; and
    a processor configured to:
        receive time-space sensor element data from the sensor array;
        perform zero padding to modify the time-space sensor element data to a spatial size of a cross-range extent of the sensed field of view when the spatial size of a cross-range extent of the sensed field of view is larger than a spatial size of a cross-range extent of the sensor array;
        store in a time-space sensor data buffer:
            the zero-padded time-space sensor element data when the spatial size of the cross-range extent of the sensed field of view is larger than the spatial size of the cross-range extent of the sensor array; and
            the sensor element data when the spatial size of the cross-range extent of the sensed field of view is not larger than the spatial size of the cross-range extent of the sensor array; and
        generate image data representative of the scene contents within the sensed field of view from the processed sensor element data;
    wherein the image data is configured for display on the image display device.

2. The system of claim 1, wherein the sensor elements of the sensor array have a predefined spatial arrangement.

3. The system of claim 2, wherein the image data has a predefined data sample spacing; and
    wherein the predefined data sample spacing is proportional to, including greater than, equal to, and less than, the predefined spatial arrangement of the sensor elements of the sensor array.

4. The system of claim 1, wherein the image data is representative of the scene contents within the sensed field of view according to a dimensional view of the sensed field selected from the group consisting of a one, a two and a three dimensional view.

5. The system of claim 1, wherein a total number of cross-range pixels of image data spans a size of a cross-range extent of a subscene or a full-scene of the sensed field.

6. The system of claim 1, wherein the sensor array includes at least one of a one-dimensional and a two-dimensional sensor array.

7. The system of claim 1, wherein the sensor array includes at least one of a multidimensional array and a conformal surface array.

8. The system of claim 1, wherein the processor is further configured to:
    process data from multiple transmit actions from the sensor array; and
    process data from multiple sensor arrays with distinct sensor array positions;
    wherein each distinct sensor array of the system of distinct sensor arrays is selected from the group consisting of a stationary sensor array and a moving sensor array.

9. A system for producing images of one or more subscenes or full-scene content within a sensed field of view comprising:
- a sensor array of sensor elements configured to transmit a signal;
- an image display device; and
- a processor configured to:
  - generate one or more time-space domain reference signal data sets based on:
    - a first reference point location;
    - one or more second reference point locations;
    - a signal transmitted from the sensor array; and
    - one or more sizes of one or more cross-range extents of the one or more subscenes or the full-scene of the sensed field of view;
  - perform one or more spatial discrete Fourier transforms (DFTs) on one or more data sets of reference Fresnel field data to form one or more frequency-wavenumber domain reference forward Huygens-Fresnel transfer data sets; and
  - perform complex number conjugation of one or more of the frequency-wavenumber domain reference forward Huygens-Fresnel transfer data sets to form inverse Huygens-Fresnel transfer data sets for storage in one or more inverse Huygens-Fresnel transfer data buffers.

10. The system of claim 9, wherein the processor is further configured to:
- perform a temporal Discrete Fourier Transform on a time dimension of the time-space sensor data buffer resulting in frequency-space sensor data stored in a frequency-space sensor data buffer;
- multiply each data element of a frequency dimension of the frequency-space sensor data buffer with a corresponding data element of a filter matched to a spectrum of the signal transmitted from the sensor array for pulse compression if a temporal signal configured to be transmitted from the sensor array is a pulse compression waveform;
- perform a spatial Discrete Fourier Transform on the frequency-space sensor data buffer and store the result in a frequency-space sensor data buffer;
- multiply each data element of the frequency-space sensor data buffer with each corresponding data element of the one or more inverse Huygens-Fresnel transfer data buffers to generate frequency-wavenumber scene data representative of spectrums of one or more of the subscenes or the full-scene of the sensed field of view; and
- store the multiplied data elements of the frequency-wavenumber sensor data buffer into a frequency-wavenumber scene data buffer.

11. The system of claim 10, wherein the processor is further configured to:
- perform wavenumber migration of the frequency-wavenumber sensor data buffer to form nonuniformly sampled scene angular spectrum data for storage in a scene angular spectrum data buffer, wherein the wavenumber migration is a process selected from a group of processes consisting of a wavenumber regridding process, a wavenumber repositioning process, a wavenumber transformation process, and a Stolt transformation process; and
- perform uniform resampling of the nonuniformly sampled scene angular spectrum data to form uniformly resampled scene angular spectrum data for storage in a scene image spectrum data buffer, wherein the uniform resampling is a process selected from a group of processes consisting of a Jacobian weighted sinc interpolation process, a least squares interpolation process and a nonuniform-to-uniform data interpolation process.

12. The system of claim 11, wherein the processor is further configured to:
- perform a spatial inverse Discrete Fourier Transform on the scene image spectrum data buffer to generate one or more subscenes or full-scene image data of the sensed field of view for storage in the image display device; and
- display the generated subscenes or full-scene image data on the image display device.

13. The system of claim 9, wherein:
- a time dimension size of each of the one or more time-space domain reference signal data sets is equal to, or greater than, a size of the signal transmitted from the sensor array expanded to be equal, if larger, to a size of one or more down-range extents of the one or more sub scenes or the full-scene of the sensed field of view;
- a space dimension size of each of the one or more time-space domain reference signal data sets is equal to the one or more sizes of the one or more cross-range extents of the one or more subscenes or the full-scene of the sensed field of view;
- the first reference point location identifies a location of a time-space sensor data array;
- the one or more second reference points each identify a location of one of the subscenes or the full-scene of the sensed field of view;
- time-space domain reference signal data comprises copies of the signal transmitted from the sensor array with delays set within a time-space reference signal data buffer as determined by one of the second reference points and one or more zero pad elements and the sensor element positions of the time-space sensor data array positioned at the first reference point; and
- the processor is further configured to perform one or more temporal Discrete Fourier Transforms on one or more data sets of the time-space domain reference signals to form one or more frequency-space domain reference Fresnel data sets corresponding to one or more of the subscenes or the full-scene of the field of view.

14. The system of claim 13, wherein the processor is further configured to:
- perform a temporal Discrete Fourier Transform on a time dimension of the time-space sensor data buffer resulting in frequency-space sensor data stored in a frequency-space sensor data buffer;
- multiply each data element of a frequency dimension of the frequency-space sensor data buffer with a corresponding data element of a filter matched to a spectrum of the signal transmitted from the sensor array for pulse compression if a temporal signal configured to be transmitted from the sensor array is a pulse compression waveform;
- perform a spatial Discrete Fourier Transform on the frequency-space sensor data buffer and store the result in a frequency-space sensor data buffer;
- multiply each data element of the frequency-space sensor data buffer with each corresponding data element of the one or more inverse Huygens-Fresnel transfer data buffers to generate frequency-wavenumber scene data representative of spectrums of one or more of the subscenes or the full-scene of the sensed field of view; and store the multiplied data elements of the frequency-wavenumber sensor data buffer into a frequency-wavenumber scene data buffer.

15. A system for producing images of scene content within a sensed field of view comprising:
   a sensor array of sensor elements configured to transmit a signal;
   an image display device; and
   a processor configured to:
      determine a first reference point location of the sensor array;
      determine a second reference point location of the sensed field of view;
      generate reference Fresnel field data based on:
         the first reference point location;
         the second reference point location;
         the signal transmitted from the sensor array; and
         the size of the sensed field of view; and
      generate one or more fields of views with distinct associated reference points and reference Fresnel field data.

16. A system for producing an inverse Huygens-Fresnel transfer signal comprising:
   a sensor array of sensor elements, the sensor elements having a predefined spacing and configured to transmit a predefined waveform; and
   a processor configured to:
      determine a spatial discrete Fourier transform of reference Fresnel field data to produce forward Huygens-Fresnel transfer data for a forward Huygens-Fresnel transfer buffer;
         wherein the reference Fresnel field data has reference Fresnel field data sample spacing which is proportional to, including equal to, the predefined spacing of the sensor elements; and
         wherein a total number of Fresnel field data samples of the reference Fresnel field sample data is identical to a total number of cross-range data samples of a field the field of view to be imaged; and
      determine a complex conjugation of the forward Huygens-Fresnel transfer data to produce data for an inverse Huygens-Fresnel transfer buffer.

17. A system for producing images of scene content within a sensed field of view comprising:
   a sensor array of sensor elements configured to transmit a signal;
   an image display device; and
   a processor configured to:
      receive sensor element data from the sensor array;
      perform zero padding to modify the sensor element data to a size of the sensed field of view for storage in a sensor data buffer when the size of the sensed field of view is larger than a size of the sensor array;
      store in the sensor data buffer:
         the modified sensor element data when the size of the sensed field of view is larger than the size of the sensor array; and
         the sensor element data when the size of the sensed field of view is not larger than the size of the sensor array; and
      generate image data representative of the scene contents within the sensed field of view from the processed sensor element data;
      wherein processing the sensor element data comprises performing wave field inversion of the sensor element data; and
      wherein the image data is configured for display on the image display device.

18. The system of claim 17, wherein the processor is further configured to:
   determine a first reference point location of the sensor array;
   determine a second reference point location of the sensed field of view; and
   generate reference Fresnel field data based on:
      the first reference point location;
      the second reference point location;
      the signal transmitted from the sensor array; and
      the size of the sensed field of view.

19. The system of claim 18, wherein the processor is further configured to:
   perform a spatial discrete Fourier transform (DFT) on the reference Fresnel field data to form forward Huygens-Fresnel transfer data; and
   perform complex number conjugation of the forward Huygens-Fresnel transfer data to form inverse Huygens-Fresnel transfer data for storage in an inverse Huygens-Fresnel transfer data buffer.

20. The system of claim 19, wherein the processor is further configured to:
   perform a spatial DFT on the sensor data buffer to result in a sensor wavenumber data buffer;
   multiply each data element of the sensor wavenumber data buffer with each corresponding data element of the inverse Huygens-Fresnel transfer data buffer;
   multiply each data element of the sensor wavenumber data buffer with a corresponding data element of a filter matched to the signal configured to be transmitted from the sensor array for pulse compression if the signal configured to be transmitted from the sensor array is a pulse compression waveform; and
   store the multiplied data elements into a rectilinear spectrum data buffer.

21. The system of claim 20, wherein the processor is further configured to:
   perform Stolt mapping on the rectilinear spectrum data buffer to form nonuniformly sampled angular spectrum data for storage in an angular spectrum data buffer;
   perform uniform resampling of the nonuniformly sampled angular spectrum data; and
   perform a spatial inverse DFT on the uniformly resampled angular spectrum data to generate the image data.

22. A system for producing images of scene content within a sensed field of view comprising:
   a sensor array of sensor elements, the sensor elements having a predefined spacing and configured to transmit a predefined waveform;
   an image display device; and
   a processor configured to:
      determine a spatial reference point for the sensor array;
      determine a spatial reference point for a field of view to be imaged;
      generate reference Fresnel field sample data, based on the predefined waveform, to account for a space between the spatial reference point of the sensor array and the spatial reference point of the field of view to be imaged;
      generate a data buffer containing the reference Fresnel field sample data;
         wherein the reference Fresnel field sample data has reference Fresnel field data sample spacing that is proportional to, including equal to, the predefined spacing of the sensor elements; and wherein a total number of Fresnel field data samples of the reference Fresnel field sample data is identical to a total number of cross-range data samples of the field of view to be imaged;

determine a spatial discrete Fourier transform of the reference Fresnel field sample data to produce forward Huygens-Fresnel transfer data for a forward Huygens-Fresnel transfer buffer;

determine a complex conjugation of the forward Huygens-Fresnel transfer data to produce data for an inverse Huygens-Fresnel transfer buffer;

process the data of the inverse Huygens-Fresnel transfer buffer;

generate image data representative of the scene contents within the sensed field of view from the processed data of the inverse Huygens-Fresnel transfer buffer; and display the generated image data on the image display device.

23. The system of claim 22, wherein processing the data of the inverse Huygens-Fresnel transfer buffer comprises the processor further configured to:

perform a spatial discrete Fourier transform (DFT) on the predefined waveform to result in a sensor wavenumber data buffer;

multiply each data element of the sensor wavenumber data buffer with each corresponding data element of the inverse Huygens-Fresnel transfer data buffer;

multiply each data element of the sensor wavenumber data buffer with a corresponding data element of a filter matched to the predefined waveform for pulse compression if predefined waveform is a pulse compression waveform;

store the multiplied data elements into a rectilinear spectrum data buffer;

perform Stolt mapping on the rectilinear spectrum data buffer to form nonuniformly sampled angular spectrum data for storage in an angular spectrum data buffer;

perform uniform resampling of the nonuniformly sampled angular spectrum data; and perform a spatial inverse DFT on the uniformly resampled angular spectrum data to generate the image data representative of the scene contents within the sensed field of view.

* * * * *